United States Patent
Paladugu et al.

(10) Patent No.: US 11,006,342 B2
(45) Date of Patent: May 11, 2021

(54) HANDOVER TECHNIQUES IN WIRELESS COMMUNICATIONS

(71) Applicant: QUALCOMM Incorporated, San Diego, CA (US)

(72) Inventors: Karthika Paladugu, San Diego, CA (US); Keiichi Kubota, Tokyo (JP); Gavin Bernard Horn, La Jolla, CA (US); Prashanth Haridas Hande, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/188,231

(22) Filed: Nov. 12, 2018

(65) Prior Publication Data

US 2020/0154333 A1    May 14, 2020

(51) Int. Cl.
| | |
|---|---|
| *H04W 36/30* | (2009.01) |
| *H04B 7/022* | (2017.01) |
| *H04B 7/0413* | (2017.01) |
| *H04B 7/0417* | (2017.01) |
| *H04B 7/0452* | (2017.01) |

(Continued)

(52) U.S. Cl.
CPC .......... *H04W 36/305* (2018.08); *H04B 7/022* (2013.01); *H04B 7/0413* (2013.01); *H04B 7/0417* (2013.01); *H04B 7/0452* (2013.01); *H04B 7/0602* (2013.01); *H04B 7/0617* (2013.01); *H04B 7/18506* (2013.01); *H04B 7/18508* (2013.01); *H04W 36/0055* (2013.01); *H04W 36/08* (2013.01); *H04W 36/18* (2013.01)

(58) Field of Classification Search
CPC . H04W 36/0055; H04W 36/08; H04W 36/18; H04W 36/305; H04W 36/24; H04W 36/20; H04B 7/022; H04B 7/18506; H04B 7/18508; H04B 7/0413; H04B 7/0417; H04B 7/0452; H04B 7/0602; H04B 7/0617
USPC .................................. 455/436, 442; 370/331
See application file for complete search history.

(56) References Cited

U.S. PATENT DOCUMENTS

| | | | | |
|---|---|---|---|---|
| 9,510,253 | B2 * | 11/2016 | Han | ...................... H04W 36/08 |
| 10,667,192 | B1 | 5/2020 | Paladugu et al. | |

(Continued)

FOREIGN PATENT DOCUMENTS

WO    WO-2017138978 A1    8/2017

OTHER PUBLICATIONS

International Search Report and Written Opinion—PCT/US2019/058946—ISA/EPO—dated Feb. 6, 2020.

(Continued)

*Primary Examiner* — Fred A Casca
(74) *Attorney, Agent, or Firm* — Holland & Hart LLP

(57) ABSTRACT

Methods, systems, and devices for wireless communications are described that provide a handover may be performed based on one or more conditions at a UE and in conjunction with a handover procedure from a source base station to a target base station. The one or more conditions at the UE may be associated with successful establishment or maintenance of the second connection. In some cases, the one or more conditions at the UE may correspond to one or more measurements associated with the source base station, the target base station, one or more neighboring base stations, or any combinations thereof.

27 Claims, 28 Drawing Sheets

(51) Int. Cl.
*H04B 7/06* (2006.01)
*H04B 7/185* (2006.01)
*H04W 36/00* (2009.01)
*H04W 36/08* (2009.01)
*H04W 36/18* (2009.01)

(56) References Cited

U.S. PATENT DOCUMENTS

| | | |
|---|---|---|
| 2004/0028009 A1 | 2/2004 | Dorenbosch et al. |
| 2004/0203855 A1* | 10/2004 | Veerasamy ............ H04W 16/18 455/456.1 |
| 2009/0191879 A1* | 7/2009 | Ichikawa ............... H04W 36/18 455/442 |
| 2011/0200007 A1* | 8/2011 | Qiang .................... H04W 76/10 370/331 |
| 2012/0218973 A1* | 8/2012 | Du ......................... H04W 36/14 370/331 |
| 2013/0250857 A1* | 9/2013 | Lu ......................... H04W 24/02 370/328 |
| 2013/0316713 A1* | 11/2013 | Xu ........................ H04W 36/32 455/438 |
| 2014/0087731 A1 | 3/2014 | Zhang et al. |
| 2014/0256311 A1 | 9/2014 | Müller et al. |
| 2014/0335872 A1* | 11/2014 | Yamada ................ H04W 36/28 455/450 |
| 2014/0378138 A1* | 12/2014 | Chang ............... H04W 36/0079 455/436 |
| 2015/0055620 A1 | 2/2015 | Vesterinen et al. |
| 2015/0117399 A1 | 4/2015 | Yang et al. |
| 2015/0117415 A1 | 4/2015 | Rabe et al. |
| 2015/0282033 A1* | 10/2015 | Lunden ............. H04W 36/0079 455/436 |
| 2015/0350962 A1 | 12/2015 | Futaki et al. |
| 2015/0350969 A1 | 12/2015 | Dudda et al. |
| 2015/0358863 A1 | 12/2015 | Yamamoto et al. |
| 2015/0365872 A1* | 12/2015 | Dudda ............... H04W 36/0055 455/436 |
| 2016/0044518 A1 | 2/2016 | Centonza et al. |
| 2016/0337925 A1 | 11/2016 | Fujishiro et al. |
| 2016/0338039 A1 | 11/2016 | Van Der Velde et al. |
| 2017/0135001 A1* | 5/2017 | Kim .................... H04W 36/0077 |
| 2018/0014237 A1 | 1/2018 | Xu et al. |
| 2018/0077661 A1 | 3/2018 | Zhang et al. |
| 2018/0220336 A1 | 8/2018 | Hong et al. |
| 2018/0270809 A1 | 9/2018 | Park et al. |
| 2018/0295544 A1 | 10/2018 | Feng |
| 2018/0324651 A1 | 11/2018 | Tenny et al. |
| 2019/0037450 A1 | 1/2019 | Chang et al. |
| 2019/0069335 A1 | 2/2019 | Wu |
| 2019/0098539 A1* | 3/2019 | Zhang ............... H04W 36/0055 |
| 2019/0281498 A1 | 9/2019 | Lubenski et al. |

OTHER PUBLICATIONS

ZTE Corporation: "RLF analysis on make before break solution", 3GPP Draft; R2-166608 RLF Analysis on Make Before Break Solution, 3RD Generation Partnership Project (3GPP), Mobile Competence Centre; 650, Route Des Lucioles; F-06921 Sophia-Antipolis Cedex; France, vol. RAN WG2, No. Kaohsiung; Oct. 10, 2016-Oct. 14, 2016, Oct. 9, 2016 (Oct. 9, 2016), XP051151105, 3 Pages, Retrieved from the Internet: URL:http://www.3gpp.org/ftp/Meetings_3GPP_SYNC/RAN2/Docs/ [retrieved on Oct. 9, 2016], Sections 1, 2 and 2.2.

Huawei, et al., "DC based NR Scheme for 0ms Interruption Handover", 3GPP TSG-RAN WG2 #101, 3GPP Draft; R2-1802473 DC based NR Scheme for 0MS Interruption Handover, 3rd Generation Partnership Project (3GPP), Mobile Competence Centre; 650, Route Des Lucioles; F-06921 Sophia-Antipolis Cedex, vol. RAN WG2, No. Athens, Greece; Feb. 26, 2018-Mar. 2, 2018, Feb. 16, 2018 (Feb. 16, 2018), pp. 1-7, XP051400151, Retrieved from the Internet: URL: http://www.3gpp.org/ftp/tsg%5Fran/WG2%5FRL2/TSGR2%5F101/Docs/ [retrieved on Feb. 16, 2018] chapters 1, 2; figures 1, 2.

Qualcomm Incorporated: "NR 0ms Interruption HO", 3GPP Draft ; R2-1803662_0MS_INTERRUPTION_HO, 3rd Generation Partnership Project (3GPP), Mobile Competence Centre; 650, Route Des Lucioles; F-06921 Sophia-Antipolis Cedex; France, vol. RAN WG2, No. Athens, Greece; Feb. 26, 2018-Mar. 2, 2018, Feb. 16, 2018, 8 pages , XP051400685, Retrieved from the Internet: URL: http://www.3gpp.org/ftp/tsg%5Fran/WG2%5FRL2/TSGR%5F101/Docs/ [retrieved on Feb. 16, 2018] chapters 1, 2.

ZTE Corporation: "Email Discussion on Solution 2 Family", 3GPP TSG-RAN WG2 Meeting #94, 3GPP Draft; R2-163863, 3rd Generation Partnership Project (3GPP), Mobile Competence Centre ; 650, Route Des Lucioles; F-06921 Sophia-Antipolis Cedex; France, vol. RAN WG2, No. Nanjing, China; Apr. 11, 2016-Apr. 15, 2016, May 22, 2016 (May 22, 2016), pp. 1-35, XP051105253, Retrieved from the Internet: URL: http://www.3gpp.org/ftp/Meetings_3GPP_SYNC/RAN2/Docs/ [retrieved on May 22, 2016] chapter 2.2.8.

\* cited by examiner

HANDOVER TECHNIQUES IN WIRELESS COMMUNICATIONS

BACKGROUND

The following relates generally to wireless communications, and more specifically to handover techniques in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

When operating in a wireless communications system, a UE may move between coverage areas of multiple different base stations. In cases where radio signals of a neighboring base station, which may be referred to as a target base station, will provide an enhanced connection with a UE relative to a currently serving (or source) base station, the UE may be handed over from the source base station to the target base station. Such techniques may be referred to as handover procedures or mobility procedures, and help to provide continuous connectivity to a UE as it moves in a wireless communications system. In some systems, a UE may release an active connection with the source base station and establish a new connection with the target base station in response to a handover communication from the source base station. Enhanced techniques for performing handover may help to enhance the overall efficiency and reliability of a wireless communications system.

SUMMARY

The described techniques relate to improved methods, systems, devices, and apparatuses for performing handovers in wireless communications. In various aspects, the described techniques provide that a handover may be performed based on one or more conditions at a UE in conjunction with a handover procedure from a source base station to a target base station. In some cases, the one or more conditions at the UE may be associated with successful establishment or maintenance of the second connection. In some cases, the one or more conditions at the UE may correspond to one or more measurements associated with the source base station, the target base station, one or more neighboring base stations, or any combinations thereof.

In some cases, for example, the UE may be unable to establish the second connection, or the second connection may be established and then fail shortly afterward. In such cases, the UE may report a radio link failure to the source base station, and maintain the first connection. In some cases, the source base station may discontinue the handover and initiate a new handover procedure at the UE to a different neighboring base station.

Additionally or alternatively, the UE may perform a measurement as part of the handover, and the handover may be modified based at least in part on the measurement. For example, the measurement may be performed after establishment of the second connection at the target base station, where the second connection is a primary connection and the first connection is a secondary connection. In such cases, the source and target base stations may perform a role switch based on the measurement (e.g., when the measurement indicates the first connection has better channel conditions than the second connection) to change the first connection to be the primary connection and the second connection to be the secondary connection. In some cases, two or more role switches may be performed based on multiple measurements provided by the UE in accordance with a ping-pong handling procedure, until one of the connections remains the primary connection for a predetermined time period.

In some cases, the UE may perform the measurement as part of a random access procedure with the target base station and may measure channel quality of one or more neighboring base stations. In such cases, the UE may transmit the measurement to the source base station in the event that a neighboring base station has a channel quality that exceeds a threshold. The source base station, based at least in part on the measurement, may cancel the handover to the second base station and initiate a handover with the neighboring base station.

In some cases, the UE may transmit a measurement report to the source base station that may initiate a handover of the UE from the source base station to the target base station. In some cases, a second connection with the target base station may be established using a dual connectivity (DC) technique, in which the first connection is changed to a secondary connection and the newly established second connection is set as a primary connection. In some cases, the source base station may maintain the first connection as a primary connection, and switch the first connection to be a secondary connection responsive to a role switch communication with the target base station. In some cases, the role switch communication with the target base station may be combined with a handover request to the target base station and an associated acknowledgment from the target base station.

A method of wireless communication is described. The method may include establishing, at a UE, a first connection with a first base station, receiving a handover message from the first base station to perform a handover procedure with a second base station, transmitting, responsive to the handover message, a request to the second base station to establish a second connection with the second base station, where the first connection with the first base station is maintained during the handover procedure, determining that a radio link failure of the first connection or the second connection has occurred, and transmitting an indication of the radio link failure to the first base station or the second base station responsive to the determining.

An apparatus for wireless communication is described. The apparatus may include a processor, memory in electronic communication with the processor, and instructions stored in the memory. The instructions may be executable by the processor to cause the apparatus to establish, at a UE, a first connection with a first base station, receive a handover message from the first base station to perform a handover procedure with a second base station, transmit, responsive to the handover message, a request to the second base station to establish a second connection with the second base station, where the first connection with the first base station is maintained during the handover procedure, determine that a radio link failure of the first connection or the second connection has occurred, and transmit an indication of the radio link failure to the first base station or the second base station responsive to the determining.

Another apparatus for wireless communication is described. The apparatus may include means for establishing, at a UE, a first connection with a first base station, receiving a handover message from the first base station to perform a handover procedure with a second base station, transmitting, responsive to the handover message, a request to the second base station to establish a second connection with the second base station, where the first connection with the first base station is maintained during the handover procedure, determining that a radio link failure of the first connection or the second connection has occurred, and transmitting an indication of the radio link failure to the first base station or the second base station responsive to the determining.

A non-transitory computer-readable medium storing code for wireless communication is described. The code may include instructions executable by a processor to establish, at a UE, a first connection with a first base station, receive a handover message from the first base station to perform a handover procedure with a second base station, transmit, responsive to the handover message, a request to the second base station to establish a second connection with the second base station, where the first connection with the first base station is maintained during the handover procedure, determine that a radio link failure of the first connection or the second connection has occurred, and transmit an indication of the radio link failure to the first base station or the second base station responsive to the determining.

In some examples of the method, apparatuses, and non-transitory computer-readable medium described herein, the determining may include operations, features, means, or instructions for determining that establishment of the connection with the second base station may have failed or the second connection failed after establishment of the second connection, and maintaining the first connection with the first base station. In some examples of the method, apparatuses, and non-transitory computer-readable medium described herein, the indication of the radio link failure includes a failure cause associated with the second connection and a target cell group identification associated with the second base station. In some examples of the method, apparatuses, and non-transitory computer-readable medium described herein, the indication of the radio link failure further indicates one or more of a timer expiration associated with the second connection, a random access procedure failure, or a maximum number of retransmissions is reached for a communication using the second connection. In some examples of the method, apparatuses, and non-transitory computer-readable medium described herein, the indication of the radio link failure further indicates a measurement of one or more signals received at the UE from one or more neighboring base stations.

In some examples of the method, apparatuses, and non-transitory computer-readable medium described herein, the determining may include operations, features, means, or instructions for determining that the first connection with the first base station may have failed prior to completion of an establishment of the second connection, and completing the establishment of the second connection with the second base station. In some examples of the method, apparatuses, and non-transitory computer-readable medium described herein, the completing the establishment of the second connection preempts a triggering of a reestablishment of the first connection with the first base station. Some examples of the method, apparatuses, and non-transitory computer-readable medium described herein may further include operations, features, means, or instructions for releasing the first connection and a source stack associated with the first connection responsive to completing the establishment of the second connection with the second base station. In some examples of the method, apparatuses, and non-transitory computer-readable medium described herein, the indication of the radio link failure indicates a failure cause associated with the first connection and a source cell group identification associated with the first base station.

A method of wireless communication is described. The method may include establishing, at a first base station, a first connection with a UE, initiating a handover procedure to handover the UE to a second base station, where the first connection with the first base station is maintained during the handover procedure, receiving, from the UE, an indication of a failure of the handover procedure, and discontinuing the handover procedure to handover the UE to the second base station.

An apparatus for wireless communication is described. The apparatus may include a processor, memory in electronic communication with the processor, and instructions stored in the memory. The instructions may be executable by the processor to cause the apparatus to establish, at a first base station, a first connection with a UE, initiate a handover procedure to handover the UE to a second base station, where the first connection with the first base station is maintained during the handover procedure, receive, from the UE, an indication of a failure of the handover procedure, and discontinue the handover procedure to handover the UE to the second base station.

Another apparatus for wireless communication is described. The apparatus may include means for establishing, at a first base station, a first connection with a UE, initiating a handover procedure to handover the UE to a second base station, where the first connection with the first base station is maintained during the handover procedure, receiving, from the UE, an indication of a failure of the handover procedure, and discontinuing the handover procedure to handover the UE to the second base station.

A non-transitory computer-readable medium storing code for wireless communication is described. The code may include instructions executable by a processor to establish, at a first base station, a first connection with a UE, initiate a handover procedure to handover the UE to a second base station, where the first connection with the first base station is maintained during the handover procedure, receive, from the UE, an indication of a failure of the handover procedure, and discontinue the handover procedure to handover the UE to the second base station.

In some examples of the method, apparatuses, and non-transitory computer-readable medium described herein, the receiving the indication of the failure of the handover procedure further may include operations, features, means, or instructions for receiving a radio link failure message from the UE indicating a timer expiration associated with a random access procedure to establish a second connection with the second base station. Some examples of the method, apparatuses, and non-transitory computer-readable medium described herein may further include operations, features, means, or instructions for receiving a radio link failure message from the UE indicating a second connection with the second base station was established and then failed. In some examples of the method, apparatuses, and non-transitory computer-readable medium described herein, the radio link failure message indicates a failure cause associated with the second connection, and where the failure cause indicates one or more or a timer expiration associated with the second connection, a random access procedure failure, or a maximum number of retransmissions is reached for a communication using the second connection. In some examples of the method, apparatuses, and non-transitory computer-readable medium described herein, the radio link failure message further indicates a target cell group identification associated with the second base station. In some examples of the method, apparatuses, and non-transitory computer-readable medium described herein, the indication of the failure of the handover procedure further indicates a measurement of one or more signals received at the UE from a neighboring base station.

Some examples of the method, apparatuses, and non-transitory computer-readable medium described herein may further include operations, features, means, or instructions for transmitting, to the second base station and responsive to the receiving the indication of the failure of the handover procedure, a message to the second base station to cancel the handover procedure.

Some examples of the method, apparatuses, and non-transitory computer-readable medium described herein may further include operations, features, means, or instructions for initiating a second handover procedure to handover the UE to a third base station, where the first connection with the first base station may be maintained during the second handover procedure. In some examples of the method, apparatuses, and non-transitory computer-readable medium described herein, the initiating the second handover procedure further may include operations, features, means, or instructions for transmitting, to the UE, a reconfiguration message indicating the UE is to perform the second handover procedure with the third base station.

A method of wireless communication is described. The method may include receiving, at a second base station, a handover message to initiate a handover of a UE from a first base station to the second base station, initiating, responsive to the handover message, a connection establishment with the UE to establish a second connection between the UE and the second base station, receiving from the UE an indication of a failure of a first connection between the UE and the first base station, where the first connection was to be maintained during the handover of the UE from the first base station to the second base station, and forwarding the indication of the failure of the first connection to the first base station.

An apparatus for wireless communication is described. The apparatus may include a processor, memory in electronic communication with the processor, and instructions stored in the memory. The instructions may be executable by the processor to cause the apparatus to receive, at a second base station, a handover message to initiate a handover of a UE from a first base station to the second base station, initiate, responsive to the handover message, a connection establishment with the UE to establish a second connection between the UE and the second base station, receive from the UE an indication of a failure of a first connection between the UE and the first base station, where the first connection was to be maintained during the handover of the UE from the first base station to the second base station, and forward the indication of the failure of the first connection to the first base station.

Another apparatus for wireless communication is described. The apparatus may include means for receiving, at a second base station, a handover message to initiate a handover of a UE from a first base station to the second base station, initiating, responsive to the handover message, a connection establishment with the UE to establish a second connection between the UE and the second base station, receiving from the UE an indication of a failure of a first connection between the UE and the first base station, where the first connection was to be maintained during the handover of the UE from the first base station to the second base station, and forwarding the indication of the failure of the first connection to the first base station.

A non-transitory computer-readable medium storing code for wireless communication is described. The code may include instructions executable by a processor to receive, at a second base station, a handover message to initiate a handover of a UE from a first base station to the second base station, initiate, responsive to the handover message, a connection establishment with the UE to establish a second connection between the UE and the second base station, receive from the UE an indication of a failure of a first connection between the UE and the first base station, where the first connection was to be maintained during the handover of the UE from the first base station to the second base station, and forward the indication of the failure of the first connection to the first base station.

In some examples of the method, apparatuses, and non-transitory computer-readable medium described herein, the indication of the failure of the first connection indicates that resources and context associated with the first connection is to be deleted. In some examples of the method, apparatuses, and non-transitory computer-readable medium described herein, the initiating the connection establishment with the UE further may include operations, features, means, or instructions for performing a random access procedure with the UE to establish the second connection between the UE and the second base station, and where the indication of the failure of the first connection may be received subsequent to the establishment of the second connection. In some examples of the method, apparatuses, and non-transitory computer-readable medium described herein, the indication of the failure of the first connection includes a failure cause associated with the first connection and a source cell group identification associated with the first base station. In some examples of the method, apparatuses, and non-transitory computer-readable medium described herein, the indication of the failure of the first connection further includes a measurement of one or more signals received at the UE from a neighboring base station.

A method of wireless communication is described. The method may include establishing, at a UE, a first connection with a first base station, receiving a handover message from the first base station to perform a handover procedure with a second base station, initiating, at the UE, a connection establishment with the second base station to establish a second connection responsive to the handover message, where the first connection is maintained during the connection establishment with the second base station, measuring one or more channel conditions associated with one or more of the first base station, the second base station or a third base station, and transmitting, responsive to the handover message, a measurement report to at least one of the first base station or the second base station responsive to measuring the one or more channel conditions.

An apparatus for wireless communication is described. The apparatus may include a processor, memory in electronic communication with the processor, and instructions stored in the memory. The instructions may be executable by the processor to cause the apparatus to establish, at a UE, a first connection with a first base station, receive a handover message from the first base station to perform a handover procedure with a second base station, initiate, at the UE, a connection establishment with the second base station to establish a second connection responsive to the handover message, where the first connection is maintained during the connection establishment with the second base station, measure one or more channel conditions associated with one or more of the first base station, the second base station or a third base station, and transmit, responsive to the handover message, a measurement report to at least one of the first base station or the second base station responsive to measuring the one or more channel conditions.

Another apparatus for wireless communication is described. The apparatus may include means for establishing, at a UE, a first connection with a first base station, receiving a handover message from the first base station to perform a handover procedure with a second base station, initiating, at the UE, a connection establishment with the second base station to establish a second connection responsive to the handover message, where the first connection is maintained during the connection establishment with the second base station, measuring one or more channel conditions associated with one or more of the first base station, the second base station or a third base station, and transmitting, responsive to the handover message, a measurement report to at least one of the first base station or the second base station responsive to measuring the one or more channel conditions.

A non-transitory computer-readable medium storing code for wireless communication is described. The code may include instructions executable by a processor to establish, at a UE, a first connection with a first base station, receive a handover message from the first base station to perform a handover procedure with a second base station, initiate, at the UE, a connection establishment with the second base station to establish a second connection responsive to the handover message, where the first connection is maintained during the connection establishment with the second base station, measure one or more channel conditions associated with one or more of the first base station, the second base station or a third base station, and transmit, responsive to the handover message, a measurement report to at least one of the first base station or the second base station responsive to measuring the one or more channel conditions.

Some examples of the method, apparatuses, and non-transitory computer-readable medium described herein may further include operations, features, means, or instructions for establishing the second connection with the second base station, where the second connection is a primary connection and the first connection is maintained as a secondary connection, receiving, responsive to the measurement report, a reconfiguration message from the second base station to reconfigure the first connection as the primary connection and the second connection as the secondary connection, and reconfiguring the first connection and the second connection responsive to the reconfiguration message.

Some examples of the method, apparatuses, and non-transitory computer-readable medium described herein may further include operations, features, means, or instructions for transmitting one or more additional measurement reports via the primary connection. In some examples of the method, apparatuses, and non-transitory computer-readable medium described herein, the measurement report may be transmitted responsive to the measured one or more channel conditions of the secondary connection being better than corresponding channel conditions of the primary connection.

In some examples of the method, apparatuses, and non-transitory computer-readable medium described herein, the reconfiguring the first connection and the second connection responsive to the reconfiguration message may be performed without performing a random access procedure. Some examples of the method, apparatuses, and non-transitory computer-readable medium described herein may further include operations, features, means, or instructions for transmitting and receiving duplicated data via each of the primary connection and the secondary connection.

Some examples of the method, apparatuses, and non-transitory computer-readable medium described herein may further include operations, features, means, or instructions for releasing the first connection after the second connection may have been a primary connection for a predetermined time period. Some examples of the method, apparatuses, and non-transitory computer-readable medium described herein may further include operations, features, means, or instructions for receiving, responsive to the measurement report, a reconfiguration message from the first base station to abort the handover procedure with the second base station. In some examples of the method, apparatuses, and non-transitory computer-readable medium described herein, the measurement report may be transmitted responsive to measured channel conditions of the third base station being better than measured channel conditions of the second base station.

In some examples of the method, apparatuses, and non-transitory computer-readable medium described herein, the reconfiguration message further includes a second handover message from the first base station to perform a second handover procedure with the third base station.

A method of wireless communication is described. The method may include establishing, at a first base station, a first connection with a UE, initiating a handover of the UE to a second base station, where the first connection with the first base station is maintained during the handover and an establishment of a second connection between the UE and the second base station, receiving a measurement report responsive to the initiating the handover, and modifying the handover of the UE based on the measurement report.

An apparatus for wireless communication is described. The apparatus may include a processor, memory in electronic communication with the processor, and instructions stored in the memory. The instructions may be executable by the processor to cause the apparatus to establish, at a first base station, a first connection with a UE, initiate a handover of the UE to a second base station, where the first connection with the first base station is maintained during the handover and an establishment of a second connection between the UE and the second base station, receive a measurement report responsive to the initiating the handover, and modify the handover of the UE based on the measurement report.

Another apparatus for wireless communication is described. The apparatus may include means for establishing, at a first base station, a first connection with a UE, initiating a handover of the UE to a second base station, where the first connection with the first base station is maintained during the handover and an establishment of a second connection between the UE and the second base station, receiving a measurement report responsive to the initiating the handover, and modifying the handover of the UE based on the measurement report.

A non-transitory computer-readable medium storing code for wireless communication is described. The code may include instructions executable by a processor to establish, at a first base station, a first connection with a UE, initiate a handover of the UE to a second base station, where the first connection with the first base station is maintained during the handover and an establishment of a second connection between the UE and the second base station, receive a measurement report responsive to the initiating the handover, and modify the handover of the UE based on the measurement report.

Some examples of the method, apparatuses, and non-transitory computer-readable medium described herein may further include operations, features, means, or instructions for transmitting a handover indication to the second base station, receiving, from the second base station prior to receiving the measurement report, a role switch indication that indicates that a second connection between the UE and the second base station is a primary connection of the UE and the first connection is a secondary connection, and where the modifying the handover of the UE includes reconfiguring the first connection to be the primary connection and the second connection to be the secondary connection based on the measurement report.

Some examples of the method, apparatuses, and non-transitory computer-readable medium described herein may further include operations, features, means, or instructions for receiving one or more additional measurement reports, and further reconfiguring the primary connection and the secondary connection based on the one or more additional measurement reports. In some examples of the method, apparatuses, and non-transitory computer-readable medium described herein, the measurement report may be transmitted responsive to the measured one or more channel conditions of the secondary connection being better than corresponding channel conditions of the primary connection.

Some examples of the method, apparatuses, and non-transitory computer-readable medium described herein may further include operations, features, means, or instructions for exchanging information with the second base station to establish duplication of data communicated with the UE via both the first connection and the second connection, and communicating duplicated data with the UE via the first connection.

Some examples of the method, apparatuses, and non-transitory computer-readable medium described herein may further include operations, features, means, or instructions for releasing the first connection after the second connection may have been a primary connection for a predetermined time period. In some examples of the method, apparatuses, and non-transitory computer-readable medium described herein, the modifying the handover of the UE may include operations, features, means, or instructions for transmitting, responsive to the measurement report, a reconfiguration message to the UE to abort the handover procedure with the second base station. In some examples of the method, apparatuses, and non-transitory computer-readable medium described herein, the modifying the handover of the UE further may include operations, features, means, or instructions for transmitting an indication to the second base station that the handover of the UE to the second base station may be aborted.

In some examples of the method, apparatuses, and non-transitory computer-readable medium described herein, the measurement report may be transmitted responsive to measured channel conditions of a third base station being better than measured channel conditions of the second base station.

In some examples of the method, apparatuses, and non-transitory computer-readable medium described herein, the reconfiguration message further includes a second handover message to the UE to perform a second handover procedure with a third base station.

A method of wireless communication is described. The method may include receiving, at a second base station from a first base station, a handover message to initiate a handover of a UE from the first base station to the second base station, establishing a second connection with the UE responsive to the handover message, receiving a measurement report from the UE that includes one or more channel measurements associated with the first base station and the second base station, and modifying the handover of the UE based on the measurement report.

An apparatus for wireless communication is described. The apparatus may include a processor, memory in electronic communication with the processor, and instructions stored in the memory. The instructions may be executable by the processor to cause the apparatus to receive, at a second base station from a first base station, a handover message to initiate a handover of a UE from the first base station to the second base station, establish a second connection with the UE responsive to the handover message, receive a measurement report from the UE that includes one or more channel measurements associated with the first base station and the second base station, and modify the handover of the UE based on the measurement report.

Another apparatus for wireless communication is described. The apparatus may include means for receiving, at a second base station from a first base station, a handover message to initiate a handover of a UE from the first base station to the second base station, establishing a second connection with the UE responsive to the handover message, receiving a measurement report from the UE that includes one or more channel measurements associated with the first base station and the second base station, and modifying the handover of the UE based on the measurement report.

A non-transitory computer-readable medium storing code for wireless communication is described. The code may include instructions executable by a processor to receive, at a second base station from a first base station, a handover message to initiate a handover of a UE from the first base station to the second base station, establish a second connection with the UE responsive to the handover message, receive a measurement report from the UE that includes one or more channel measurements associated with the first base station and the second base station, and modify the handover of the UE based on the measurement report.

Some examples of the method, apparatuses, and non-transitory computer-readable medium described herein may further include operations, features, means, or instructions for transmitting, to the first base station prior to receiving the measurement report, a role switch indication that indicates that a second connection between the UE and the second base station is a primary connection of the UE and a first connection between the IE and the first base station is a secondary connection, and where the modifying the handover of the UE includes reconfiguring the first connection to be the primary connection and the second connection to be the secondary connection based on the measurement report.

Some examples of the method, apparatuses, and non-transitory computer-readable medium described herein may further include operations, features, means, or instructions for receiving one or more additional measurement reports, and further reconfiguring the primary connection and the secondary connection based on the one or more additional measurement reports. In some examples of the method, apparatuses, and non-transitory computer-readable medium described herein, the measurement report may be transmitted by the UE responsive to the measured one or more channel conditions of the secondary connection being better than corresponding channel conditions of the primary connection.

Some examples of the method, apparatuses, and non-transitory computer-readable medium described herein may further include operations, features, means, or instructions for exchanging information with the first base station to establish duplication of data communicated with the UE via both the first connection and the second connection, and communicating duplicated data with the UE via the second connection.

Some examples of the method, apparatuses, and non-transitory computer-readable medium described herein may further include operations, features, means, or instructions for releasing the second connection after the first connection has been a primary connection for a predetermined time period.

A method of wireless communication is described. The method may include establishing, at a first base station, a first connection with a UE, initiating a handover of the UE to a second base station, where the first connection with the first base station is maintained during the handover and an establishment of a second connection between the UE and the second base station, and receiving, from the second base station, a role switch indication that indicates that the second connection between the UE and the second base station is a primary connection of the UE.

An apparatus for wireless communication is described. The apparatus may include a processor, memory in electronic communication with the processor, and instructions stored in the memory. The instructions may be executable by the processor to cause the apparatus to establish, at a first base station, a first connection with a UE, initiate a handover of the UE to a second base station, where the first connection with the first base station is maintained during the handover and an establishment of a second connection between the UE and the second base station, and receive, from the second base station, a role switch indication that indicates that the second connection between the UE and the second base station is a primary connection of the UE.

Another apparatus for wireless communication is described. The apparatus may include means for establishing, at a first base station, a first connection with a UE, initiating a handover of the UE to a second base station, where the first connection with the first base station is maintained during the handover and an establishment of a second connection between the UE and the second base station, and receiving, from the second base station, a role switch indication that indicates that the second connection between the UE and the second base station is a primary connection of the UE.

A non-transitory computer-readable medium storing code for wireless communication is described. The code may include instructions executable by a processor to establish, at a first base station, a first connection with a UE, initiate a handover of the UE to a second base station, where the first connection with the first base station is maintained during the handover and an establishment of a second connection between the UE and the second base station, and receive, from the second base station, a role switch indication that indicates that the second connection between the UE and the second base station is a primary connection of the UE.

In some examples of the method, apparatuses, and non-transitory computer-readable medium described herein, the initiating the handover may include operations, features, means, or instructions for configuring one or more secondary node (SN) terminated bearers at the second base station for the second connection, and transmitting a reconfiguration message to the UE that indicates the handover to the second base station.

In some examples of the method, apparatuses, and non-transitory computer-readable medium described herein, the initiating the handover further may include operations, features, means, or instructions for transmitting a role switch request to the second base station, and receiving an acknowledgment of the role switch request from the second base station. In some examples of the method, apparatuses, and non-transitory computer-readable medium described herein, the role switch request may be transmitted with a SN addition request to the second base station, and the acknowledgment of the role switch request may be received with a SN addition acknowledgment from the second base station. In some examples of the method, apparatuses, and non-transitory computer-readable medium described herein, the reconfiguration message to the UE indicates a secondary carrier group associated with the second connection and a source cell group identification associated with the first connection. In some examples of the method, apparatuses, and non-transitory computer-readable medium described herein, the role switch indication may be received subsequent to performance of a random access procedure between the second base station and the UE. Some examples of the method, apparatuses, and non-transitory computer-readable medium described herein may further include operations, features, means, or instructions for releasing the first connection with the UE responsive to the role switch indication.

In some examples of the method, apparatuses, and non-transitory computer-readable medium described herein, the releasing the first connection further may include operations, features, means, or instructions for transmitting a secondary node (SN) status transfer message to the second base station to indicate completion of the role switch. Some examples of the method, apparatuses, and non-transitory computer-readable medium described herein may further include operations, features, means, or instructions for receiving data associated with the UE during the handover, and forwarding the received data to the second base station.

Some examples of the method, apparatuses, and non-transitory computer-readable medium described herein may further include operations, features, means, or instructions for configuring the UE to maintain the first connection during the handover and to use the first connection for transmitting and receiving data while the second connection is established.

A method of wireless communication is described. The method may include receiving, at a second base station from a first base station, a handover message to initiate a handover of a UE from the first base station to the second base station, establishing a second connection with the UE responsive to the handover message, and transmitting, responsive to the establishing the second connection, a role switch indication to the first base station that indicates that the second connection between the UE and the second base station is a primary connection of the UE.

An apparatus for wireless communication is described. The apparatus may include a processor, memory in electronic communication with the processor, and instructions stored in the memory. The instructions may be executable by the processor to cause the apparatus to receive, at a second base station from a first base station, a handover message to initiate a handover of a UE from the first base station to the second base station, establish a second connection with the UE responsive to the handover message, and transmit, responsive to the establishing the second connection, a role switch indication to the first base station that indicates that the second connection between the UE and the second base station is a primary connection of the UE.

Another apparatus for wireless communication is described. The apparatus may include means for receiving, at a second base station from a first base station, a handover message to initiate a handover of a UE from the first base station to the second base station, establishing a second connection with the UE responsive to the handover message, and transmitting, responsive to the establishing the second connection, a role switch indication to the first base station that indicates that the second connection between the UE and the second base station is a primary connection of the UE.

A non-transitory computer-readable medium storing code for wireless communication is described. The code may include instructions executable by a processor to receive, at a second base station from a first base station, a handover message to initiate a handover of a UE from the first base station to the second base station, establish a second connection with the UE responsive to the handover message, and transmit, responsive to the establishing the second connection, a role switch indication to the first base station that indicates that the second connection between the UE and the second base station is a primary connection of the UE.

In some examples of the method, apparatuses, and non-transitory computer-readable medium described herein, the receiving the handover message further may include operations, features, means, or instructions for receiving an indication from the first base station to configure one or more secondary node (SN) terminated bearers at the second base station for the second connection. In some examples of the method, apparatuses, and non-transitory computer-readable medium described herein, the receiving the handover message further may include operations, features, means, or instructions for receiving a role switch request from the first base station that indicates the second connection with the UE is to be the primary connection of the UE, and transmitting an acknowledgment of the role switch request to the first base station.

In some examples of the method, apparatuses, and non-transitory computer-readable medium described herein, the role switch request may be received with a SN addition request from the first base station, and the acknowledgment of the role switch request may be transmitted with a SN addition acknowledgment to the first base station.

In some examples of the method, apparatuses, and non-transitory computer-readable medium described herein, the establishing a second connection with the UE may include operations, features, means, or instructions for performing a random access procedure with the UE to establish the second connection. In some examples of the method, apparatuses, and non-transitory computer-readable medium described herein, the role switch indication may be transmitted after the performing the random access procedure.

Some examples of the method, apparatuses, and non-transitory computer-readable medium described herein may further include operations, features, means, or instructions for receiving, from the first base station responsive to the role switch indication, a secondary node (SN) status transfer message, and transmitting an indication to the UE to release a first connection with the first base station. Some examples of the method, apparatuses, and non-transitory computer-readable medium described herein may further include operations, features, means, or instructions for receiving, from the first base station, data associated with the UE that is received at the first base station during the handover.

DETAILED DESCRIPTION

Figure 1:
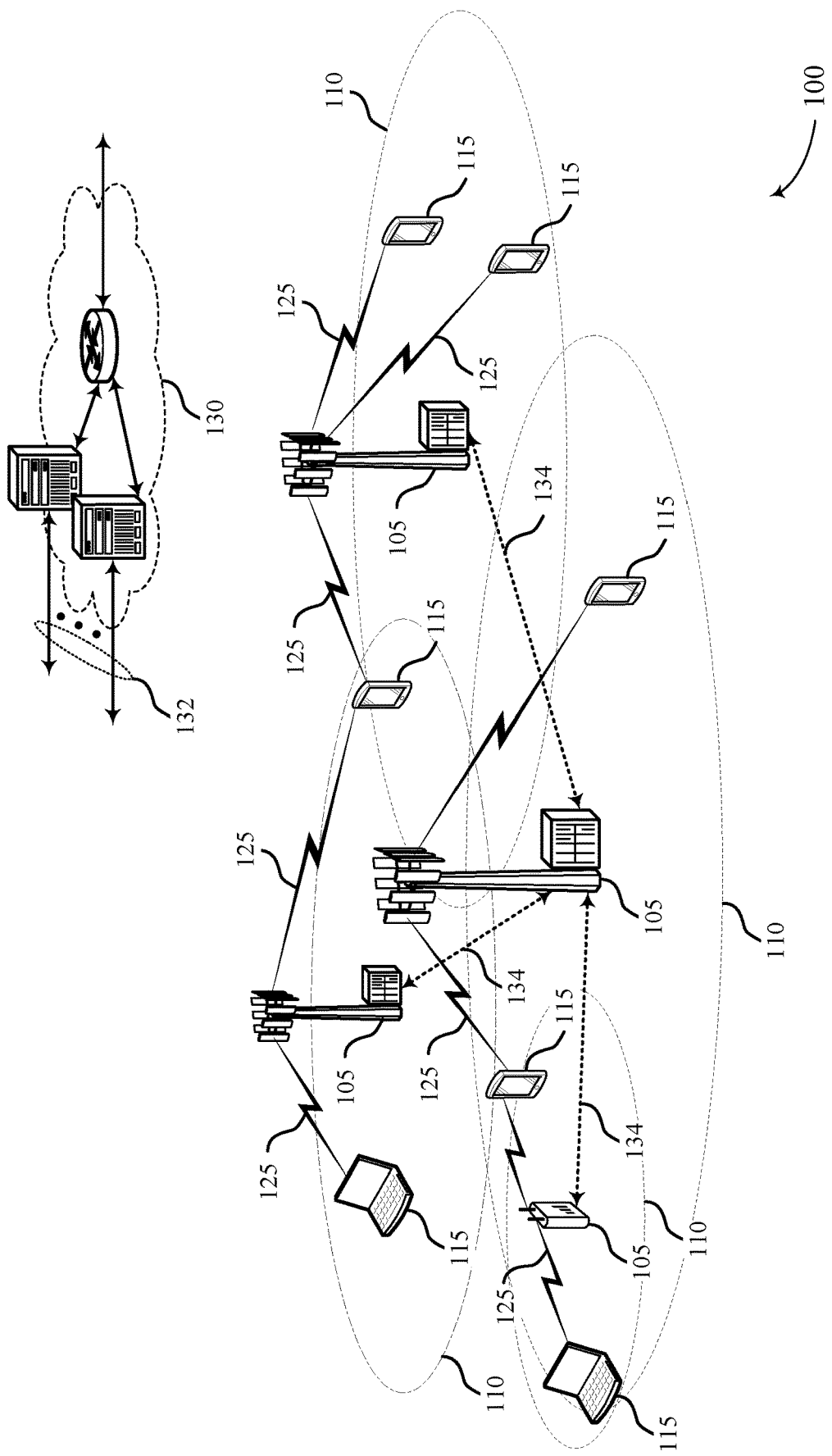
FIG. 1 illustrates an example of a system for wireless communications that supports handover techniques in wireless communications in accordance with aspects of the present disclosure.

Various aspects of the present disclosure provide enhanced techniques for handover in a wireless communications system. In some cases, a user equipment (UE) may establish a first connection with a first base station, which may be referred to as a source base station. The UE may receive a handover message, such as a radio resource control (RRC) reconfiguration message to establish a second connection with a second base station, which may be referred to as a target base station. In some cases, the handover of the UE from the source base station to the target base station may be triggered by a measurement report from the UE that indicates channel conditions at the source base station and target base station that meet handover criteria. In some cases, the UE may maintain the first connection while the second connection is established, according to a dual-connectivity (DC) handover technique or a make-before-break handover technique. Such a DC or make-before-break handover technique may allow the UE to remain in a RRC connected state with one base station during the handover procedure, and may support a zero millisecond or almost zero millisecond handover interruption.

In various aspects of the disclosure, described techniques provide that a handover may be performed based on one or more conditions at a UE in conjunction with the handover procedure. In some cases, the one or more conditions at the UE may be associated with successful establishment or maintenance of the second connection, or one or more measurements made at the UE in conjunction with the handover. In some cases, for example, the UE may be unable to establish the second connection, or the second connection may be established and then fail shortly afterward. In such cases, the UE may report a radio link failure to the source base station, and maintain the first connection. In some cases, the source base station may discontinue the handover and initiate a new handover procedure at the UE to a different neighboring base station.

In some aspects of the disclosure, a UE may perform a measurement as part of a handover, and the handover may be modified based at least in part on the measurement. For example, the measurement may be performed after establishment of the second connection at the target base station, where the second connection is a primary connection and the first connection is a secondary connection. In such cases, the source and target base stations may perform a role switch based on the measurement (e.g., when the measurement indicates the first connection has better channel conditions than the second connection) to change the first connection to be the primary connection and the second connection to be the secondary connection. In some cases, two or more role switches may be performed based on multiple measurements provided by the UE in accordance with a ping-pong handling procedure, until one of the connections remains the primary connection for a predetermined time period.

In some cases, the UE may perform the measurement as part of a random access procedure with the target base station and may measure channel quality of one or more neighboring base stations. In such cases, the UE may transmit the measurement to the source base station in the event that a neighboring base station has a channel quality that exceeds a threshold. The source base station, based at least in part on the measurement, may cancel the handover to the second base station and initiate a handover with the neighboring base station.

In some cases, a second connection with the target base station may be established using a dual connectivity (DC) technique, in which the first connection is changed to a secondary connection and the newly established second connection is set as a primary connection. In such cases, the source base station may switch the first connection to be a secondary connection responsive to a role switch communication with the target base station. In some cases, a role switch request may be combined with a handover request to the target base station and an associated acknowledgment from the target base station may include a role switch request acknowledgment, and the target base station may transmit a role switch setup complete upon establishment of the second connection that triggers the switch of the first connection to be a secondary connection.

Such techniques may provide for enhanced reliability and efficiency in handovers, and may provide 0 ms or almost 0 ms interruption handovers. Such techniques may allow for a UE to remain in an RRC connected state and allow to UE to transmit or receive communications during a handover procedure. Such connectivity may allow for enhanced communications that may have relatively strict latency and/or reliability requirements (e.g., ultra-reliable low latency communications (URLLC)) during UE mobility. Further, in some cases, a primary and secondary connection at the UE may be switched on one or more occasions during a handover procedure, which may allow communications on a relatively reliable connection, which may enhance overall reliability of communications. Additionally, in some cases a UE may measure one or more channel conditions that may allow for relatively fast handover to a more preferable base station, and thus further enhance network reliability.

Aspects of the disclosure are initially described in the context of a wireless communications system. Handover techniques in accordance with various examples and then discussed. Aspects of the disclosure are further illustrated by and described with reference to apparatus diagrams, system diagrams, and flowcharts that relate to handover techniques in wireless communications.

FIG. 1 illustrates an example of a wireless communications system 100 that supports handover techniques in wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. UEs 115 may move within the wireless communications system, and may perform handovers between different base stations 105 in accordance with one or more handover techniques as discussed herein.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates, or may refer to a radio head or distributed unit (DU) and a base station 105 may control one or more cells.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC) or centralized unit (CU). Each access network entity may communicate with UEs 115 through a number of other access network transmission entities, which may be referred to as a radio head, a smart radio head, a transmission/reception point (TRP), or a distributed unit (DU). In some configurations, various functions of each access network entity or base station 105 may be distributed across various network devices (e.g., radio heads and access network controllers) or consolidated into a single network device (e.g., a base station 105). For example, a CU may control two or more DUs, which may each be associated with a different cell.

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, a UE 115 may perform a handover procedure from a source base station 105 to a target base station 105 when moving within the wireless communications system. In some cases, such a handover may be performed in accordance with one or more handover techniques provided herein that may provide a 0 ms or almost 0 ms interruption handover at the UE 115.

Figure 2:
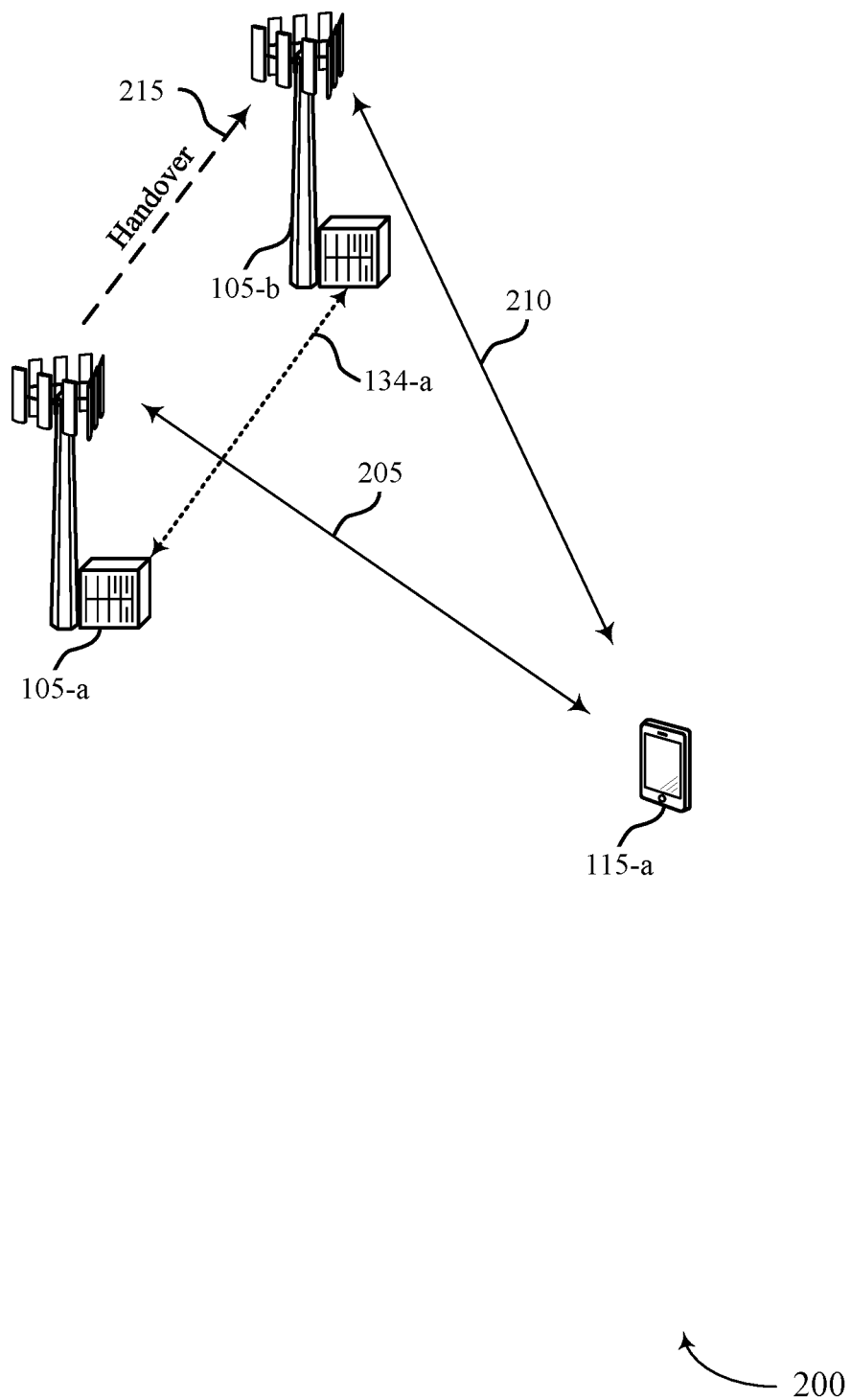
FIG. 2 illustrates an example of a wireless communications system that supports handover techniques in wireless communications in accordance with aspects of the present disclosure.

FIG. 2 illustrates an example of a wireless communications system 200 that supports handover techniques in wireless communications in accordance with aspects of the present disclosure. In some examples, wireless communications system 200 may implement aspects of wireless communications system 100. In some examples, wireless communications system 200 may implement aspects of wireless communications system 100. The wireless communications system 200 may include a first base station 105-*a*, a second base station 105-*b*, and UE 115-*a*, which may be examples of a base station 105 and a UE 115, as described with reference to FIG. 1.

First base station 105-*a* may be a source base station 105 and the second base station 105-*b* may be a target base station 105 in a handover 215 of the UE 115-*a* from the first base station 105-*a* to the second base station 105-*b*. First base station 105-*a* and second base station 105-*b* may be in communication with each other, such as via backhaul link 134-*a* (e.g., via an X2, Xn, or other interface), which may be a wired or wireless interface. While the example of FIG. 2 shows the first base station 105-*a* in direct communication with the second base station 105-*b*, in other cases the communication may be indirect, such as via a core network (e.g., core network 130 or FIG. 1). In this example, the UE 115-*a* and the first base station 105-*a* may establish a first connection 205. In the event that a handover is triggered, the UE 115-*a* may establish a second connection 210 with the second base station 105-*b*. Various techniques as discussed herein provide for efficient handovers that may provide zero ms or almost 0 ms interruptions in the handover 215 of the UE 115-*a*.

In some traditional systems, when performing a handover 215 from the first base station 105-*a* to the second base station 105-*b*, the UE 115-*a* may release the first connection 205 and perform a connection establishment procedure (e.g., a random access procedure) to establish the second connection 210. In such cases, in the event that data is to be communicated with the UE 115-*a*, there may be an interruption in connectivity with the UE 115-*a* after the first connection 205 is released and until the second connection 210 is established. When performing a 0 ms or almost 0 ms handover, such an interruption is eliminated or almost eliminated, and thus connectivity with the UE 115-*a* is enhanced.

In some cases, the handover 215 of the UE 115-*a* from the first base station 105-*a* to the second base station 105-*b* may be a make-before-break handover in which the UE 115-*a* may have a capability to simultaneously transmit and receive communications, and the UE 115-*a* may maintain the first connection 205 while the second connection 210 is being established. In other cases, the handover 215 of the UE 115-*a* may be a dual-connectivity (DC) handover, in which the UE 115-*a* has a capability of maintaining multiple connections with multiple cells and the second connection 210 is established according to a DC procedure before the first connection 205 is released. In some cases, a serving base station 105 (e.g., first base station 105-*a*) may identify a capability of the UE 115-*a* for maintaining multiple connections during a handover, such as, for example, based on a capability indication transmitted by the UE 115-*a*, or a UE category indicated by the UE 115-*a*, during a connection establishment procedure to establish the first connection 205. Based on the UE 115-*a* capability, the first base station 105-*a* may configure the UE 115-*a* to perform a make-before-break handover or a DC handover (e.g., via radio resource control (RRC) signaling).

In some cases, the first base station 105-*a* may determine that the UE 115-*a* is to be handed over to the second base station 105-*b* (e.g., based on a measurement report provided by the UE 115-*a*). Based on such a determination, the first base station 105-*a* may transmit a RRC reconfiguration to the UE 115-*a* that may indicate that UE 115-*a* is to perform a make-before-break handover procedure (or DC handover procedure) with the second base station 105-*b* using a simultaneous transmit and receive capability of UE 115-*a*. In such a case, UE 115-*a* may determine that the first connection 205 is to be maintained with the first base station 105-*a* while establishing the second connection 210 with the second base station 105-*b*. For example, UE 115-*a* may perform a random access procedure with the second base station 105-*b* (e.g., to initiate and establish a connection with the second base station 105-*b*). In some aspects, UE 115-*a* can continue to exchange user data (e.g., uplink/downlink user data) via the first base station 105-*a* during and after the random access procedure. In some cases, after establishment of the second connection 210, the first connection 205 may be released. Various techniques for such handovers that provide for enhanced connectivity and efficiency are described herein.

Figure 3:
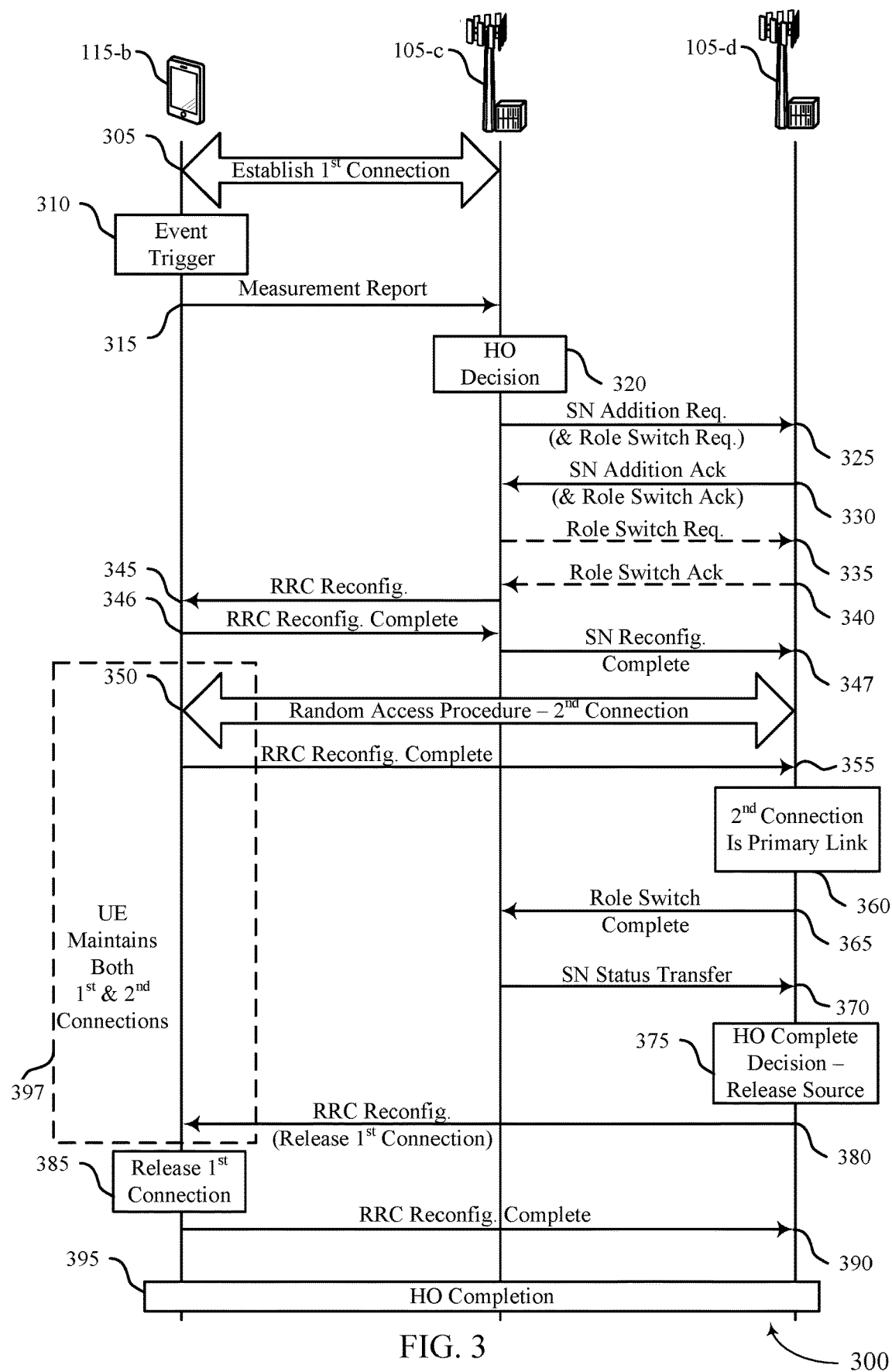
FIG. 3 illustrates an example of a process flow that supports handover techniques in wireless communications in accordance with aspects of the present disclosure.

FIG. 3 illustrates an example of a process flow 300 that supports handover techniques in wireless communications in accordance with aspects of the present disclosure. The process flow 300 may include a first base station 105-*c*, a second base station 105-*d*, and a UE 115-*b*, which may be examples of the corresponding devices described with reference to FIGS. 1 and 2. In some examples, the process flow 300 may implement aspects of the wireless communications system 100 and 200. For example, the first base station 105-*c*, the second base station 105-*d*, and the UE 115-*b*, may support 0 ms or almost 0 ms interruption handovers.

In the following description of the process flow 300, the operations between the first base station 105-*c*, second base station 105-*d*, and the UE 115-*b* may be transmitted in a different order than the exemplary order shown, or the operations performed by the base stations 105 and the UE 115-*b* may be performed in different orders or at different times. Certain operations may also be left out of the process flow 300, or other operations may be added to the process flow 300.

In this example a handover between the first base station 105-*c* and the second base station 105-*d* (which may be referred to as a source and a target, respectively) is an inter-CU handover, using a DC handover, in which both the first base station 105-*c* and the second base station 105-*d* are associated with a different CU.

In some examples, the process flow 300 may commence at 305 with the first base station 105-*c* establishing a first connection with the UE 115-*b* (e.g., performing a cell acquisition procedure, a random access procedure, an RRC connection procedure, an RRC configuration procedure, etc.).

At 310, an event trigger may occur that may cause the UE 115-*b* to perform a measurement procedure. Such a measurement procedure may include, for example, signal measurements of neighboring base stations by the UE 115-*b* to identify one or more neighboring base stations that may be candidates for the handover procedure. In some cases, the event trigger may be a signal measurement (e.g., a reference signal received power (RSRP)) of the first base station 105-*c* dropping below a threshold value, may be a time-based periodic event, or combinations thereof. At 315, the UE 115-c may transmit measurement report to the first base station 105-c, and the measurement report may indicate that the second base station 105-d is a candidate base station for a handover.

At 320, the first base station may make a handover decision to handover the UE 115-b from the first base station 105-c to the second base station 105-d. In some cases, the first base station 105-c may make the handover decision based on the measurement report provided by the UE 115-b, one or more threshold values for initiating a handover, a differential in one or more signal measurements from one or more prior measurement reports, one or more measurement reports from other UEs, or any combinations thereof. In the example of FIG. 3, the first base station 105-c may determine that the UE 115-b is to be handed over to the second base station 105-d. Further, the first base station 105-c may determine that the UE 115-b has a DC capability and may make a decision to perform a DC based handover of the UE 115-b. For example, the first base station 105-c (or an associated CU) may select from possible handover procedures that may be performed by UE 115-b based at least in part on the indicated capability of UE 115-b. In the example of FIG. 3, the first base station 105-c may select an DC handover procedure for UE 115-b based at least in part on UE 115-b indicating a DC capability. In other examples, the first base station 105-c may select a make-before-break handover procedure or a different handover procedure (e.g., a legacy handover procedure), and different operations associated with the selected handover procedure may be performed.

At 325, the first base station 105-c may transmit a secondary node (SN) addition request to the second base station 105-d. The SN addition request may be provided based on the DC handover decision, in order to establish a DC connection between both the first base station 105-c and the second base station 105-d and the UE 115-b. The initial connection between the first base station 105-c and the UE 115-b in such cases is a master node (MN) connection and the second base station 105-d may be added initially as a SN based on the SN addition request. At 330, the second base station 105-d may transmit a SN addition acknowledgment to the first base station 105-c to acknowledge that the second base station 105-d received, and that may indicate an ability to serve UE 115-b after the handover procedure.

In some examples, at 335, the first base station 105-c may transmit a role switch request to the second base station 105-d. The role switch request may indicate that the second base station 105-d is to switch to be the master node in the DC connection with the UE 115-b once the connection between the UE 115-b and the second base station is established, and the first base station 105-c is to switch to be the SN connection. The second base station 105-d may receive the role switch request and identify that the UE 115-b is to be handed over to the second base station 105-d, and transmit a role switch acknowledgment at 340.

In some cases, the role switch request may be combined with the SN addition request, and the role switch acknowledgment may be combined with the SN addition acknowledgment. In such cases, signaling between the first base station 105-c and the second base station 105-d may be reduced. Thus, in the example of FIG. 3, the role switch request at 335 and the role switch acknowledgment at 340 are shown as optional operations, and may be skipped in cases where the SN addition request at 325 also includes the role switch request, and the SN addition acknowledgment at 330 also includes the role switch acknowledgment.

At 345, the first base station 105-c may transmit a RRC reconfiguration message to the UE 115-b. The RRC reconfiguration message may indicate to the UE 115-b that a connection with the second base station 105-d is to be established according to a DC connection establishment procedure. For example, the RRC reconfiguration may indicate that UE 115-b is to perform DC handover procedure with second base station 105-d using the DC capability of UE 115-b. In some aspects, the RRC reconfiguration can include information identifying second base station 105-d, information identifying a handover configuration, identifying a DC configuration, or combinations thereof. For example, in some cases, the RRC reconfiguration message may provide an indication of a secondary cell group associated with the second base station 105-d that is to be configured as part of the DC based handover, and also indicate the source cell group identification of the first base station 105-c. In some cases, the operations at 310 through 345 may be referred to as a phase-I handover preparation portion of a handover.

Following the transmission of the RRC reconfiguration at 345 and until a second connection with the second base station 105-d is established, downlink data that is to be transmitted to the UE 115-b may be provided to the first base station 105-c (e.g., from a user plane function (UPF) at the core network), and the first base station 105-c may transmit the downlink data to the UE 115-b via the first connection. Similarly, uplink data transmitted from the UE 115-b may be transmitted to the first base station 105-c via the first connection. In some cases, the first base station 105-c may forward downlink user data to the second base station 105-d.

In some cases, at 346, the UE 115-b may configure a SN based on the RRC reconfiguration based on a DC connection procedure, and may transmit an RRC reconfiguration complete indication to the first base station 105-c to indicate that the second connection is being established. During the establishment of the second connection with the second base station 105-d, the UE 115-b may maintain the first connection with the first base station 105-c, and thus have an active established connection during the handover, as indicated at 397. As part of the DC connection procedure, at 347, the first base station 105-c may transmit a SN reconfiguration complete indication to the second base station 105-d that may indicate that the UE 115-b is configuring the second connection.

At 350, the UE 115-b and the second base station 105-d may perform a random access procedure to establish the second connection with the second base station 105-d. The random access procedure may be performed according to established random access procedures (e.g., random access channel (RACH) procedures that are established in LTE or NR). Upon completion of the random access procedure and establishment of the second connection, the UE 115-b may, at 355, transmit a RRC reconfiguration complete indication to the second base station 105-d. At this point, the second base station 105-d may be the master node in the DC connection with both the first base station 105-c and second base station 105-d, and thus the second connection is the primary link as indicated at 360. In some cases, the UE 115-b may transmit a PDCP status transfer and uplink user data to the second base station 105-d via the second connection. In some aspects, after the RRC reconfiguration is complete, UE 115-b may perform uplink user/control plane duplication with first base station 105-c. For example, control plane data may be duplicated and shared between the first base station 105-c and the second base station 105-d. Accordingly, UE 115-b may achieve improved reliability when receiving the data on the downlink. In some cases, the operations at 350 through 360 may be referred to as a phase-II handover execution portion of a handover.

At 365, the second base station 105-d may transmit a role switch complete indication to the first base station 105-c. In some cases, the role switch complete indication may provide an indication to the first base station 105-c (e.g., via an Xn backhaul link) that the second connection has been established with the UE 115-b, and that signaling radio bearers (SRBs) and data radio bearers (DRBs) have been established in the second connection.

At 370, the first base station 105-c may transmit a SN status transfer to the second base station 105-d. The SN status transfer may provide the most up to date PDCP status and downlink sequence number to use, for example. The SN status transfer may also indicate to the second base station 105-d that the first connection with the first base station 105-c may be released in accordance with the DC handover procedure.

At 375, the second base station 105-d may make a handover complete decision and determine that the source first connection with the first base station 105-c may be released. At 380, the second base station 105-d, responsive to determining that the handover is complete, may transmit a RRC reconfiguration to the UE 115-b to release the first connection with the first base station 105-c. In some cases, the second base station 105-d may provide a handover completion indication to a UPF in the core network. Additionally or alternatively, the second base station 105-d may transmit a PDCP status transfer to the UE 115-b.

At 385, the UE 115-b may release the first connection with the first base station 105-c. The UE 115-b may release the first connection, for example, by removing DRBs and SRBs associated with the first base station 105-c, and PDCP status and sequence numbers associated with the first connection. At 390, the UE 115-b may transmit a RRC reconfiguration complete indication to the second base station 105-d to indicate that the first connection has been released.

At 395, responsive to the indication that the first connection is released handover completion may be performed. In some cases, as part of the handover completion, the second base station 105-d may transmit a path switch request to an access and mobility function (AMF) of the core network, and the AMF and UPF may perform a path switch related to core network internal signaling to provide the actual downlink path used to the UPF for subsequent downlink data transmissions. Further, in some cases, in the event that the first base station 105-c received fresh downlink data for the UE 115-b prior to the path switch at the UPF, the first base station 105-c may transmit the fresh downlink data to the second base station 105-d for downlink transmission to the UE 115-b. In some cases, the AMF may provide an end marker to the first base station 105-c to indicate that the downlink path has been changed to the second base station 105-d, and the first base station 105-c may provide an indication to the second base station 105-d that the end marker has been received. In some cases, the AMF may provide a path switch request acknowledgment to the second base station 105-d. Following the path switch acknowledgment, the second base station 105-d may transmit a UE context release command to the first base station 105-c, and the first base station 105-c may release UE context for the first connection and transmit a UE context release complete back to the second base station 105-d. In some cases, the operations at 365 through 395 may be referred to as a phase-III handover completion portion of a handover.

In some aspects, UE 115-b may use a dual protocol stack, which includes a source protocol stack for communicating with first base station 105-c and a target protocol stack for communicating with second base station 105-d. Each of these protocol stacks may include a packet data convergence protocol (PDCP) layer, a radio link control (RLC) layer, a medium access control (MAC) layer, and/or a physical (PHY) layer. In some aspects, the source protocol stack and the target protocol stack may share one or more layers, such as a PDCP layer. In some aspects, the target protocol stack may be used for uplink data transmissions. An example of protocol stacks used at UEs 115 and base stations 105 in various aspects of the disclosure is discussed with respect to FIG. 4.

Figure 4:
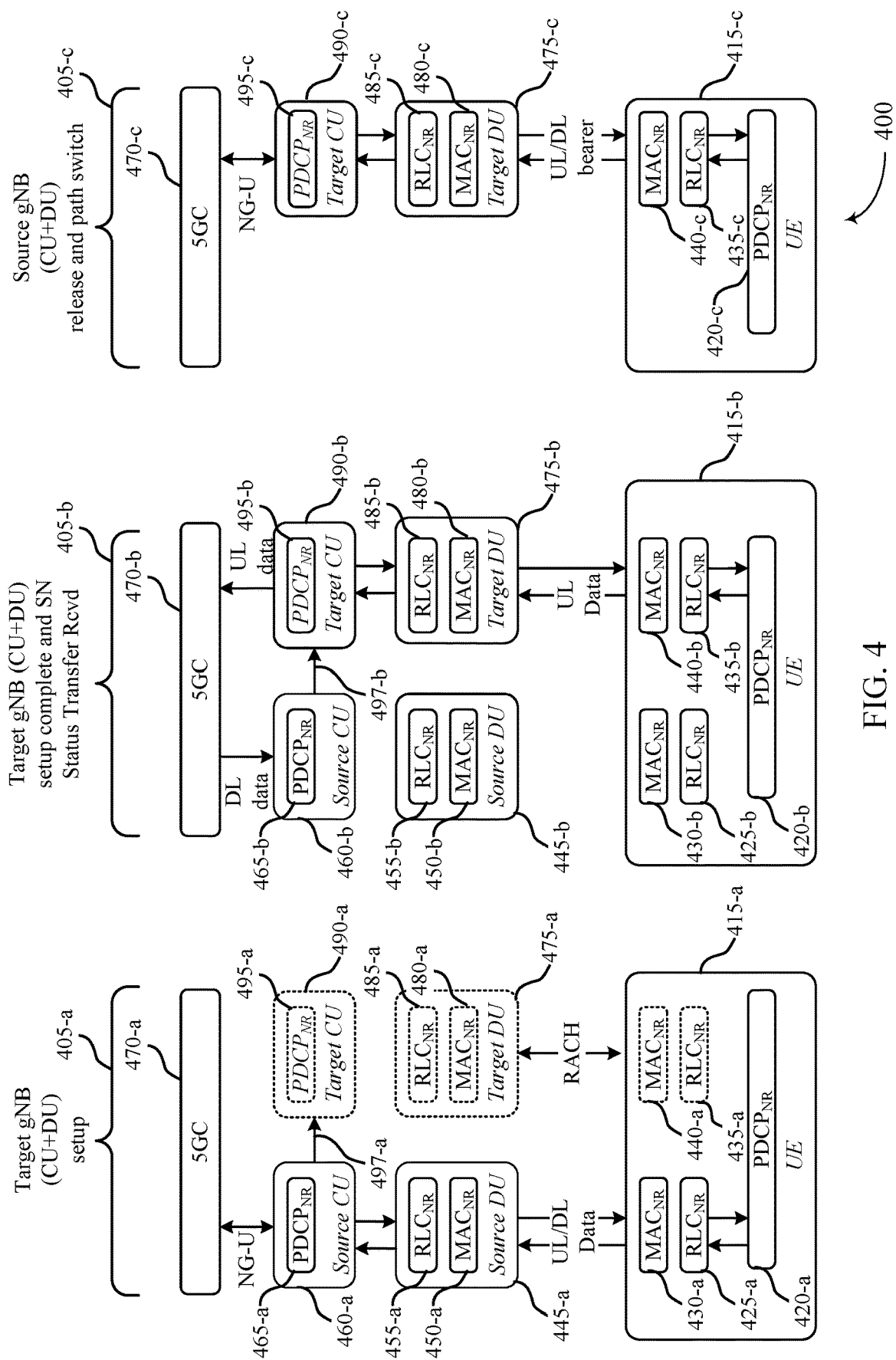
FIG. 4 illustrates an example of dual connectivity handover protocol stacks in wireless communications in accordance with aspects of the present disclosure.

FIG. 4 illustrates an example of dual connectivity handover protocol stacks 400 that supports handover techniques in wireless communications in accordance with aspects of the present disclosure. In some examples, dual connectivity handover 400 may implement aspects of wireless communications system 100 or 200. The example DC handover protocol stacks 400 show network protocol stack and data flow for a DC handover procedure (e.g., similar to the handover procedure described with respect to process flow 300 of FIG. 3).

In this example, a UE 415 may perform a DC handover between a source DU 445 and a target DU 475. The UE 415 may be an example of UEs 115 described herein, DUs 445 and 475 may be examples of DUs or base stations 105 described herein. In an initial setup phase 405-a in this example, a target gNB may include a target CU 490 and a target DU 475, and a source gNB may include a source CU 460 and source DU 445. The initial setup phase 405-a, which may correspond to the phase-I handover preparation phase, may provide setup at the target DU 475 and the target CU 490.

In this example, an inter-gNB-CU handover is illustrated, and during the initial setup phase 405-a the UE 415-a may use a source protocol stack for a first connection, which may include a PDCP layer 420-a, a radio link control (RLC) layer 425-a, and a medium access control layer 430-a, which the UE 415-a may use to communicate with a core network, such as a 5GC 470-a via a source CU 460-a having PDCP layer 465-a and source DU 445-a having MAC layer 450-a and RLC layer 455-a. The target gNB may configure the target DU 475-a with MAC layer 480-a and RLC layer 485-a, and may configure the target CU 490-a with PDCH layer 490-a, in preparation for the DC handover. The source DU 445-a may transmit a RRC reconfiguration to the UE 415-a (e.g., via a SRB), and the UE 415-a may configure a DC RLC layer 435-a and MAC layer 440-a in preparation for random access channel (RACH) transmissions as part of a random access procedure to establish a second connection with the target DU 475-a. In some cases, and the source CU 460-a may instruct the target CU 490-a (e.g., via an Xn backhaul interface 497-a) to configure the target protocol stack at the target CU 490-a and the target DU 475-a.

During a second SN status transfer phase 405-b, which may be an example of a phase-II handover execution phase, the target protocol stacks may be used for communications with UE 415-b. As illustrated in FIG. 4, the target DU 475-b may communicate uplink data with the UE 415-b via PDCP layer 420-b, RLC layer 435-b, and MAC layer 440-b. The target DU 475-b may have an active and established MAC layer 480-b and RLC layer 485-b, which may be used for communication with the UE 415-b and target CU 490-b that may have PDCP layer 495-b and may communicate with 5GC 470-b. In this example, the UE 415-b may maintain the protocol stack associated with the source DU 445-b, which may include PDCP layer 420-b, RLC layer 425-b, and MAC layer 430-b. Likewise, the source gNB may maintain MAC layer 450-b and RLC layer 455-b at source DU 445-b, as well as PDCP layer 465-b at source CU 460-b. In this example, uplink data may be transmitted using the target protocol stack, and downlink data may be forwarded via Xn backhaul interface 497-b from the source CU 460-b to the target CU 490-b for transmission to the UE 415-b. In some aspects, the UE 415-b, source CU 460-b, target CU 490-b, and/or 5GC 470-b may use different security keys corresponding to a same PDCP entity and/or may have different PDCP entities with a common reordering entity. In such cases, the UE 415-b may decide on a security key (e.g., one or more security keys from source CU 460-b or one or more security keys from a target CU 490-b) to use based on the RLC/MAC/PHY stack from which data is received on the downlink or based on an explicit indication in the PDCP PDU header that indicates which security key to use.

During a third source release and path switch phase 405-c, which may be an example of a phase-III handover completion phase, the target protocol stacks may be used for communications with UE 415-c. As illustrated in FIG. 4, the target DU 475-c may communicate uplink/downlink data with the UE 415-c via PDCP layer 420-c, RLC layer 435-c, and MAC layer 440-c. The target DU 475-c may have an active and established MAC layer 480-c and RLC layer 485-c, which may be used for communication with the UE 415-c and target CU 490-c that may have PDCP layer 495-c and may communicate with 5GC 470-c. In this example, the UE 415-c, the source DU 445-b and the source CU 460-b may release the corresponding source protocol stacks. The remaining protocol stacks would then become source protocol stacks in a subsequent handover procedure. It is noted that FIG. 4 is provided as an example, and that other example protocol stacks are possible and may differ from what was described with respect to FIG. 4.

Figure 5:
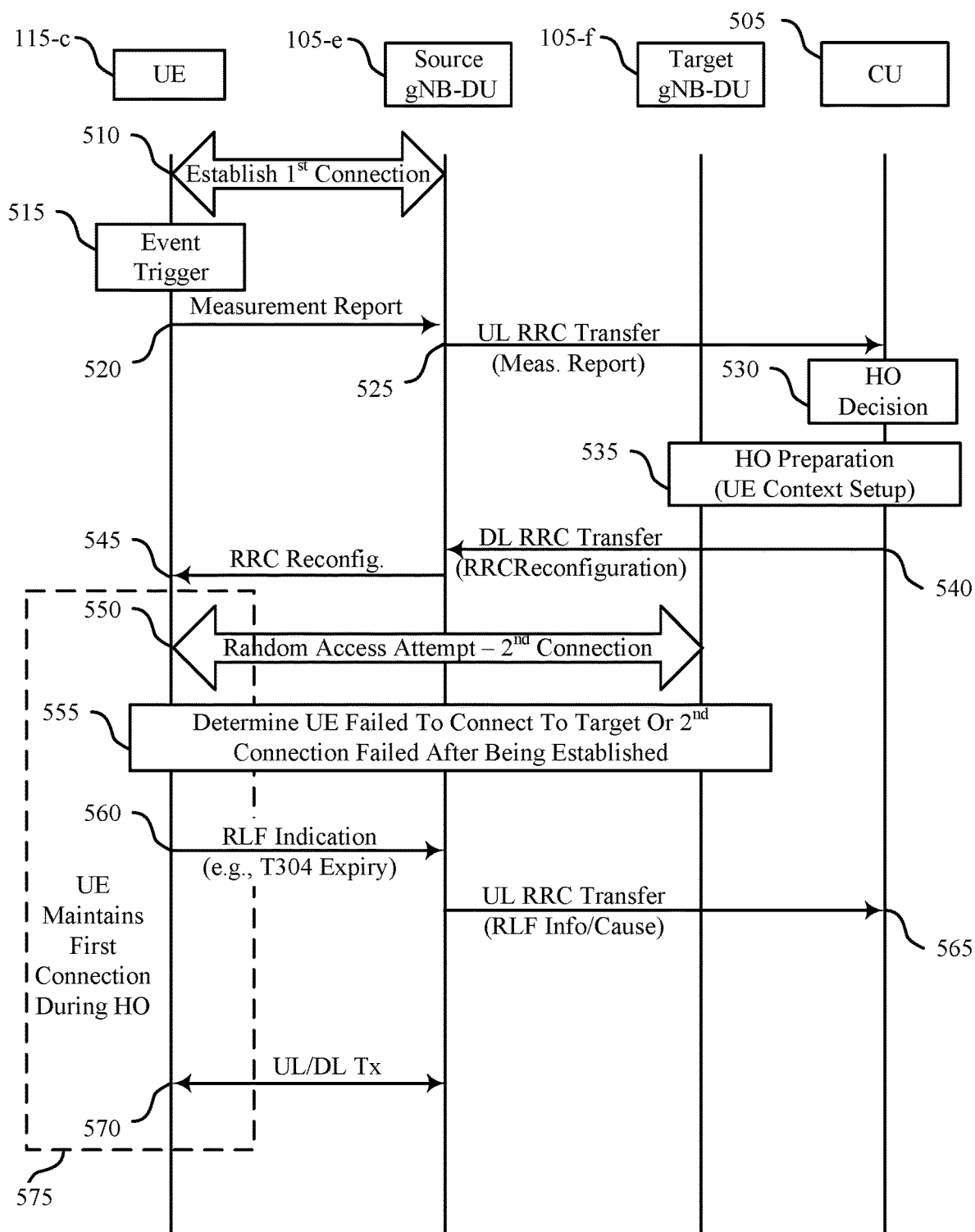
FIG. 5 illustrates an example of a process flow that supports handover techniques in wireless communications in accordance with aspects of the present disclosure.

FIG. 5 illustrates an example of a process flow 500 that supports handover techniques in wireless communications in accordance with aspects of the present disclosure. In some examples, process flow 500 may implement aspects of wireless communications system 100 or 200. As discussed herein, in some cases a UE or base station may experience radio link issues during a handover procedure. For example, a UE may experience fast fading of a signal from a source base station or target base station that may result in the associated signal being unusable by the UE. In such cases, if the UE can establish or maintain a connection with the other base station, an indication of the link failure may be provided as part of the handover procedure.

The process flow 500 may include a source gNB DU 105-e, a target gNB DU 105-f, a CU 505, and a UE 115-c. Source gNB DU 105-e and target gNB DU 105-f may be examples of DU, a TRP, or a generally a base station 105 as described herein. UE 115-c may be an example of corresponding UE devices described herein, and CU 505 may be an example of a CU, an ANC, or generally a base station 105 as described herein. In some examples, the process flow 500 may implement aspects of the wireless communications system 100 and 200. For example, the source gNB DU 105-e, the target gNB DU 105-f, CU 505, and the UE 115-c, may support 0 ms or almost 0 ms interruption handovers.

In the following description of the process flow 500, the operations between the source gNB DU 105-e, target gNB DU 105-f, CU 505, and the UE 115-c may be transmitted in a different order than the exemplary order shown, or the operations performed by the DUs 105 and the UE 115-c may be performed in different orders or at different times. Certain operations may also be left out of the process flow 500, or other operations may be added to the process flow 500.

In this example a handover between the source gNB DU 105-e and the target gNB DU 105-f is an enhanced make-before-break intra-CU handover in which CU 505 is associated with both the source gNB DU 105-e and the target gNB DU 105-f. In some examples, the process flow 500 may commence at 510 with the source gNB DU 105-e establishing a first connection with the UE 115-c (e.g., performing a cell acquisition procedure, a random access procedure, an RRC connection procedure, an RRC configuration procedure, etc.).

At 515, an event trigger may occur that may cause the UE 115-c to perform a measurement procedure. Such a measurement procedure may include, for example, signal measurements of neighboring base stations by the UE 115-c to identify one or more neighboring base stations that may be candidates for the handover procedure. In some cases, the event trigger may be a signal measurement of the source gNB DU 105-e dropping below a threshold value, may be a time-based periodic event, or combinations thereof. At 520, the UE 115-c may transmit measurement report to the source gNB DU 105-e, and the measurement report may indicate that the target gNB DU 105-f is a candidate for a handover.

At 525, the source gNB DU 150-e may transmit a uplink RRC transfer message to the CU 505. In some cases, the uplink RRC transfer message may include the measurement report from the UE 115-c, and may indicate that the target gNB DU 105-f is a candidate for a handover.

At 530, the CU 515 may make a handover decision to handover the UE 115-c from the source gNB DU 105-e to the target gNB DU 105-f In some cases, the CU 505 may make the handover decision based on the measurement report provided by the UE 115-c, one or more threshold values for initiating a handover, a differential in one or more signal measurements from one or more prior measurement reports, one or more measurement reports from other UEs, or any combinations thereof. In the example of FIG. 5, the CU 505 may determine that the UE 115-c is to be handed over to the target gNB DU 105-f. Further, the CU 505 may determine that the UE 115-c has a capability of simultaneous transmissions and receptions and may make a decision to perform an enhanced make-before-break based handover of the UE 115-c. In some cases, the CU 505 determines a handover configuration that is to be used for the handover procedure for UE 115-c. For example, CU 505 may select from possible handover procedures that may be performed by UE 115-c based at least in part on the indicated capability of UE 115-c. In the example of FIG. 5, CU 505 may select an enhanced make-before-break handover procedure for UE 115-c based at least in part on UE 115-c indicating a capability for simultaneous transmissions and receptions that may be used in an enhanced make-before-break handover. In other examples, the CU 505 may select a DC handover procedure or a different handover procedure (e.g., a legacy handover procedure), and different operations associated with the selected handover procedure may be performed.

At 535, the CU and the target gNB DU 105-f may perform handover preparation. In some cases, handover preparation may include a UE context setup request that is transmitted from the CU 505 to the target gNB DU 105-f, and an associated UE context setup response from the target gNB DU 105-f when the UE context has been configured.

At 540, the CU 505 may transmit a downlink RRC transfer to the source gNB DU 105-e, that may indicate an RRC reconfiguration. In some cases, the downlink RRC transfer may indicate that an enhanced make-before-break handover is to be performed, and may provide a cell ID of the target gNB DU 105-*f*.

At 545, the source gNB DU 105-*e* may transmit a RRC reconfiguration message to the UE 115-*c*. The RRC reconfiguration message may indicate to the UE 115-*c* that a connection with the target gNB DU 105-*f* is to be established according to an enhanced make-before-break handover procedure. For example, the RRC reconfiguration may indicate that UE 115-*c* is to perform the make-before-break handover procedure with target gNB DU 105-*f* using the simultaneous transmission/reception capability of UE 115-*c*. In some aspects, the RRC reconfiguration can include information identifying target gNB DU 105-*f*, information identifying a handover configuration, an indication of the enhanced make-before-break handover procedure, or combinations thereof. In some cases, the operations at 510 through 545 may be referred to as a phase-I handover preparation portion of a handover.

Following the transmission of the RRC reconfiguration at 545 and until a second connection with the target gNB DU 105-*f* is established, downlink data that is to be transmitted to the UE 115-*c* may be provided to the source gNB DU 105-*e* (e.g., from a user plane function (UPF) at the core network), and the source gNB DU 105-*e* may transmit the downlink data to the UE 115-*c* via the first connection. Similarly, uplink data transmitted from the UE 115-*c* may be transmitted to the source gNB DU 105-*e* via the first connection.

During the establishment of the second connection with the target gNB DU 105-*f*, the UE 115-*c* may maintain the first connection with the source gNB DU 105-*e*, and thus have an active established connection during the handover, as indicated at 575.

At 550, the UE 115-*c* and the target gNB DU 105-*f* may perform a random access procedure to establish the second connection with the target gNB DU 105-*f* The random access procedure may be performed according to established random access procedures (e.g., random access channel (RACH) procedures that are established in LTE or NR).

At 555, it may be determined that the UE 115-*c* failed to connect to the target gNB DU 105-*f*, or that the second connection failed after being established. In some cases, the failure may occur prior to completion of the random access procedure, or following completion of the random access procedure. In cases where the failure is prior to completing the random access procedure, for example, the UE 115-*c* may determine that a timer (e.g., a T304 timer in LTE or NR) associated with receipt of a random access response message from the target gNB DU 105-*f* may expire, and thus the UE 115-*c* may determine that a handover failure has occurred. In cases where the failure is identified after completion of the random access procedure, the failure may be determined based on a number of retransmissions of a message to the target gNB DU 105-*f*, or based on a timer (e.g., a T310 timer in LTE or NR) associated with a RLC layer at the UE 115-*c*.

At 560, the UE 115-*c* may transmit a radio link failure (RLF) indication to the source gNB DU 105-*e*, that may indicate a cause of the RLF as being a handover failure (e.g., a T304 expiry). In some cases, the RLF indication may preempt the UE 115-*c* from declaring RLF, and thus the UE 115-*c* does not trigger an RRC reestablishment, due to the first connection remaining active. In cases where the UE 115-*c* detects RLF on the target gNB DU 105-*f* after successfully connected and while still connected to source gNB DU 105-*e* as part of the handover procedure, UE 115-*c* does not declare RLF and will not trigger RRC reestablishment as the first connection is active. In such cases where the second connection fails after the establishment of the connection, the RLF indication at 560 may indicate a failure cause (e.g., T310 expiry, RandomAccessProblem, or RLCMaxReTx), the target cell group ID, or both. In some cases, the UE 115-*c* may also include one or more measurements (e.g., in a MeasResultHO-Failure indication) available for the target gNB DU 105-*e*.

At 565, the source gNB DU 105-*e* may transmit a uplink RRC transfer message to the CU 505. In some cases, the uplink RRC transfer message may include a RLF information or cause indication to the CU 505. Further, in cases where the UE 115-*c* provides one or more measurements associated with the target gNB DU 105-*e*, the source gNB DU 105-*e* may include them with the uplink RRC transfer message.

At 570, the UE 115-*c* and the source gNB DU 105-*e* may continue uplink/downlink transmissions using the first connection. While the example of FIG. 5 illustrates a make-before-break handover, similar techniques may be used in a DC handover to report a failure of a connection at the source or target. Further, similar techniques of reporting a connection failure may be used for both inter-gNB-CU handovers and intra-gNB-CU handovers. Such techniques may allow the UE 115-*c* to maintain the first connection even in the event that the second connection fails or is not able to be established. Thus, rather than reporting a radio link failure and RRC reestablishment, the UE 115-*c* may simply continue with the first connection, and thus a service interruption is avoided. In some cases, the source gNB-DU 105-*e* may repeat operations starting at 525 based on the RLF indication.

In some cases, the CU 505 may repeat operations starting at 530 based on the uplink RRC transfer message. For example, the CU 505 use the RLF information to identify the handover failure and may release the UE resources/context on the target gNB DU 105-*f* (e.g., a connection release at the target gNB in cases of intra-gNB-CU handover, or a handover context cancel with the target gNB-CU in cases of inter-gNB-CU handover). In some cases, the CU 505 may use this information to trigger an immediate handover to another target cell by sending a new downlink RRC transfer (e.g., a new RRC reconfiguration message) with the new target cell information.

In some cases, the UE 115-*c* may initiate the establishment of the second connection with the target gNB DU 105-*f*, and the first connection with the source gNB DU 105-*e* may experience a RLF. In such cases, if the UE 115-*c* detects RLF on source gNB DU 105-*e* while performing the random access procedure at the target gNB DU 105-*f*, or after successfully connected to target gNB DU 105-*f*, the UE 115-*c* may continue the random access procedure without triggering a RRC reestablishment. The UE 115-*c* may then release the source stack and the source connection implicitly, and ignores any RRC reconfiguration to release the first connection. Additionally or alternatively, the UE 115-*c* in such cases, may provide a RLF indication (e.g., that indicates RLF on source gNB DU 105-*e* and the source cell group ID) to the target gNB DU 105-*f*, which may be provided to the CU 505. The CU 505 may use this information to release the UE 115-*c* resources/context on the source gNB DU 105-*e* (or source DU in case of Intra-gNB-CU HO and with the source gNB-CU/source gNB-DU in case of Inter-gNB-CU HO). In cases where the second connection fails after the first connection is released, the UE 115-*c* may trigger RRC reestablishment.

Figure 6:
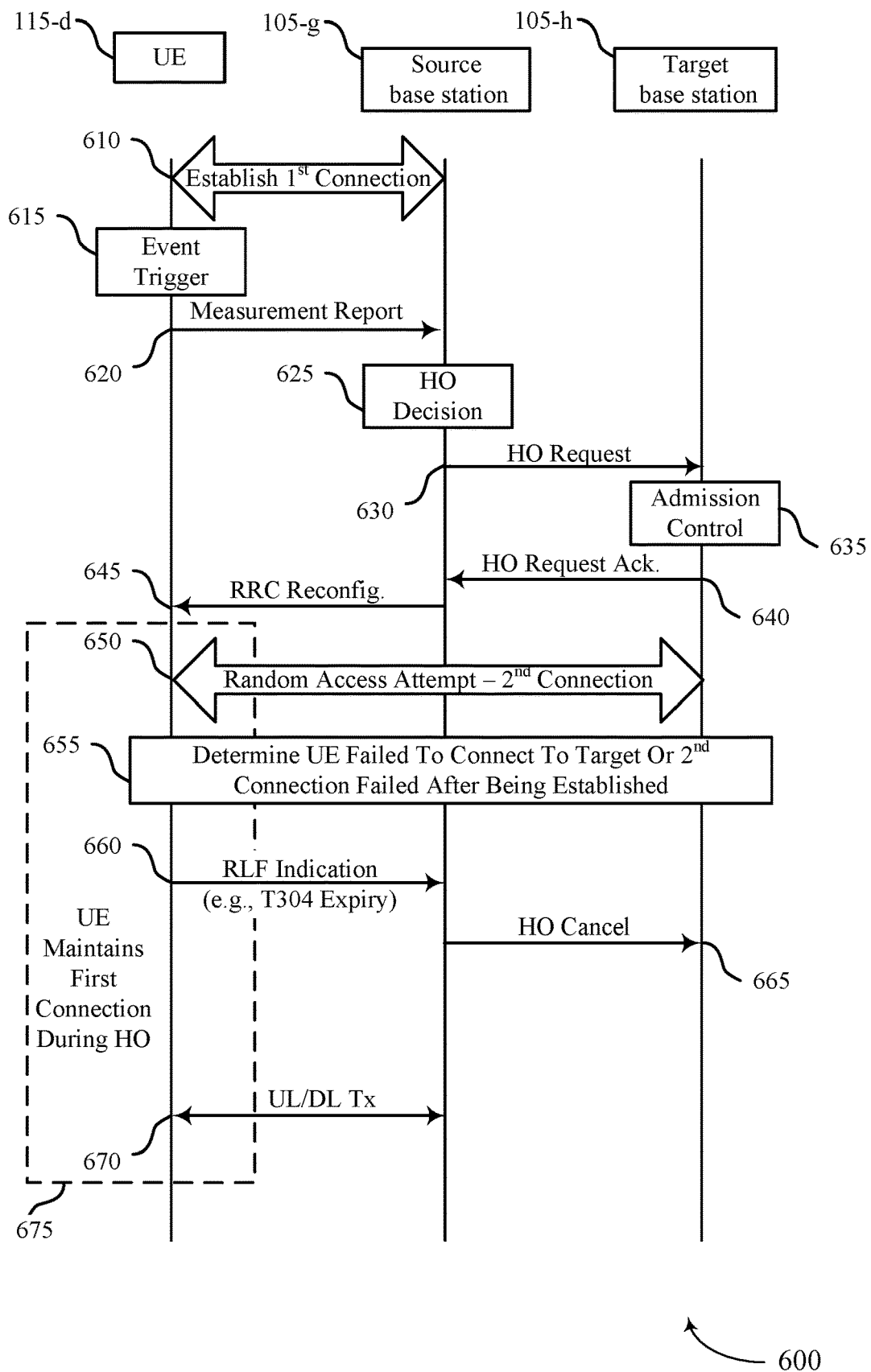
FIG. 6 illustrates an example of a process flow that supports handover techniques in wireless communications in accordance with aspects of the present disclosure.

FIG. 6 illustrates an example of a process flow 600 that supports handover techniques in wireless communications in accordance with aspects of the present disclosure. In some examples, process flow 600 may implement aspects of wireless communications system 100 or 200. Similarly as discussed with respect to FIG. 5, in this example a UE or base station may experience radio link issues during a handover procedure (e.g., a UE may experience fast fading of a signal from a source base station or target base station that may result in the associated signal being unusable by the UE). In this example, an example of an inter-gNB-CU enhanced make-before-break handover is illustrated.

The process flow 600 may include a source base station 105-g, a target base station 105-h, and a UE 115-d. Source base station 105-g and target base station 105-h may be examples of a base station 105 as described herein, and in some cases may include one or more associated DUs or TRPs, and a CU or ANC. UE 115-d may be an example of corresponding UE devices described herein. In some examples, the process flow 600 may implement aspects of the wireless communications system 100 and 200. For example, the source base station 105-g, the target base station 105-h, and the UE 115-d, may support 0 ms or almost 0 ms interruption handovers.

In the following description of the process flow 600, the operations between the source base station 105-g, target base station 105-h, and the UE 115-d may be transmitted in a different order than the exemplary order shown, or the operations performed by the CUs 105 and the UE 115-d may be performed in different orders or at different times. Certain operations may also be left out of the process flow 600, or other operations may be added to the process flow 600.

In this example a handover between the source base station 105-g and the target base station 105-h, as indicated above, is an enhanced make-before-break inter-CU handover in which both the source base station 105-g and the target base station 105-h have different associated CUs. In some examples, the process flow 600 may commence at 610 with the source base station 105-g establishing a first connection with the UE 115-d (e.g., performing a cell acquisition procedure, a random access procedure, an RRC connection procedure, an RRC configuration procedure, etc.).

At 615, an event trigger may occur that may cause the UE 115-d to perform a measurement procedure. Such a measurement procedure may include, for example, signal measurements of neighboring base stations by the UE 115-d to identify one or more neighboring base stations that may be candidates for the handover procedure. In some cases, the event trigger may be a signal measurement of the source base station 105-g dropping below a threshold value, may be a time-based periodic event, or combinations thereof. At 620, the UE 115-d may transmit measurement report to the source base station 105-g, and the measurement report may indicate that the target base station 105-h is a candidate for a handover.

At 625, the source base station 105-g (e.g., a CU associated with the source base station 105-g) may make a handover decision to handover the UE 115-d from the source base station 105-g to the target base station 105-h. In some cases, the source base station 105-g may make the handover decision based on the measurement report provided by the UE 115-d, one or more threshold values for initiating a handover, a differential in one or more signal measurements from one or more prior measurement reports, one or more measurement reports from other UEs, or any combinations thereof. In the example of FIG. 6, the source base station 105-g may determine that the UE 115-d is to be handed over to the target base station 105-h. Further, the source base station 105-g may determine that the UE 115-d has a capability of simultaneous transmissions and receptions and may make a decision to perform an enhanced make-before-break based handover of the UE 115-d. In some cases, the source base station 105-g determines a handover configuration that is to be used for the handover procedure for UE 115-d. For example, source base station 105-g may select from possible handover procedures that may be performed by UE 115-d based at least in part on the indicated capability of UE 115-d. In the example of FIG. 6, source base station 105-g may select an enhanced make-before-break handover procedure for UE 115-d based at least in part on UE 115-d indicating a capability for simultaneous transmissions and receptions that may be used in an enhanced make-before-break handover. In other examples, the source base station 105-g may select a DC handover procedure or a different handover procedure (e.g., a legacy handover procedure), and different operations associated with the selected handover procedure may be performed.

At 630, the source base station 105-g may transmit a handover request to the target base station 105-h. In some cases, the handover request may indicate that the target base station 105-h is a selected for a handover of UE 115-d. In some cases, the handover request may also include the measurement report from the UE 115-d.

At 635, the target base station 105-h (e.g., a CU associated with the target base station 105-h) may perform admission control, and may determine that the second base station 105-h can accommodate the handover. In some cases, admission control may include a UE context setup. At 640, the target base station 105-h may transmit a handover request acknowledgment to the source base station 105-g.

At 645, the source base station 105-g may transmit a RRC reconfiguration message to the UE 115-d. The RRC reconfiguration message may indicate to the UE 115-d that a connection with the target base station 105-h is to be established according to an enhanced make-before-break handover procedure. For example, the RRC reconfiguration may indicate that UE 115-d is to perform the make-before-break handover procedure with target base station 105-h using the simultaneous transmission/reception capability of UE 115-d. In some aspects, the RRC reconfiguration can include information identifying target base station 105-h, information identifying a handover configuration, an indication of the enhanced make-before-break handover procedure, or combinations thereof. In some cases, the operations at 610 through 645 may be referred to as a phase-I handover preparation portion of a handover.

Following the transmission of the RRC reconfiguration at 645 and until a second connection with the target base station 105-h is established, downlink data that is to be transmitted to the UE 115-d may be provided to the source base station 105-g (e.g., from a user plane function (UPF) at the core network), and the source base station 105-g may transmit the downlink data to the UE 115-d via the first connection. Similarly, uplink data transmitted from the UE 115-d may be transmitted to the source base station 105-g via the first connection.

During the establishment of the second connection with the target base station 105-h, the UE 115-d may maintain the first connection with the source base station 105-g, and thus have an active established connection during the handover, as indicated at 675.

At 650, the UE 115-d and the target base station 105-h may perform a random access procedure to establish the second connection with the target base station 105-h. The random access procedure may be performed according to established random access procedures (e.g., random access channel (RACH) procedures that are established in LTE or NR).

At 655, it may be determined that the UE 115-*d* failed to connect to the target base station 105-*h*, or that the second connection failed after being established. In some cases, the failure may occur prior to completion of the random access procedure, or following completion of the random access procedure. In cases where the failure is prior to completing the random access procedure, for example, the UE 115-*d* may determine that a timer (e.g., a T304 timer in LTE or NR) associated with receipt of a random access response message from the target base station 105-*h* may expire, and thus the UE 115-*d* may determine that a handover failure has occurred. In cases where the failure is identified after completion of the random access procedure, the failure may be determined based on a number of retransmissions of a message to the target base station 105-*h*, or based on a timer (e.g., a T310 timer in LTE or NR) associated with a RLC layer at the UE 115-*d*.

At 660, the UE 115-*d* may transmit a radio link failure (RLF) indication to the source base station 105-*g*, that may indicate a cause of the RLF as being a handover failure (e.g., a T304 expiry). In some cases, the RLF indication may preempt the UE 115-*d* from declaring RLF, and thus the UE 115-*d* does not trigger an RRC reestablishment, due to the first connection remaining active. In cases where the UE 115-*d* detects RLF on the target base station 105-*h* after successfully connected and while still connected to source base station 105-*g* as part of the handover procedure, UE 115-*d* does not declare RLF and will not trigger RRC reestablishment as the first connection is active. In such cases where the second connection fails after the establishment of the connection, the RLF indication at 660 may indicate a failure cause (e.g., T310 expiry, RandomAccess-Problem, or RLCMaxReTx), the target cell group ID, or both. In some cases, the UE 115-*d* may also include one or more measurements (e.g., in a MeasResultHO-Failure indication) available for the target base station 105-*g*. At 665, the source base station 105-*g* may transmit a handover cancel message to the target base station 105-*h*. In some cases, the handover cancel message may include RLF information or cause indication.

At 670, the UE 115-*d* and the source base station 105-*g* may continue uplink/downlink transmissions using the first connection. While the example of FIG. 6 illustrates a make-before-break handover, similar techniques may be used in an inter-gNB-CU DC handover to report a failure of a connection at the source or target, and may perform further actions such as discussed above with respect to FIG. 5.

Figure 7:
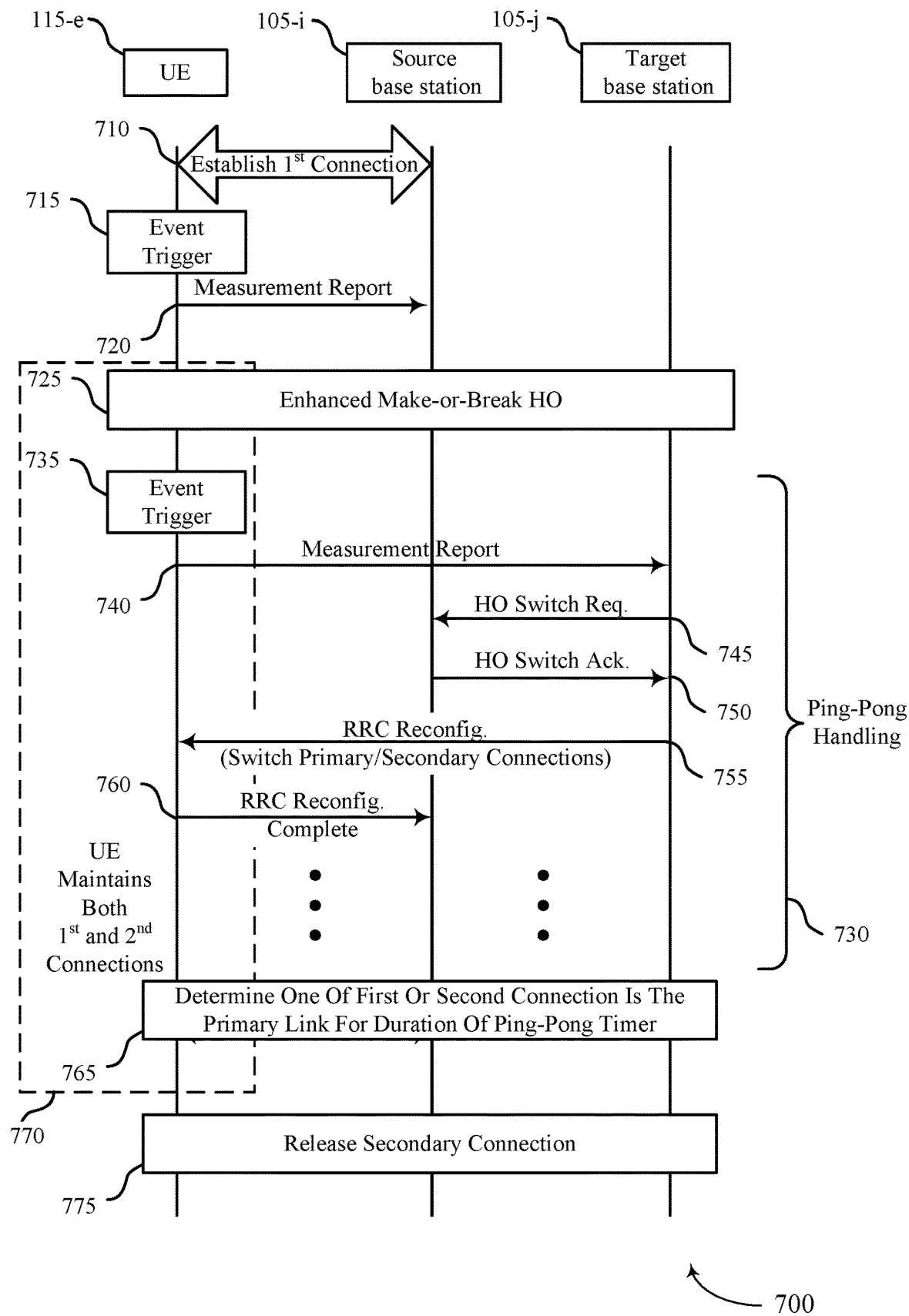
FIG. 7 illustrates an example of a process flow that supports handover techniques in wireless communications in accordance with aspects of the present disclosure.

FIG. 7 illustrates an example of a process flow 700 that supports handover techniques in wireless communications in accordance with aspects of the present disclosure. In some examples, process flow 700 may implement aspects of wireless communications system 100 or 200. In some cases, during a handover of a UE, channel conditions of the source and the target may be relatively close to one another (e.g., due to the UE being approximately a same distance away from a cell edge of both the source and the target). In some cases, a hysteresis may be applied to channel measurements for initiating a handover to prevent excessive ping-pong handovers between source and target base stations. However, such a hysteresis may result in a UE that is not taking advantage of a base station that may have better channel conditions and thus better efficiency and reliability. In the example of FIG. 7, an example of ping-pong handling is discussed in which a UE may maintain connections with both the source and target and utilize a connection with better channel conditions, and may thus provide enhanced reliability and throughput.

The process flow 700 may include a source base station 105-*i*, a target base station 105-*j*, and a UE 115-*e*. Source base station 105-*i* and target base station 105-*j* may be examples of a base station 105 as described herein, and in some cases may include one or more associated DUs or TRPs, and a CU or ANC. UE 115-*e* may be an example of corresponding UE devices described herein. In some examples, the process flow 700 may implement aspects of the wireless communications system 100 and 200. For example, the source base station 105-*i*, the target base station 105-*j*, and the UE 115-*e*, may support 0 ms or almost 0 ms interruption handovers.

In the following description of the process flow 700, the operations between the source base station 105-*i*, target base station 105-*j*, and the UE 115-*e* may be transmitted in a different order than the exemplary order shown, or the operations performed by the CUs 105 and the UE 115-*e* may be performed in different orders or at different times. Certain operations may also be left out of the process flow 700, or other operations may be added to the process flow 700.

In this example a handover between the source base station 105-*i* and the target base station 105-*j*, as indicated above, is an enhanced make-before-break inter-CU handover in which both the source base station 105-*i* and the target base station 105-*j* have different associated CUs. In some examples, the process flow 700 may commence at 710 with the source base station 105-*i* establishing a first connection with the UE 115-*e* (e.g., performing a cell acquisition procedure, a random access procedure, an RRC connection procedure, an RRC configuration procedure, etc.).

At 715, an event trigger may occur that may cause the UE 115-*e* to perform a measurement procedure. Such a measurement procedure may include, for example, signal measurements of neighboring base stations by the UE 115-*e* to identify one or more neighboring base stations that may be candidates for the handover procedure. In some cases, the event trigger may be a signal measurement of the source base station 105-*i* dropping below a threshold value, may be a time-based periodic event, or combinations thereof. At 720, the UE 115-*e* may transmit measurement report to the source base station 105-*i*, and the measurement report may indicate that the target base station 105-*j* is a candidate for a handover.

At 725, the source base station 105-*i* (e.g., a CU associated with the source base station 105-*i*), the target base station 105-*j* (e.g., a CU associated with the target base station 105-*j*), and the UE 115-*e* may perform an enhanced make-before-break handover procedure, such as discussed above, and may establish a second connection between the UE 115-*e* and the target base station 105-*j*. Once established, the second connection may be the primary connection for the UE 115-*e*, and the first connection may be the secondary connection of the UE 115-*e*. In some cases, the UE 115-*e* may maintain both the first connection and the second connection, as indicated at 770, until one of the connections is relatively stable and provides a better channel for a certain period of time.

In this example, the UE 115-*e*, source base station 105-*i*, and target base station 105-*j*, may perform ping-pong handling 730, in which a primary connection of the UE 115-*e* may be switched based on which of the first connection or second connection has more favorable channel conditions.

At 735, while the UE 115-e is connected to both the source base station 105-i and the target base station 105-j, an event trigger may occur that may cause the UE 115-e to perform a measurement procedure. Such a measurement procedure may include, for example, signal measurements of the source base station 105-i, the target base station 105-j, and/or one or more other neighboring base stations. In some cases, the event trigger may be a signal measurement of the source base station 105-i. In some cases, the event trigger may be when the secondary connection has a signal strength that exceeds the primary connection signal strength by a threshold value.

At 740, the UE 115-e may transmit measurement report to the target base station 105-j (i.e., to the base station 105 that is currently providing the primary connection), and the measurement report may indicate that the source base station 105-i has better channel conditions than the target base station 105-j.

At 745, based on the measurement report, the target base station 105-j may transmit a handover switch request to the source base station 105-i, which requests to switch the primary connection to the source base station 105-i, and the secondary connection to be the connection with the target base station 105-j. At 750, the source base station 105-i may transmit a handover switch acknowledgment that indicates that the source base station 105-i is prepared to provide the primary connection with the UE 115-e.

At 755, the target base station 105-j may transmit a RRC reconfiguration to the UE 115-e to switch the primary and secondary connections. The UE 115-e, based on the RRC reconfiguration, may reconfigure the primary and secondary connections to swap the connections, and may, at 760, transmit a RRC reconfiguration complete indication to the source base station 105-i. In some cases, the indication to switch the primary and secondary connections may be provided to the UE 115-e via a MAC CE.

The operations described at 735 through 760 may be repeated with the swapped primary and secondary connections until, at 765, it is determined that one of the first connection or second connection has served as the primary connection for a duration of a ping-pong timer. In some cases, a duration of the ping-pong timer may be determined based on channel conditions at the UE 115-e, a predetermined duration, a history of ping-pong procedure durations, or any combinations thereof. At 775, the secondary connection may be released, and communication may continue using the primary connection until a subsequent handover procedure is initiated.

Such ping-pong handling 730 may be useful in certain deployments, such as deployments that use mmW or in inter-frequency handover scenarios, where the source base station 105-i may decide to initiate the handover to the target base station 105-j much earlier than the actual need for handover to reduce the possibility for handover command failure. In such cases, once the target base station 105-j link is established, it is possible that the target link becomes weaker than source and ping-pong happens. Thus, such techniques may be beneficial to maintain the source base station 105-i connection for some time until the target base station 105-j link is good enough to maintain the primary connection. By maintaining the source base station 105-i connection, the target base station 105-j may handle ping-pong efficiently through a RRC Reconfiguration without the need to perform a random access procedure or other backend procedures on the source base station 105-j again. While the techniques of FIG. 7 show enhanced make-or-break handover, such techniques may also be used for DC based handover.

In some cases, SRB/DRB data can be transmitted/received by the UE 115-e only on the primary link, or can be duplicated over both the links during the ping-pong handling procedure at 730. In cases where duplication of data is provided, which may enhance reliability of communications, additional configuration information may be exchanged over a backhaul link (e.g., an Xn link) between the source base station 105-i and the target base station 105-jm to establish backhaul duplication and the tunnel information. Further, uplink duplicated data sent by the UE 115-e may be forwarded over the backhaul link to the primary connection for forwarding to the UPF. In such cases, downlink data is still received by the original source base station 105-i (due to the core network path switch not happening until a stable link is decided), and forwarded to the other base station via backhaul link for duplication of downlink data on the target base station 105-j link. In some cases, the UE 115-e may store both base station keys and use the key based on the transmission/reception connection. Such techniques may be used for both intra-gNB-CU and inter-gNB-CU handover. In the case of intra-gNB-CU handover, the switch may be controlled by the gNB-CU to move between the cells under different DUs.

Figure 8:
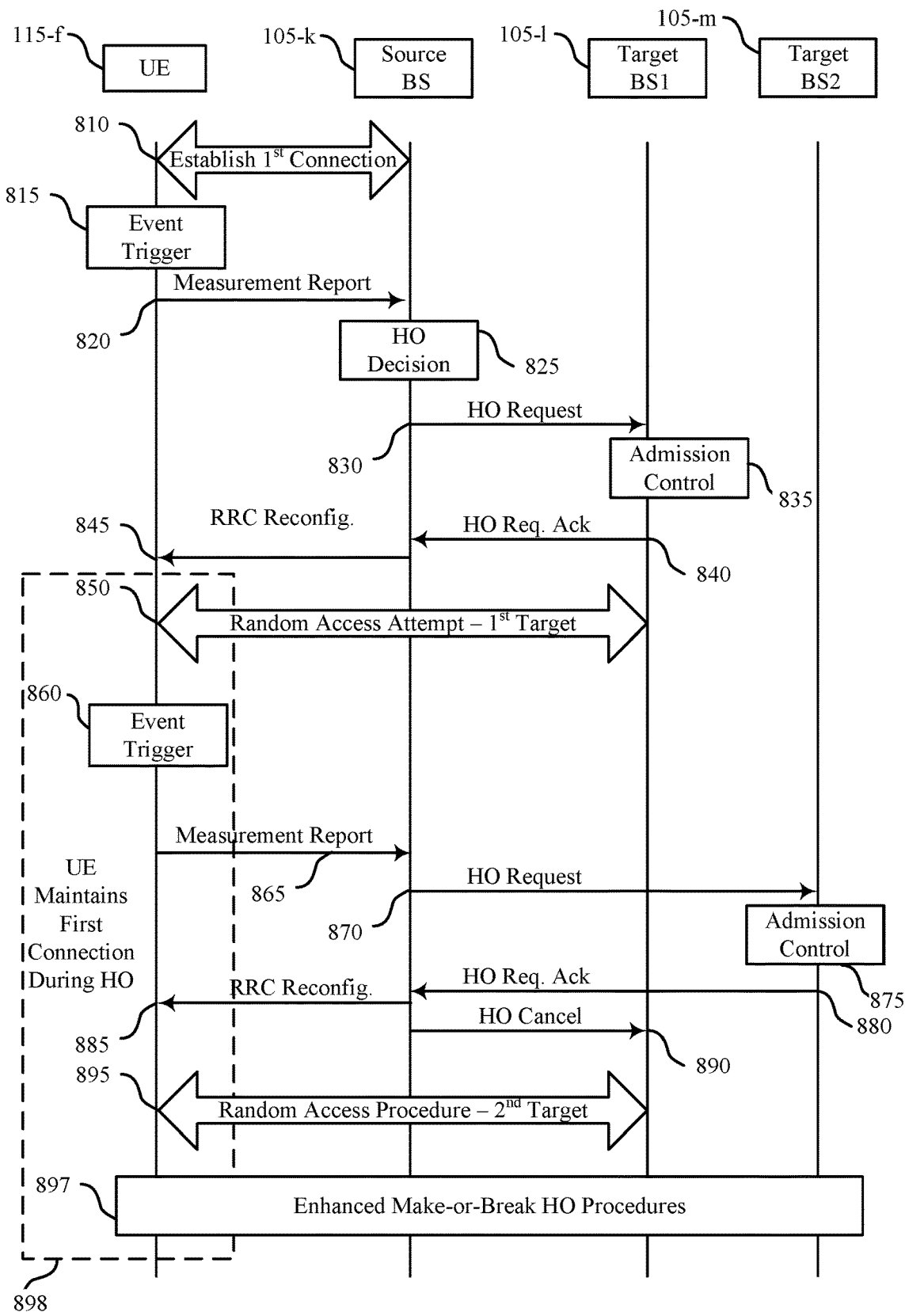
FIG. 8 illustrates an example of a process flow that supports handover techniques in wireless communications in accordance with aspects of the present disclosure.

FIG. 8 illustrates an example of a process flow 800 that supports handover techniques in wireless communications in accordance with aspects of the present disclosure. In some examples, process flow 800 may implement aspects of wireless communications system 100 or 200. In some cases, a UE may perform a measurement that may indicate that a neighboring base station has a better channel condition than a source or target base station. In some cases, the UE may provide a measurement report that indicates the neighboring base station, and may trigger a handover abort of a handover to the target base station in favor of the neighboring base station with better channel conditions. Such handover abort may allow the UE to establish a connection with a more favorable base station and thereby enhance reliability and communications in a wireless communications system. In this example, an example of an inter-gNB-CU enhanced make-before-break handover is illustrated, although such techniques may be used for DC handover, intra-gNB-CU handovers, or any combinations thereof.

The process flow 800 may include a source base station 105-k, a first target base station 105-l, a second target base station 105-m, and a UE 115-f. Source base station 105-k, first target base station 105-l, and second target base station 105-m may be examples of a base station 105 as described herein, and in some cases may include one or more associated DUs or TRPs, and a CU or ANC. UE 115-f may be an example of corresponding UE devices described herein. In some examples, the process flow 800 may implement aspects of the wireless communications system 100 and 200. For example, the source base station 105-k, the target base stations 105, and the UE 115-f, may support 0 ms or almost 0 ms interruption handovers.

In the following description of the process flow 800, the operations between the source base station 105-k, first target base station 105-l, second target base station 105-m and the UE 115-f may be transmitted in a different order than the exemplary order shown, or the operations performed by the base stations 105 and the UE 115-f may be performed in different orders or at different times. Certain operations may also be left out of the process flow 800, or other operations may be added to the process flow 800.

In this example a handover between the source base station 105-*k* and the target base station 105-*l*, as indicated above, is an enhanced make-before-break inter-CU handover in which both the source base station 105-*k* and the target base station 105-*l* have different associated CUs. In some examples, the process flow 800 may commence at 810 with the source base station 105-*k* establishing a first connection with the UE 115-*f* (e.g., performing a cell acquisition procedure, a random access procedure, an RRC connection procedure, an RRC configuration procedure, etc.).

At 815, an event trigger may occur that may cause the UE 115-*f* to perform a measurement procedure. Such a measurement procedure may include, for example, signal measurements of neighboring base stations by the UE 115-*f* to identify one or more neighboring base stations that may be candidates for the handover procedure. In some cases, the event trigger may be a signal measurement of the source base station 105-*k* dropping below a threshold value, may be a time-based periodic event, or combinations thereof. At 820, the UE 115-*f* may transmit measurement report to the source base station 105-*k*, and the measurement report may indicate that the first target base station 105-*l* is a candidate for a handover.

At 825, the source base station 105-*k* (e.g., a CU associated with the source base station 105-*k*) may make a handover decision to handover the UE 115-*f* from the source base station 105-*k* to the first target base station 105-*l*. In some cases, the source base station 105-*k* may make the handover decision based on the measurement report provided by the UE 115-*f*, one or more threshold values for initiating a handover, a differential in one or more signal measurements from one or more prior measurement reports, one or more measurement reports from other UEs, or any combinations thereof. In the example of FIG. 8, the source base station 105-*k* may determine that the UE 115-*f* is to be handed over to the first target base station 105-*l*. Further, the source base station 105-*k* may determine that the UE 115-*f* has a capability of simultaneous transmissions and receptions and may make a decision to perform an enhanced make-before-break based handover of the UE 115-*f*. In some cases, the source base station 105-*k* determines a handover configuration that is to be used for the handover procedure for UE 115-*f*. For example, source base station 105-*k* may select from possible handover procedures that may be performed by UE 115-*f* based at least in part on the indicated capability of UE 115-*f*. In the example of FIG. 8, source base station 105-*k* may select an enhanced make-before-break handover procedure for UE 115-*f* based at least in part on UE 115-*f* indicating a capability for simultaneous transmissions and receptions that may be used in an enhanced make-before-break handover. In other examples, the source base station 105-*k* may select a DC handover procedure or a different handover procedure (e.g., a legacy handover procedure), and different operations associated with the selected handover procedure may be performed.

At 830, the source base station 105-*k* may transmit a handover request to the first target base station 105-*l*. In some cases, the handover request may indicate that the first target base station 105-*l* is a selected for a handover of UE 115-*f*. In some cases, the handover request may also include the measurement report from the UE 115-*f*.

At 835, the first target base station 105-*l* (e.g., a CU associated with the target base station 105-*l*) may perform admission control, and may determine that the first target base station 105-*l* can accommodate the handover. In some cases, admission control may include a UE context setup. At 840, the first target base station 105-*l* may transmit a handover request acknowledgment to the source base station 105-*k*.

At 845, the source base station 105-*k* may transmit a RRC reconfiguration message to the UE 115-*f*. The RRC reconfiguration message may indicate to the UE 115-*f* that a connection with the first target base station 105-*l* is to be established according to an enhanced make-before-break handover procedure. For example, the RRC reconfiguration may indicate that UE 115-*f* is to perform the make-before-break handover procedure with first target base station 105-*l* using the simultaneous transmission/reception capability of UE 115-*f*. In some aspects, the RRC reconfiguration can include information identifying first target base station 105-*l*, information identifying a handover configuration, an indication of the enhanced make-before-break handover procedure, or combinations thereof.

Following the transmission of the RRC reconfiguration at 845 and until a second connection with the first target base station 105-*l* is established, downlink data that is to be transmitted to the UE 115-*f* may be provided to the source base station 105-*k* (e.g., from a user plane function (UPF) at the core network), and the source base station 105-*k* may transmit the downlink data to the UE 115-*f* via the first connection. Similarly, uplink data transmitted from the UE 115-*f* may be transmitted to the source base station 105-*k* via the first connection.

During the establishment of the second connection with the first target base station 105-*l*, the UE 115-*f* may maintain the first connection with the source base station 105-*k*, and thus have an active established connection during the handover, as indicated at 875.

At 850, the UE 115-*f* and the first target base station 105-*l* may perform a random access procedure to establish the second connection with the first target base station 105-*l*. The random access procedure may be performed according to established random access procedures (e.g., random access channel (RACH) procedures that are established in LTE or NR). In the example of FIG. 8, the UE 115-*f* may continue to perform neighbor cell measurements while acquiring the first target base station 105-*k*.

Such neighbor cell measurements may be initiated at 860, where an event trigger may occur that may cause the UE 115-*f* to perform a measurement procedure for neighbor cells, which may include a measurement of the second target base station 105-*m*. Such a measurement procedure may include, for example, signal measurements of neighboring base stations by the UE 115-*f* to identify one or more neighboring base stations that may be better candidates for handover than the first target base station 105-*l*. In some cases, the event trigger may be a signal measurement of the first target base station 105-*l* dropping below a threshold value, may be a time-based periodic event, or combinations thereof. At 865, the UE 115-*f* may transmit measurement report to the source base station 105-*k*, and the measurement report may indicate that the second target base station 105-*m* has better channel conditions than the first target base station 105-*l*.

At 870, the source base station 105-*k* (e.g., a CU associated with the source base station 105-*k*) may make a handover decision to handover the UE 115-*f* from the source base station 105-*k* to the second target base station 105-*m*. In some cases, the source base station 105-*k* may make the handover decision based on the measurement report provided by the UE 115-*f*, one or more threshold values for aborting the handover to the first target base station 105-*l*, a differential in one or more signal measurements from one or more prior measurement reports, one or more measurement reports from other UEs, or any combinations thereof. In the example of FIG. 8, the source base station 105-*k* may determine that the handover to the first target base station 105-*l* is to be aborted in favor of a handover to the second target base station 105-*m*.

At 870, the source base station 105-*k* may transmit a handover request to the second target base station 105-*m*. In some cases, the handover request may indicate that the second target base station 105-*m* is a selected for a handover of UE 115-*f*. In some cases, the handover request may also include the measurement report from the UE 115-*f*.

At 875, the second target base station 105-*m* (e.g., a CU associated with the target base station 105-*l*) may perform admission control, and may determine that the second target base station 105-*m* can accommodate the handover. In some cases, admission control may include a UE context setup. At 880, the second target base station 105-*m* may transmit a handover request acknowledgment to the source base station 105-*k*.

At 885, the source base station 105-*k* may transmit a RRC reconfiguration message to the UE 115-*f* The RRC reconfiguration message may indicate to the UE 115-*f* that the handover with the first target base station 105-*l* is to be aborted in favor of a handover to the second target base station 105-*m*. Following the transmission of the RRC reconfiguration at 885, the source base station 105-*k* may transmit a handover cancel indication to the first target base station 105-*l*, at indicated at 890.

At 895, the UE 115-*f* and the second target base station 105-*m* may perform a random access procedure to establish a second connection with the second target base station 105-*m*. The UE 115-*m*, the first target base station 105-*k*, and the second target base station 105-*m* may follow enhanced make-or-break handover procedures such as discussed herein (e.g., connection establishment, radio link failures associated with a connection, handover abort, etc.).

In some cases, the UE 115-*f* may treat the source base station 105-*k* as a Pcell and the first target base station 105-*l* as the Scell, and may send measurement reports (e.g., an A3 and A6 measurement report in an LTE or NR system). Based on the measurement reports, the source base station 105-*k* or associated CU may consider that another better neighbor cell is detected if the A3 and A6 measurement reports are received within certain time from the UE. In other cases, a new measurement event (e.g., an A36 measurement event) may be defined, which is to report when a neighbor cell is detected to be stronger than the source base station 105-*k* and the first target base station 105-*l*.

Figure 9:
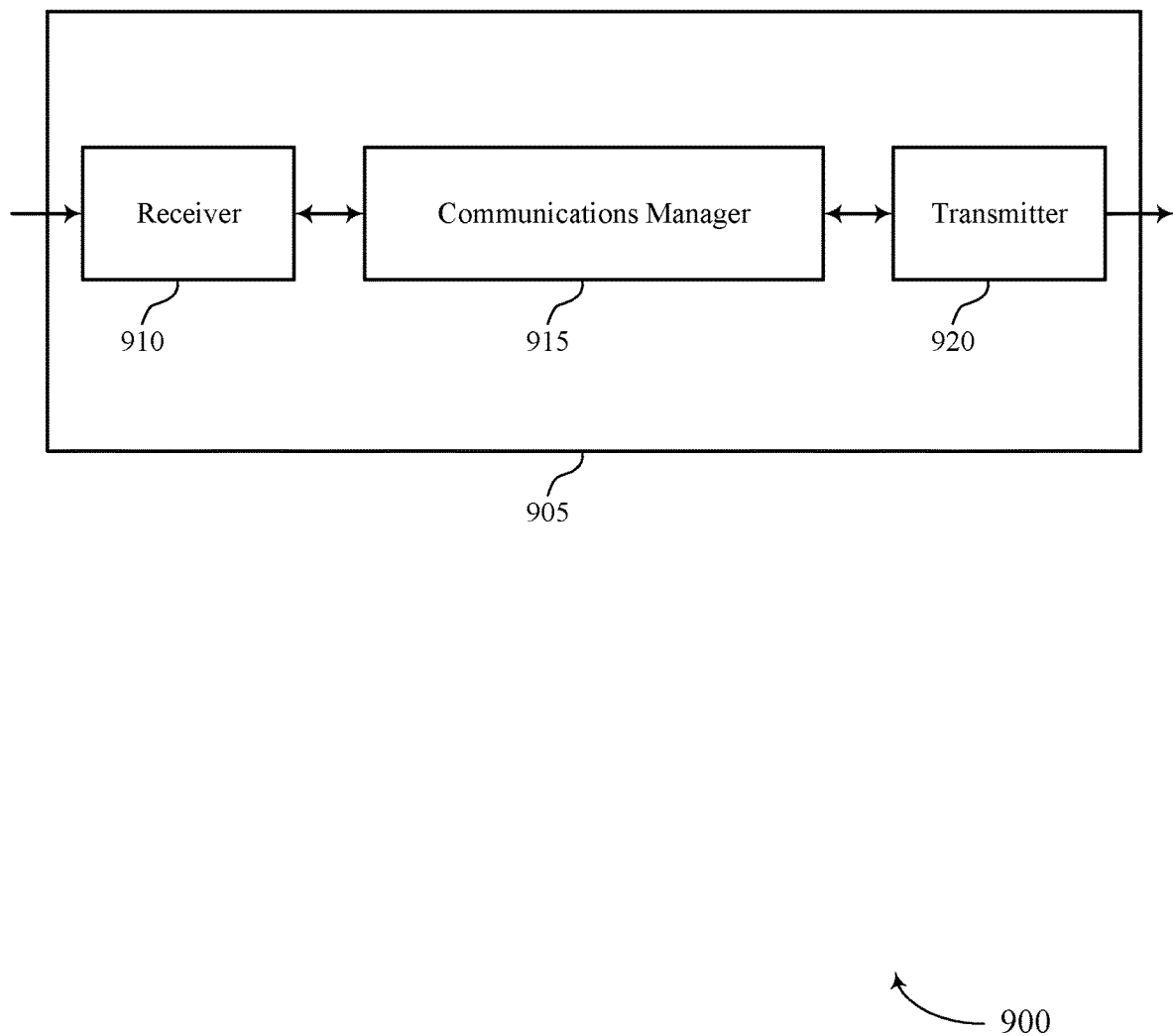
FIGS. 9 and 10 show block diagrams of devices that support handover techniques in wireless communications in accordance with aspects of the present disclosure.

FIG. 9 shows a block diagram 900 of a device 905 that supports handover techniques in wireless communications in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to handover techniques in wireless communications, etc.). Information may be passed on to other components of the device 905. The receiver 910 may be an example of aspects of the transceiver 1220 described with reference to FIG. 12. The receiver 910 may utilize a single antenna or a set of antennas.

In some cases, the communications manager 915 may establish a first connection with a first base station, receive a handover message from the first base station to perform a handover procedure with a second base station, transmit, responsive to the handover message, a request to the second base station to establish a second connection with the second base station, where the first connection with the first base station is maintained during the handover procedure, determine that a radio link failure of the first connection or the second connection has occurred, and transmit an indication of the radio link failure to the first base station or the second base station responsive to the determining.

In some cases, the communications manager 915 may also establish a first connection with a first base station, receive a handover message from the first base station to perform a handover procedure with a second base station, initiate a connection establishment with the second base station to establish a second connection responsive to the handover message, where the first connection is maintained during the connection establishment with the second base station, measure one or more channel conditions associated with one or more of the first base station, the second base station or a third base station, and transmit, responsive to the handover message, a measurement report to at least one of the first base station or the second base station responsive to measuring the one or more channel conditions. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
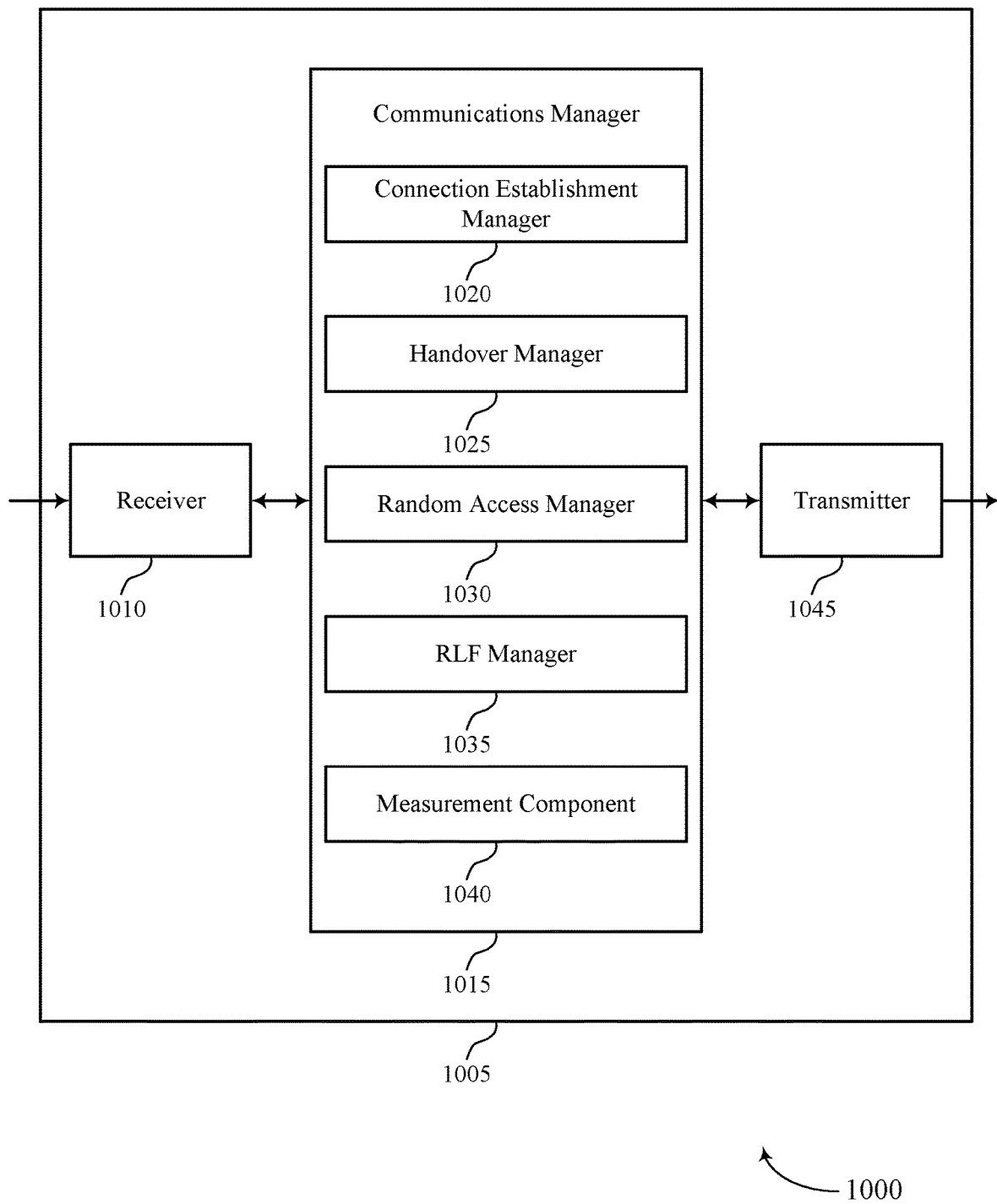

FIG. 10 shows a block diagram 1000 of a device 1005 that supports handover techniques in wireless communications in accordance with aspects of the present disclosure. The device 1005 may be an example of aspects of a device 905, or a UE 115 as described herein. The device 1005 may include a receiver 1010, a communications manager 1015, and a transmitter 1045. The device 1005 may also include a processor. Each of these components may be in communication with one another (e.g., via one or more buses).

The receiver 1010 may receive information such as packets, user data, or control information associated with various information channels (e.g., control channels, data channels, and information related to handover techniques in wireless communications, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a connection establishment manager 1020, a handover manager 1025, a random access manager 1030, a RLF manager 1035, and a measurement component 1040. The communications manager 1015 may be an example of aspects of the communications manager 1210 described herein.

The connection establishment manager 1020 may establish a first connection with a first base station.

The handover manager 1025 may receive a handover message from the first base station to perform a handover procedure with a second base station.

The random access manager 1030 may transmit, responsive to the handover message, a request to the second base station to establish a second connection with the second base station, where the first connection with the first base station is maintained during the handover procedure.

The RLF manager 1035 may determine that a radio link failure of the first connection or the second connection has occurred and transmit an indication of the radio link failure to the first base station or the second base station responsive to the determining.

The measurement component 1040 may measure one or more channel conditions associated with one or more of the first base station, the second base station or a third base station and transmit, responsive to the handover message, a measurement report to at least one of the first base station or the second base station responsive to measuring the one or more channel conditions.

The transmitter 1045 may transmit signals generated by other components of the device 1005. In some examples, the transmitter 1045 may be collocated with a receiver 1010 in a transceiver module. For example, the transmitter 1045 may be an example of aspects of the transceiver 1220 described with reference to FIG. 12. The transmitter 1045 may utilize a single antenna or a set of antennas.

Figure 11:
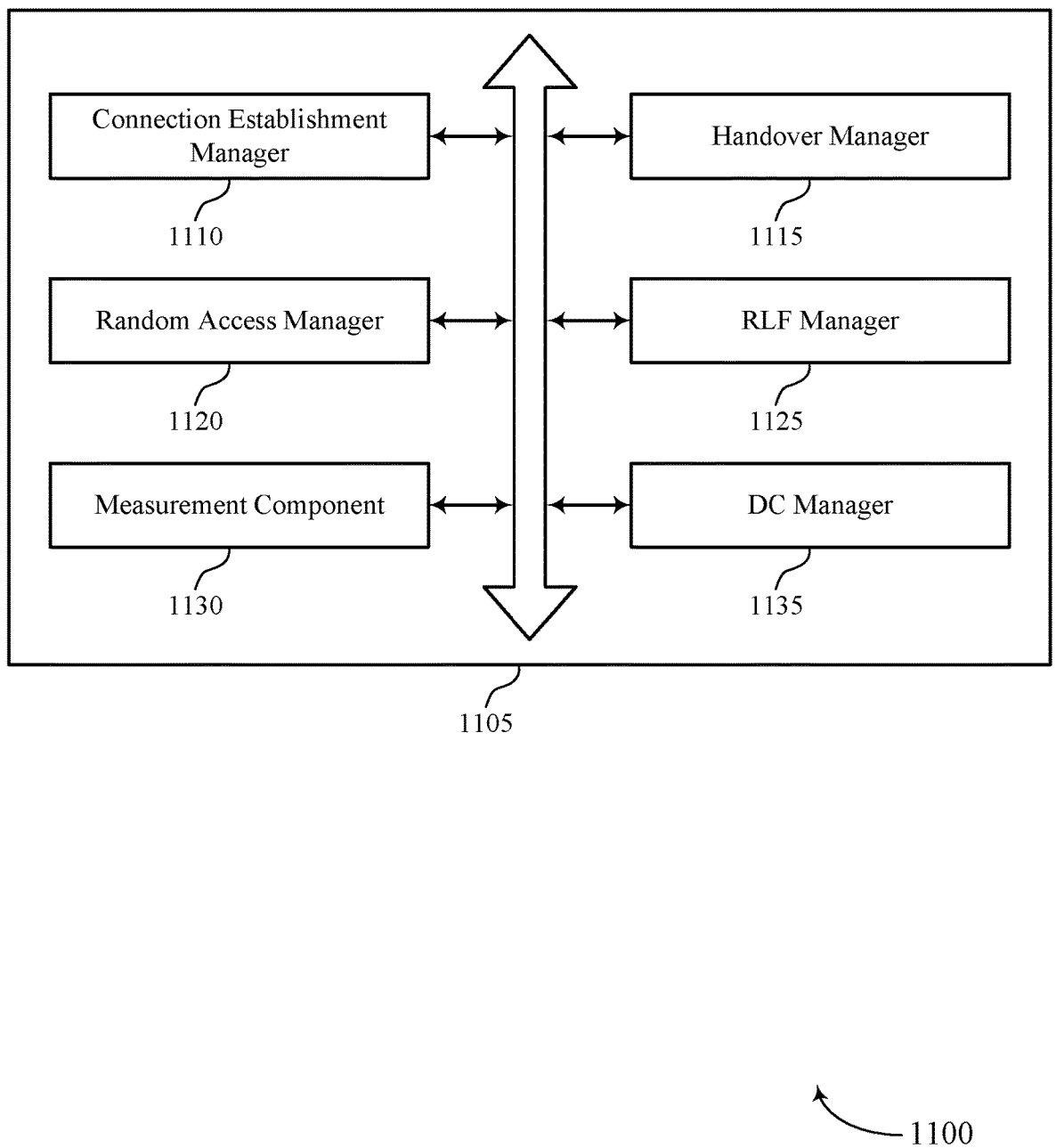
FIG. 11 shows a block diagram of a communications manager that supports handover techniques in wireless communications in accordance with aspects of the present disclosure.

FIG. 11 shows a block diagram 1100 of a communications manager 1105 that supports handover techniques in wireless communications in accordance with aspects of the present disclosure. The communications manager 1105 may be an example of aspects of a communications manager 915, a communications manager 1015, or a communications manager 1210 described herein. The communications manager 1105 may include a connection establishment manager 1110, a handover manager 1115, a random access manager 1120, a RLF manager 1125, a measurement component 1130, and a DC manager 1135. Each of these modules may communicate, directly or indirectly, with one another (e.g., via one or more buses).

The connection establishment manager 1110 may establish a first connection with a first base station. In some examples, the connection establishment manager 1110 may determine that the first connection with the first base station has failed prior to completion of an establishment of the second connection.

In some examples, the connection establishment manager 1110 may complete the establishment of the second connection with the second base station. In some examples, the connection establishment manager 1110 may release the first connection and a source stack associated with the first connection responsive to completing the establishment of the second connection with the second base station. In some cases, the completing the establishment of the second connection preempts a triggering of a reestablishment of the first connection with the first base station in the event of a RLF at the second connection.

The handover manager 1115 may receive a handover message from the first base station to perform a handover procedure with a second base station. In some examples, the handover manager 1115 may release the first connection after the second connection has been a primary connection for a predetermined time period. In some cases, a reconfiguration message includes a second handover message from the first base station to perform a second handover procedure with the third base station.

The random access manager 1120 may transmit, responsive to the handover message, a request to the second base station to establish a second connection with the second base station, where the first connection with the first base station is maintained during the handover procedure.

The RLF manager 1125 may determine that a radio link failure of the first connection or the second connection has occurred. In some examples, the RLF manager 1125 may transmit an indication of the radio link failure to the first base station or the second base station responsive to the determining. In some examples, the RLF manager 1125 may determine that establishment of the connection with the second base station has failed or the second connection failed after establishment of the second connection.

In some cases, the indication of the radio link failure includes a failure cause associated with the second connection and a target cell group identification associated with the second base station. In some cases, the indication of the radio link failure further indicates one or more of a timer expiration associated with the second connection, a random access procedure failure, or a maximum number of retransmissions is reached for a communication using the second connection. In some cases, the indication of the radio link failure indicates a failure cause associated with the first connection and a source cell group identification associated with the first base station.

The measurement component 1130 may measure one or more channel conditions associated with one or more of the first base station, the second base station or a third base station. In some examples, the measurement component 1130 may transmit, responsive to the handover message, a measurement report to at least one of the first base station or the second base station responsive to measuring the one or more channel conditions. In some examples, the measurement component 1130 may transmit one or more additional measurement reports via the primary connection. In some cases, the indication of the radio link failure further indicates a measurement of one or more signals received at the UE from one or more neighboring base stations.

In some cases, the measurement report is transmitted responsive to the measured one or more channel conditions of the secondary connection being better than corresponding channel conditions of the primary connection. In some cases, the measurement report is transmitted responsive to measured channel conditions of the third base station being better than measured channel conditions of the second base station.

The DC manager 1135 may establish the second connection with the second base station, where the second connection is a primary connection and the first connection is maintained as a secondary connection.

In some examples, the DC manager 1135 may receive, responsive to the measurement report, a reconfiguration message from the second base station to reconfigure the first connection as the primary connection and the second connection as the secondary connection. In some examples, the DC manager 1135 may reconfigure the first connection and the second connection responsive to the reconfiguration message. In some examples, the DC manager 1135 may transmit and receiving duplicated data via each of the primary connection and the secondary connection. In some cases, the reconfiguring the first connection and the second connection responsive to the reconfiguration message is performed without performing a random access procedure.

In some examples, the DC manager 1135 may receive, responsive to the measurement report, a reconfiguration message from the first base station to abort the handover procedure with the second base station.

Figure 12:
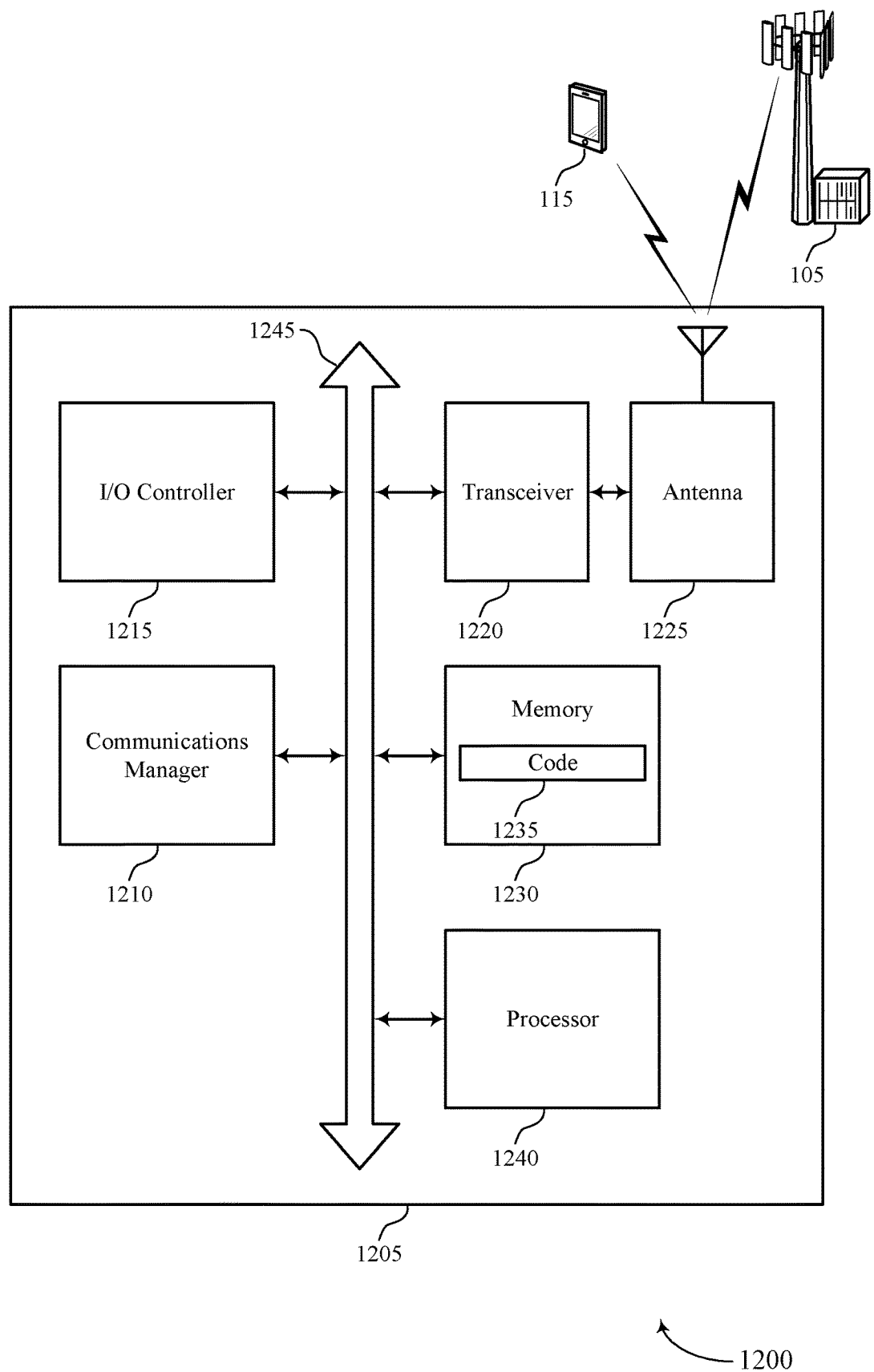
FIG. 12 shows a diagram of a system including a device that supports handover techniques in wireless communications in accordance with aspects of the present disclosure.

FIG. 12 shows a diagram of a system 1200 including a device 1205 that supports handover techniques in wireless communications in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may establish, at a UE, a first connection with a first base station, receive a handover message from the first base station to perform a handover procedure with a second base station, transmit, responsive to the handover message, a request to the second base station to establish a second connection with the second base station, where the first connection with the first base station is maintained during the handover procedure, determine that a radio link failure of the first connection or the second connection has occurred, and transmit an indication of the radio link failure to the first base station or the second base station responsive to the determining. The communications manager 1210 may also establish, at a UE, a first connection with a first base station, receive a handover message from the first base station to perform a handover procedure with a second base station, initiate, at the UE, a connection establishment with the second base station to establish a second connection responsive to the handover message, where the first connection is maintained during the connection establishment with the second base station, measure one or more channel conditions associated with one or more of the first base station, the second base station or a third base station, and transmit, responsive to the handover message, a measurement report to at least one of the first base station or the second base station responsive to measuring the one or more channel conditions.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM and ROM. The memory 1230 may store computer-readable, computer-executable code 1235 including instructions that, when executed, cause the processor to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting handover techniques in wireless communications).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
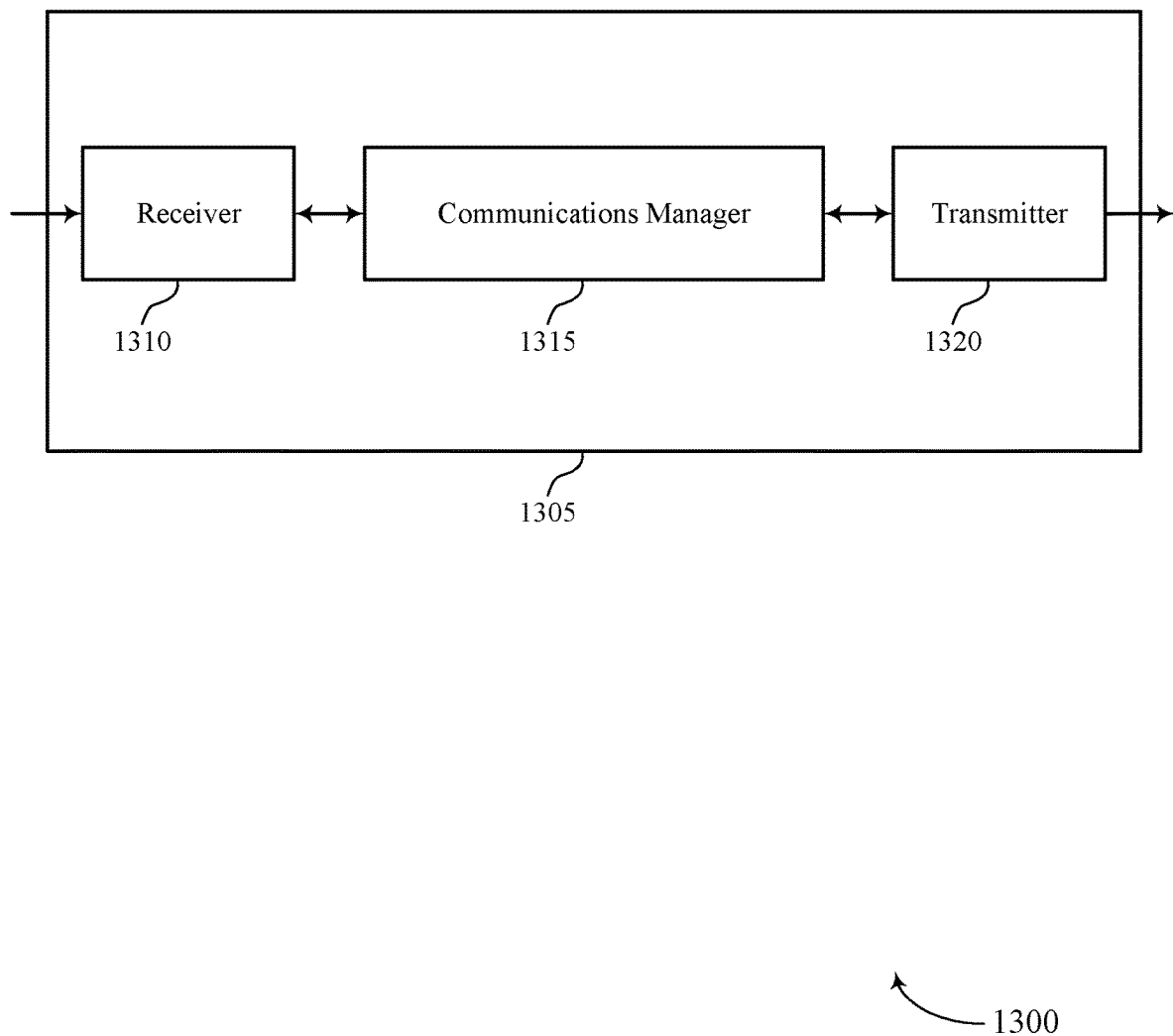
FIGS. 13 and 14 show block diagrams of devices that support handover techniques in wireless communications in accordance with aspects of the present disclosure.

FIG. 13 shows a block diagram 1300 of a device 1305 that supports handover techniques in wireless communications in accordance with aspects of the present disclosure. The device 1305 may be an example of aspects of a base station 105 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to handover techniques in wireless communications, etc.). Information may be passed on to other components of the device 1305. The receiver 1310 may be an example of aspects of the transceiver 1620 described with reference to FIG. 16. The receiver 1310 may utilize a single antenna or a set of antennas.

In some cases, the base station may be a source base station and the communications manager 1315 may establish a first connection with a UE, initiate a handover procedure to handover the UE to a second base station, where the first connection with the first base station is maintained during the handover procedure. In some cases, the base station may discontinue the handover procedure to handover the UE to the second base station, based on an indication of a failure of the handover procedure.

In some cases, the base station may be a target base station and the communications manager 1315 may also receive a handover message to initiate a handover of a UE from a first or source base station to the target base station, and initiate, responsive to the handover message, a connection establishment with the UE to establish a second connection between the UE and the target base station. In some cases, the target base station may receive from the UE an indication of a failure of a first connection between the UE and the first base station, where the first connection was to be maintained during the handover of the UE from the first base station to the target base station, and forward the indication of the failure of the first connection to the first base station.

In some cases, when the base station is a source base station, the communications manager 1315 may also establish a first connection with a UE, initiate a handover of the UE to a second base station, where the first connection with the first base station is maintained during the handover and an establishment of a second connection between the UE and the second base station, and may modify the handover of the UE based on a measurement report from the UE.

In some cases, when the base station is a target base station, the communications manager 1315 may also receive a handover message to initiate a handover of a UE from the first base station to the target base station, modify the handover of the UE based on a measurement report, establish a second connection with the UE responsive to the handover message, and receive a measurement report from the UE that includes one or more channel measurements associated with the first base station and the target base station.

In some cases, the base station may be a source base station, and may receive from a target base station a role switch indication that indicates that the second connection between the UE and the target base station is a primary connection of the UE. The communications manager 1315 may also transmit, when the base station is a target base station, responsive to the establishing the second connection, a role switch indication to the source base station that indicates that the second connection between the UE and the target base station is a primary connection of the UE. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
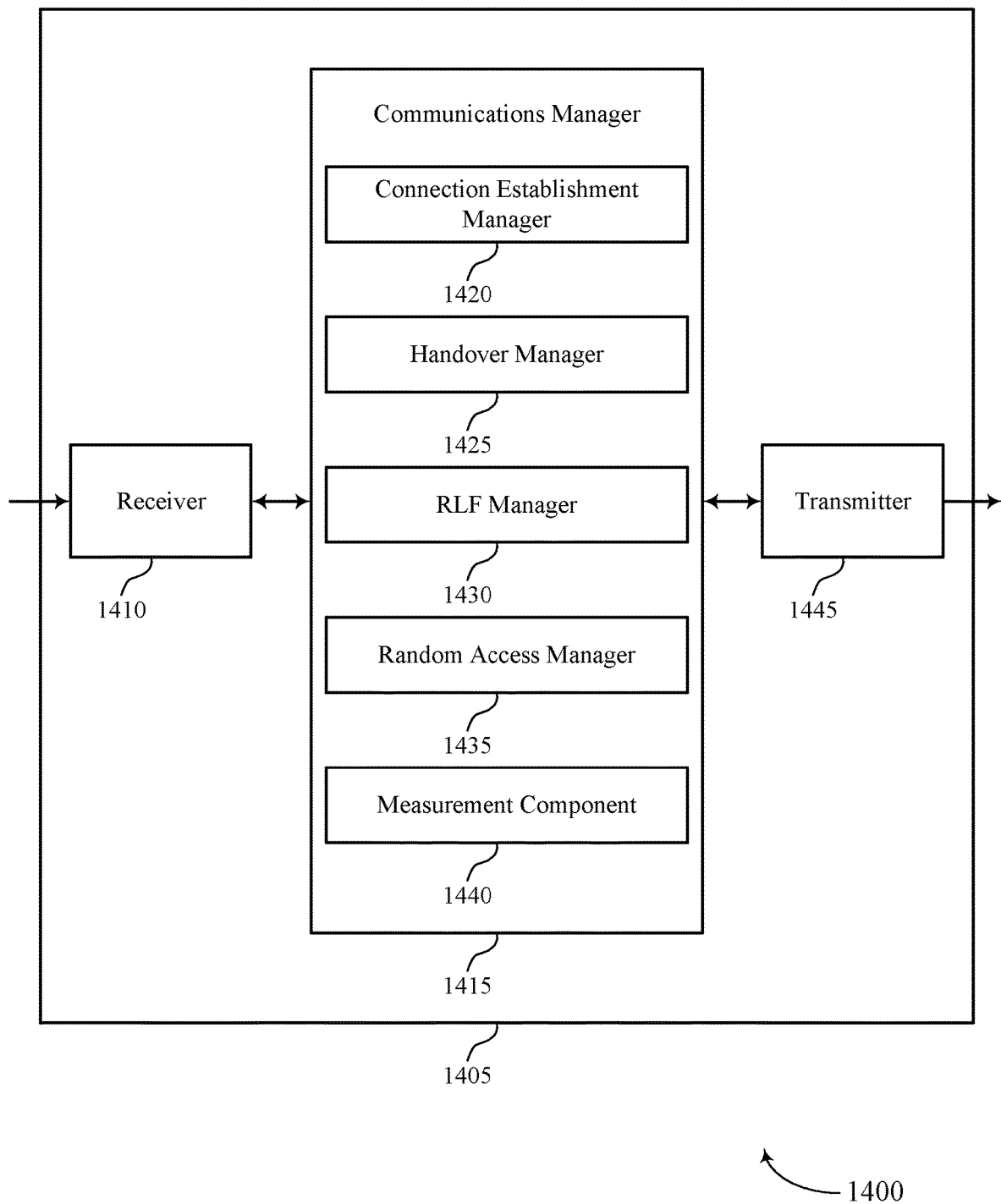

FIG. 14 shows a block diagram 1400 of a device 1405 that supports handover techniques in wireless communications in accordance with aspects of the present disclosure. The device 1405 may be an example of aspects of a device 1305, or a base station 105 as described herein. The device 1405 may include a receiver 1410, a communications manager 1415, and a transmitter 1445. The device 1405 may also include a processor. Each of these components may be in communication with one another (e.g., via one or more buses).

The receiver 1410 may receive information such as packets, user data, or control information associated with various information channels (e.g., control channels, data channels, and information related to handover techniques in wireless communications, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a connection establishment manager 1420, a handover manager 1425, a RLF manager 1430, a random access manager 1435, and a measurement component 1440. The communications manager 1415 may be an example of aspects of the communications manager 1610 described herein.

The connection establishment manager 1420 may establish, at a first base station, a first connection with a UE.

The handover manager 1425 may initiate a handover procedure to handover the UE to a second base station, where the first connection with the first base station is maintained during the handover procedure, and discontinue the handover procedure to handover the UE to the second base station in some cases. In some cases, the handover manager 1425 may modify the handover of the UE based on a measurement report. In some cases, the handover manager 1425 receive a role switch indication that indicates a primary connection and secondary connection are to be switched.

The RLF manager 1430 may receive, from the UE, an indication of a failure of the handover procedure. In some cases, the RLF manager 1430 may be associated with a target second base station, and may receive from the UE an indication of a failure of a first connection between the UE and the first base station, where the first connection was to be maintained during the handover of the UE from the first base station to the second base station and forward the indication of the failure of the first connection to the first base station.

The random access manager 1435 may initiate, responsive to the handover message, a connection establishment with the UE to establish a second connection between the UE and the second base station.

The measurement component 1440 may receive a measurement report responsive to the initiating the handover. In some cases, the measurement report from the UE may include one or more channel measurements associated with the first base station and the second base station.

The transmitter 1445 may transmit signals generated by other components of the device 1405. In some examples, the transmitter 1445 may be collocated with a receiver 1410 in a transceiver module. For example, the transmitter 1445 may be an example of aspects of the transceiver 1620 described with reference to FIG. 16. The transmitter 1445 may utilize a single antenna or a set of antennas.

Figure 15:
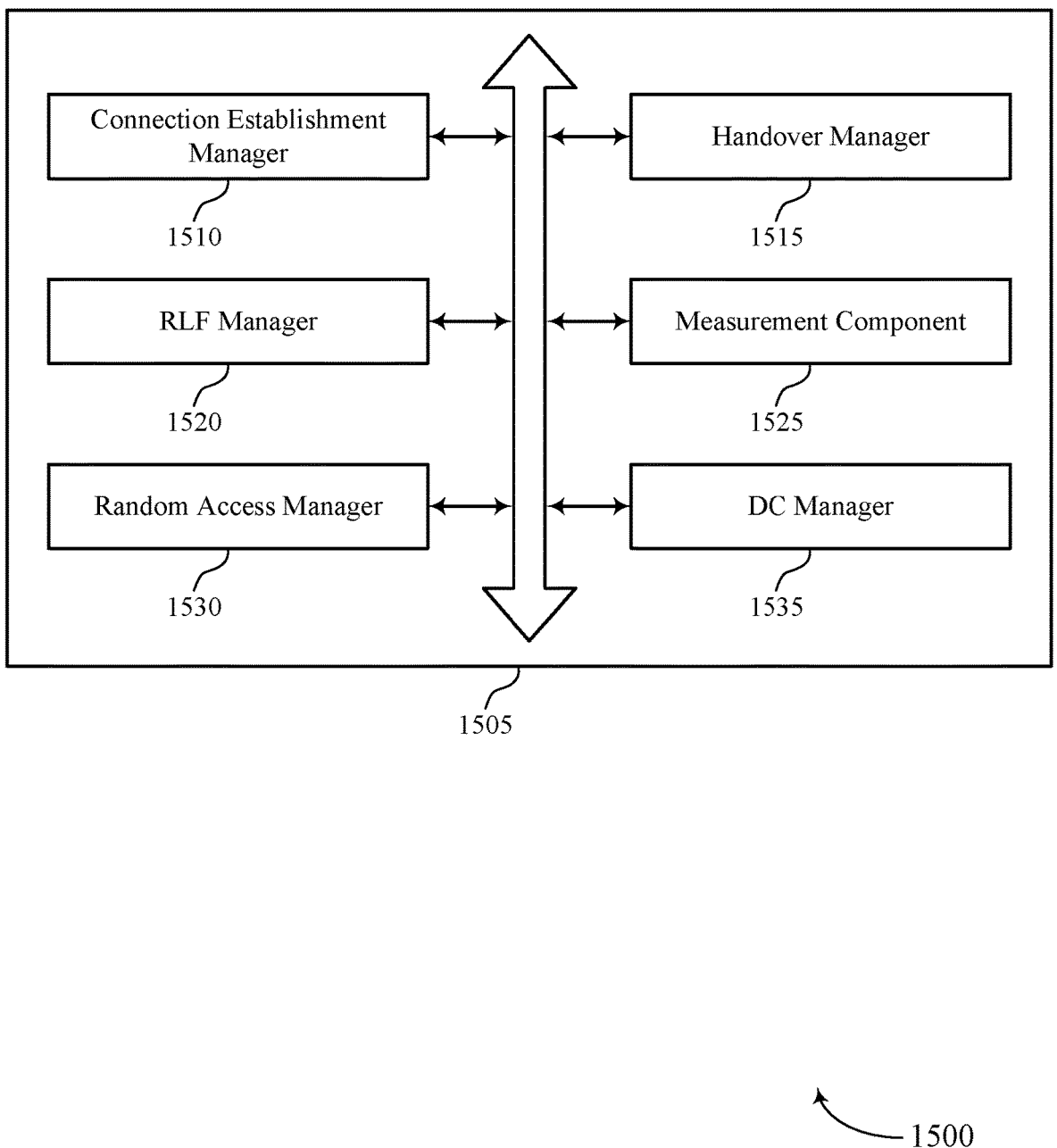
FIG. 15 shows a block diagram of a communications manager that supports handover techniques in wireless communications in accordance with aspects of the present disclosure.

FIG. 15 shows a block diagram 1500 of a communications manager 1505 that supports handover techniques in wireless communications in accordance with aspects of the present disclosure. The communications manager 1505 may be an example of aspects of a communications manager 1315, a communications manager 1415, or a communications manager 1610 described herein. The communications manager 1505 may include a connection establishment manager 1510, a handover manager 1515, a RLF manager 1520, a measurement component 1525, a random access manager 1530, and a DC manager 1535. Each of these modules may communicate, directly or indirectly, with one another (e.g., via one or more buses).

The connection establishment manager 1510 may establish, at a first base station, a first connection with a UE. In some examples, the connection establishment manager 1510 may be associated with a second base station and may establish a second connection with the UE responsive to the handover message.

The handover manager 1515 may initiate a handover procedure to handover the UE to a second base station, where the first connection with the first base station is maintained during the handover procedure. In some examples, the handover manager 1515 may discontinue the handover procedure to handover the UE to the second base station. In some examples, the handover manager 1515 may receive, at a second base station, a handover message to initiate a handover of a UE from a first base station to the second base station.

In some examples, the handover manager 1515 may initiate a handover of the UE to a second base station, where the first connection with the first base station is maintained during the handover and an establishment of a second connection between the UE and the second base station. In some examples, the handover manager 1515 may modify the handover of the UE based on the measurement report.

In some examples, the handover manager 1515 may receive, from the second base station, a role switch indication that indicates that the second connection between the UE and the second base station is a primary connection of the UE. In some examples, the handover manager 1515 may be associated with the second base station, and may transmit, responsive to the establishing the second connection, a role switch indication to the first base station that indicates that the second connection between the UE and the second base station is a primary connection of the UE.

In some examples, the handover manager 1515 may be associated with a first base station and may transmit, to the second base station and responsive to the receiving the indication of the failure of the handover procedure, a message to the second base station to cancel the handover procedure. In some examples, the handover manager 1515 may initiate a second handover procedure to handover the UE to a third base station, where the first connection with the first base station is maintained during the second handover procedure. In some examples, the handover manager 1515 may transmit, to the UE, a reconfiguration message indicating the UE is to perform the second handover procedure with the third base station.

In some examples, the handover manager 1515 may transmit an indication to the second base station that the handover of the UE to the second base station is aborted. In some examples, the handover manager 1515 may release the second connection after the first connection has been a primary connection for a predetermined time period. In some examples, the handover manager 1515 may release the first connection with the UE responsive to a role switch indication.

The RLF manager 1520 may receive, from the UE, an indication of a failure of the handover procedure. In some examples, the first connection was to be maintained during the handover of the UE from the first base station to the second base station. In some examples, the RLF manager 1520 may forward the indication of the failure of the first connection to the first base station. In some examples, the radio link failure message from the UE may indicate a timer expiration associated with a random access procedure to establish a second connection with the second base station.

In some examples, the RLF manager 1520 may receive a radio link failure message from the UE indicating a second connection with the second base station was established and then failed. In some cases, the radio link failure message indicates a failure cause associated with the second connection, and where the failure cause indicates one or more or a timer expiration associated with the second connection, a random access procedure failure, or a maximum number of retransmissions is reached for a communication using the second connection. In some cases, the radio link failure message further indicates a target cell group identification associated with the second base station. In some cases, the indication of the failure of the first connection indicates that resources and context associated with the first connection are to be deleted. In some cases, the indication of the failure of the first connection includes a failure cause associated with the first connection and a source cell group identification associated with the first base station.

The measurement component 1525 may receive a measurement report responsive to the initiating the handover. In some examples, the measurement component 1525 may receive a measurement report from the UE that includes one or more channel measurements associated with the first base station and the second base station. In some examples, the measurement component 1525 may receive one or more additional measurement reports.

In some cases, the indication of the failure of the handover procedure further indicates a measurement of one or more signals received at the UE from a neighboring base station. In some cases, the indication of the failure of the first connection further includes a measurement of one or more signals received at the UE from a neighboring base station. In some cases, the measurement report is transmitted responsive to the measured one or more channel conditions of the secondary connection being better than corresponding channel conditions of the primary connection. In some cases, the measurement report is transmitted responsive to measured channel conditions of a third base station being better than measured channel conditions of the second base station.

The random access manager 1530 may initiate, responsive to the handover message, a connection establishment with the UE to establish a second connection between the UE and the second base station.

The DC manager 1535 may receive, from the second base station prior to receiving the measurement report, a role switch indication that indicates that a second connection between the UE and the second base station is a primary connection of the UE and the first connection is a secondary connection. In some examples, the modifying the handover of the UE includes reconfiguring the first connection to be the primary connection and the second connection to be the secondary connection based on the measurement report. In some examples, the DC manager 1535 may further reconfigure the primary connection and the secondary connection based on the one or more additional measurement reports.

In some examples, the DC manager 1535 may exchange information with the second base station to establish duplication of data communicated with the UE via both the first connection and the second connection. In some examples, the DC manager 1535 may communicate duplicated data with the UE via the first connection. In some examples, the DC manager 1535 may transmit, responsive to the measurement report, a reconfiguration message to the UE to abort the handover procedure with the second base station.

In some examples, the DC manager 1535 may transmit, to the first base station prior to receiving the measurement report, a role switch indication that indicates that a second connection between the UE and the second base station is a primary connection of the UE and a first connection between the UE and the first base station is a secondary connection. In some examples, the modifying the handover of the UE includes reconfiguring the first connection to be the primary connection and the second connection to be the secondary connection based on the measurement report.

In some examples, the DC manager 1535 may configure one or more secondary node (SN) terminated bearers at the second base station for the second connection. In some examples, the DC manager 1535 may transmit a reconfiguration message to the UE that indicates the handover to the second base station. In some examples, the DC manager 1535 may transmit a role switch request to the second base station. In some examples, the DC manager 1535 may receive an acknowledgment of the role switch request from the second base station.

In some cases, the role switch request is transmitted with a SN addition request to the second base station, and the acknowledgment of the role switch request is received with a SN addition acknowledgment from the second base station. In some cases, the reconfiguration message to the UE indicates a secondary carrier group associated with the second connection and a source cell group identification associated with the first connection. In some cases, the role switch indication is received subsequent to performance of a random access procedure between the second base station and the UE.

Figure 16:
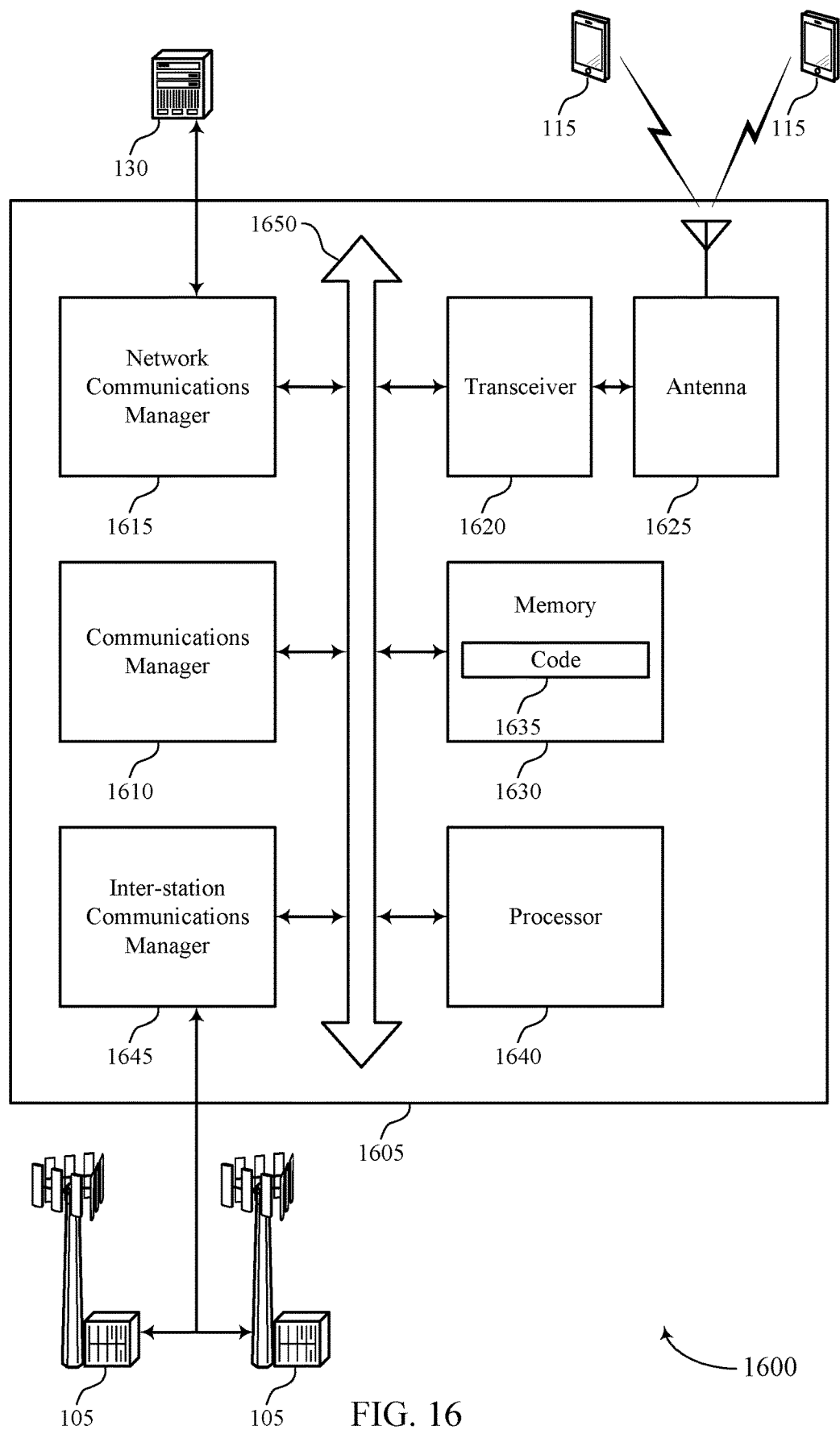
FIG. 16 shows a diagram of a system including a device that supports handover techniques in wireless communications in accordance with aspects of the present disclosure.

FIG. 16 shows a diagram of a system 1600 including a device 1605 that supports handover techniques in wireless communications in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The communications manager 1610 may establish, at a first base station, a first connection with a UE, initiate a handover procedure to handover the UE to a second base station, where the first connection with the first base station is maintained during the handover procedure, discontinue the handover procedure to handover the UE to the second base station, and receive, from the UE, an indication of a failure of the handover procedure. The communications manager 1610 may also receive, at a second base station, a handover message to initiate a handover of a UE from a first base station to the second base station, initiate, responsive to the handover message, a connection establishment with the UE to establish a second connection between the UE and the second base station, receive from the UE an indication of a failure of a first connection between the UE and the first base station, where the first connection was to be maintained during the handover of the UE from the first base station to the second base station, and forward the indication of the failure of the first connection to the first base station. The communications manager 1610 may also establish, at a first base station, a first connection with a UE, initiate a handover of the UE to a second base station, where the first connection with the first base station is maintained during the handover and an establishment of a second connection between the UE and the second base station, modify the handover of the UE based on the measurement report, and receive a measurement report responsive to the initiating the handover. The communications manager 1610 may also receive, at a second base station from a first base station, a handover message to initiate a handover of a UE from the first base station to the second base station, modify the handover of the UE based on the measurement report, establish a second connection with the UE responsive to the handover message, and receive a measurement report from the UE that includes one or more channel measurements associated with the first base station and the second base station. The communications manager 1610 may also establish, at a first base station, a first connection with a UE, initiate a handover of the UE to a second base station, where the first connection with the first base station is maintained during the handover and an establishment of a second connection between the UE and the second base station, and receive, from the second base station, a role switch indication that indicates that the second connection between the UE and the second base station is a primary connection of the UE. The communications manager 1610 may also receive, at a second base station from a first base station, a handover message to initiate a handover of a UE from the first base station to the second base station, transmit, responsive to the establishing the second connection, a role switch indication to the first base station that indicates that the second connection between the UE and the second base station is a primary connection of the UE, and establish a second connection with the UE responsive to the handover message.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting handover techniques in wireless communications).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
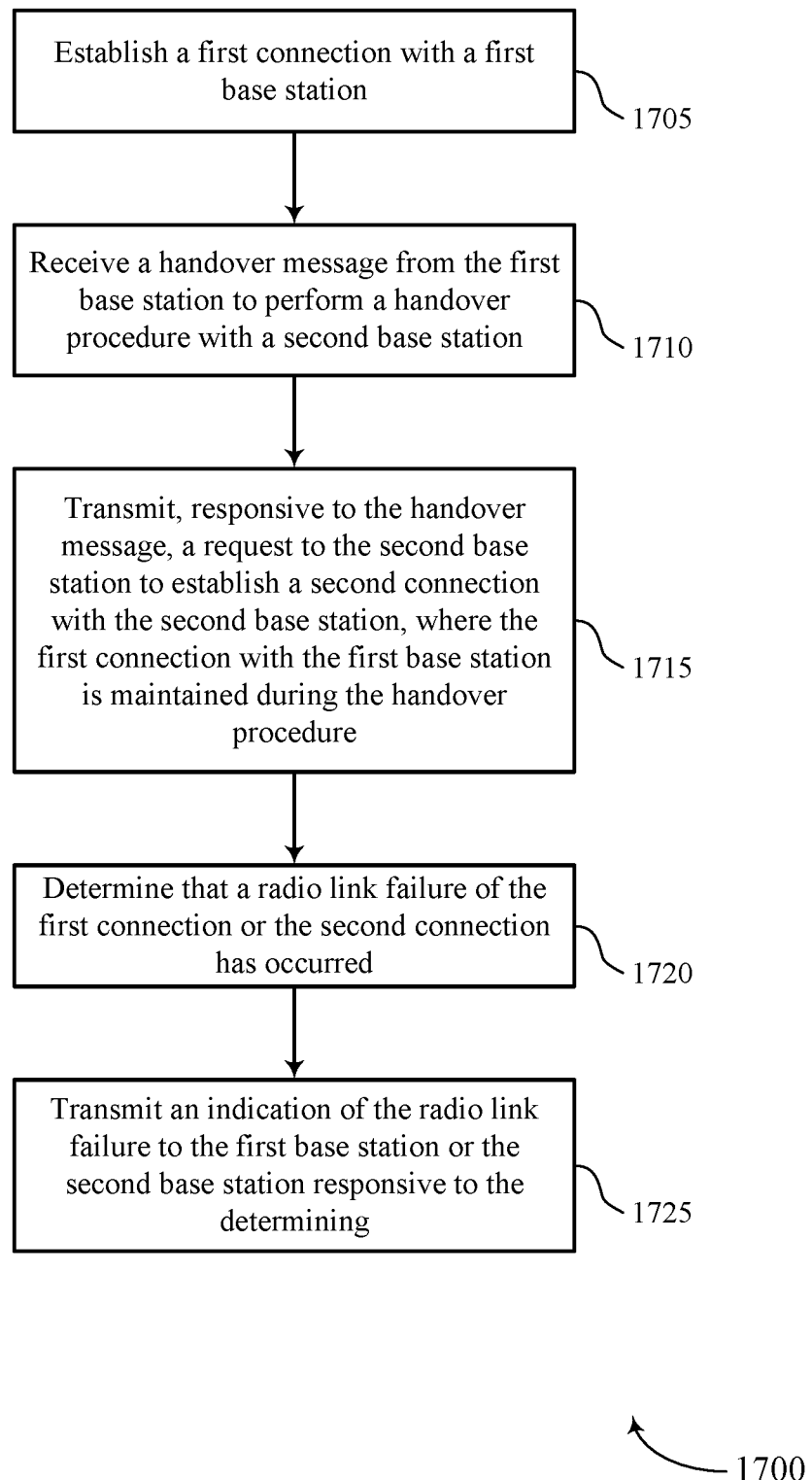
FIGS. 17 through 28 show flowcharts illustrating methods that support handover techniques in wireless communications in accordance with aspects of the present disclosure.

FIG. 17 shows a flowchart illustrating a method 1700 that supports handover techniques in wireless communications in accordance with aspects of the present disclosure. The operations of method 1700 may be implemented by a UE 115 or its components as described herein. For example, the operations of method 1700 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1705, the UE may establish a first connection with a first base station. The operations of 1705 may be performed according to the methods described herein. In some examples, aspects of the operations of 1705 may be performed by a connection establishment manager as described with reference to FIGS. 9 through 12.

At 1710, the UE may receive a handover message from the first base station to perform a handover procedure with a second base station. The operations of 1710 may be performed according to the methods described herein. In some examples, aspects of the operations of 1710 may be performed by a handover manager as described with reference to FIGS. 9 through 12.

At 1715, the UE may transmit, responsive to the handover message, a request to the second base station to establish a second connection with the second base station, where the first connection with the first base station is maintained during the handover procedure. The operations of 1715 may be performed according to the methods described herein. In some examples, aspects of the operations of 1715 may be performed by a random access manager as described with reference to FIGS. 9 through 12.

At 1720, the UE may determine that a radio link failure of the first connection or the second connection has occurred. The operations of 1720 may be performed according to the methods described herein. In some examples, aspects of the operations of 1720 may be performed by a RLF manager as described with reference to FIGS. 9 through 12.

At 1725, the UE may transmit an indication of the radio link failure to the first base station or the second base station responsive to the determining. The operations of 1725 may be performed according to the methods described herein. In some examples, aspects of the operations of 1725 may be performed by a RLF manager as described with reference to FIGS. 9 through 12.

Figure 18:
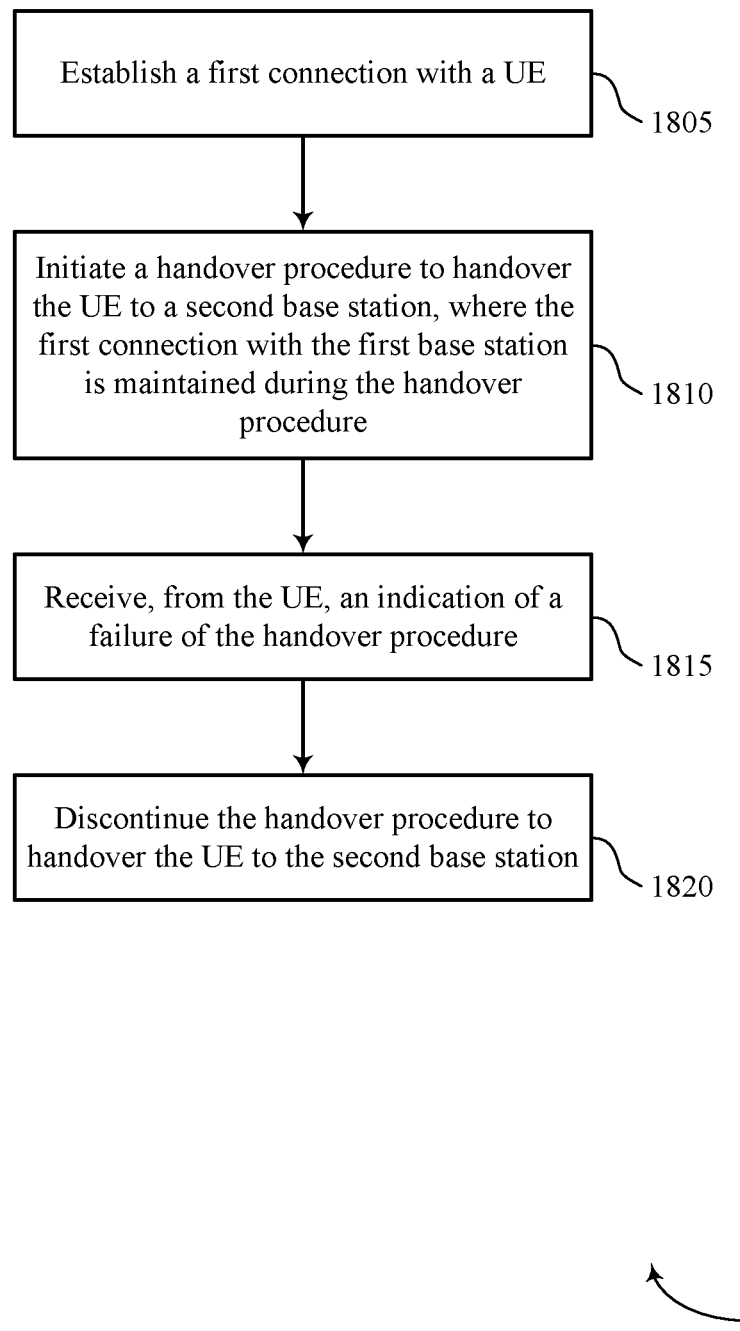

FIG. 18 shows a flowchart illustrating a method 1800 that supports handover techniques in wireless communications in accordance with aspects of the present disclosure. The operations of method 1800 may be implemented by a base station 105 or its components as described herein. For example, the operations of method 1800 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 1805, the base station may be a first base station (e.g., a source base station), and may establish a first connection with a UE. The operations of 1805 may be performed according to the methods described herein. In some examples, aspects of the operations of 1805 may be performed by a connection establishment manager as described with reference to FIGS. 13 through 16.

At 1810, the base station may initiate a handover procedure to handover the UE to a second base station, where the first connection with the first base station is maintained during the handover procedure. The operations of 1810 may be performed according to the methods described herein. In some examples, aspects of the operations of 1810 may be performed by a handover manager as described with reference to FIGS. 13 through 16.

At 1815, the base station may receive, from the UE, an indication of a failure of the handover procedure. The operations of 1815 may be performed according to the methods described herein. In some examples, aspects of the operations of 1815 may be performed by a RLF manager as described with reference to FIGS. 13 through 16.

At 1820, the base station may discontinue the handover procedure to handover the UE to the second base station. The operations of 1820 may be performed according to the methods described herein. In some examples, aspects of the operations of 1820 may be performed by a handover manager as described with reference to FIGS. 13 through 16.

Figure 19:
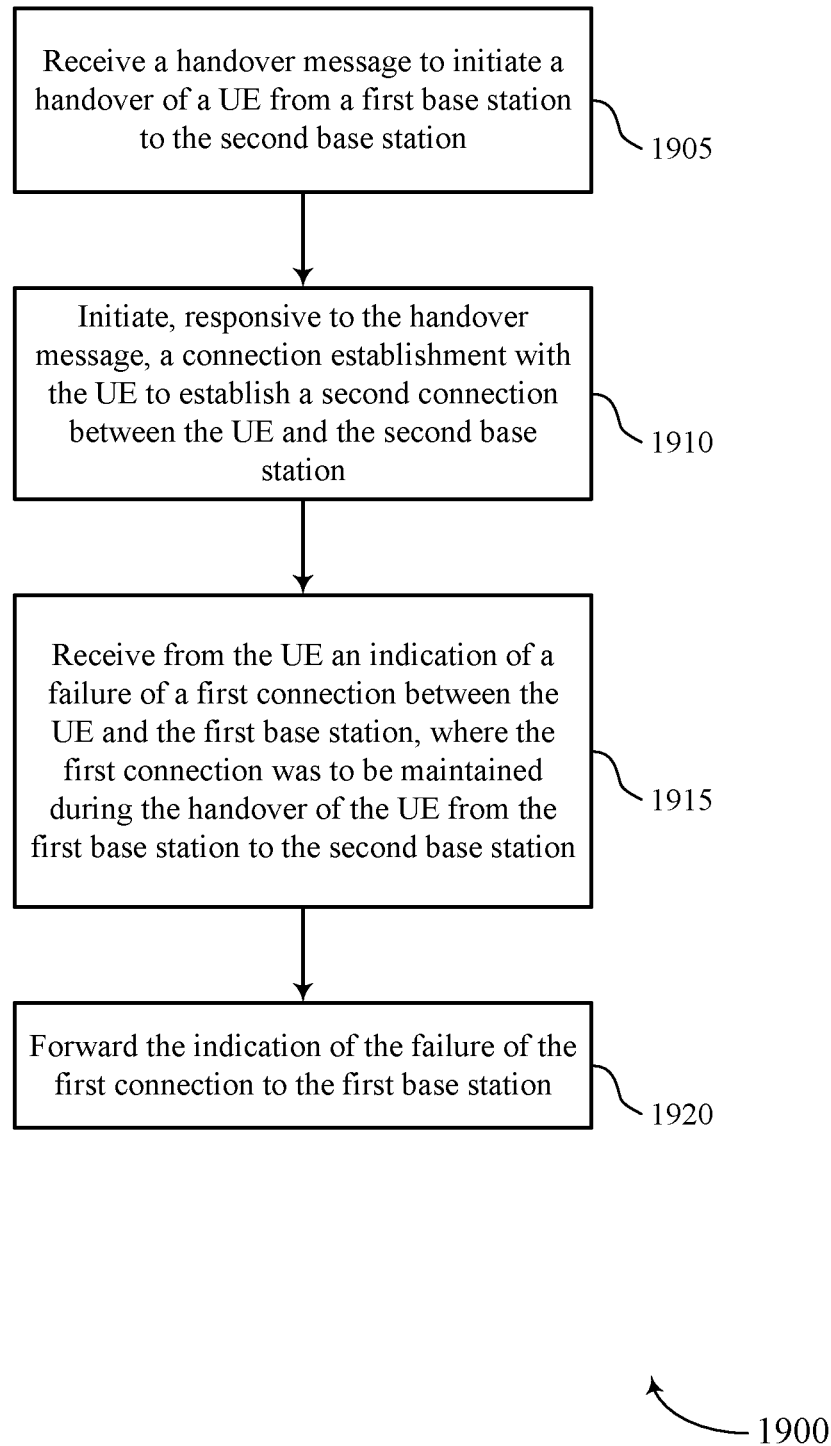

FIG. 19 shows a flowchart illustrating a method 1900 that supports handover techniques in wireless communications in accordance with aspects of the present disclosure. The operations of method 1900 may be implemented by a base station 105 or its components as described herein. For example, the operations of method 1900 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 1905, the base station may be a second base station (e.g., a target base station), and may receive a handover message to initiate a handover of a UE from a first base station to the second base station. The operations of 1905 may be performed according to the methods described herein. In some examples, aspects of the operations of 1905 may be performed by a handover manager as described with reference to FIGS. 13 through 16.

At 1910, the base station may initiate, responsive to the handover message, a connection establishment with the UE to establish a second connection between the UE and the second base station. The operations of 1910 may be performed according to the methods described herein. In some examples, aspects of the operations of 1910 may be performed by a random access manager as described with reference to FIGS. 13 through 16.

At 1915, the base station may receive from the UE an indication of a failure of a first connection between the UE and the first base station, where the first connection was to be maintained during the handover of the UE from the first base station to the second base station. The operations of 1915 may be performed according to the methods described herein. In some examples, aspects of the operations of 1915 may be performed by a RLF manager as described with reference to FIGS. 13 through 16.

At 1920, the base station may forward the indication of the failure of the first connection to the first base station. The operations of 1920 may be performed according to the methods described herein. In some examples, aspects of the operations of 1920 may be performed by a RLF manager as described with reference to FIGS. 13 through 16.

Figure 20:
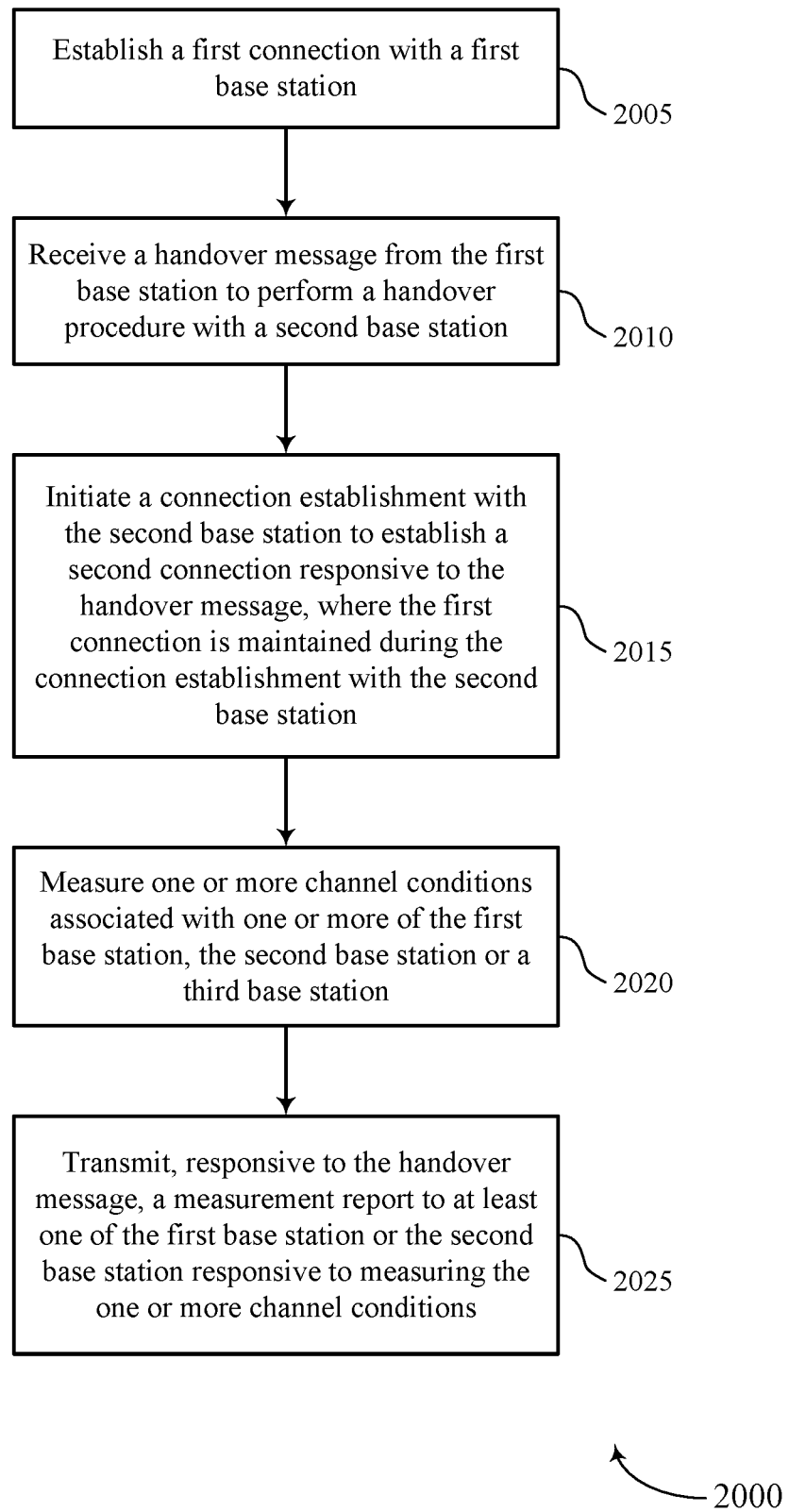

FIG. 20 shows a flowchart illustrating a method 2000 that supports handover techniques in wireless communications in accordance with aspects of the present disclosure. The operations of method 2000 may be implemented by a UE 115 or its components as described herein. For example, the operations of method 2000 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 2005, the UE may establish a first connection with a first base station. The operations of 2005 may be performed according to the methods described herein. In some examples, aspects of the operations of 2005 may be performed by a connection establishment manager as described with reference to FIGS. 9 through 12.

At 2010, the UE may receive a handover message from the first base station to perform a handover procedure with a second base station. The operations of 2010 may be performed according to the methods described herein. In some examples, aspects of the operations of 2010 may be performed by a handover manager as described with reference to FIGS. 9 through 12.

At 2015, the UE may initiate a connection establishment with the second base station to establish a second connection responsive to the handover message, where the first connection is maintained during the connection establishment with the second base station. The operations of 2015 may be performed according to the methods described herein. In some examples, aspects of the operations of 2015 may be performed by a random access manager as described with reference to FIGS. 9 through 12.

At 2020, the UE may measure one or more channel conditions associated with one or more of the first base station, the second base station or a third base station. The operations of 2020 may be performed according to the methods described herein. In some examples, aspects of the operations of 2020 may be performed by a measurement component as described with reference to FIGS. 9 through 12.

At 2025, the UE may transmit, responsive to the handover message, a measurement report to at least one of the first base station or the second base station responsive to measuring the one or more channel conditions. The operations of 2025 may be performed according to the methods described herein. In some examples, aspects of the operations of 2025 may be performed by a measurement component as described with reference to FIGS. 9 through 12.

Figure 21:
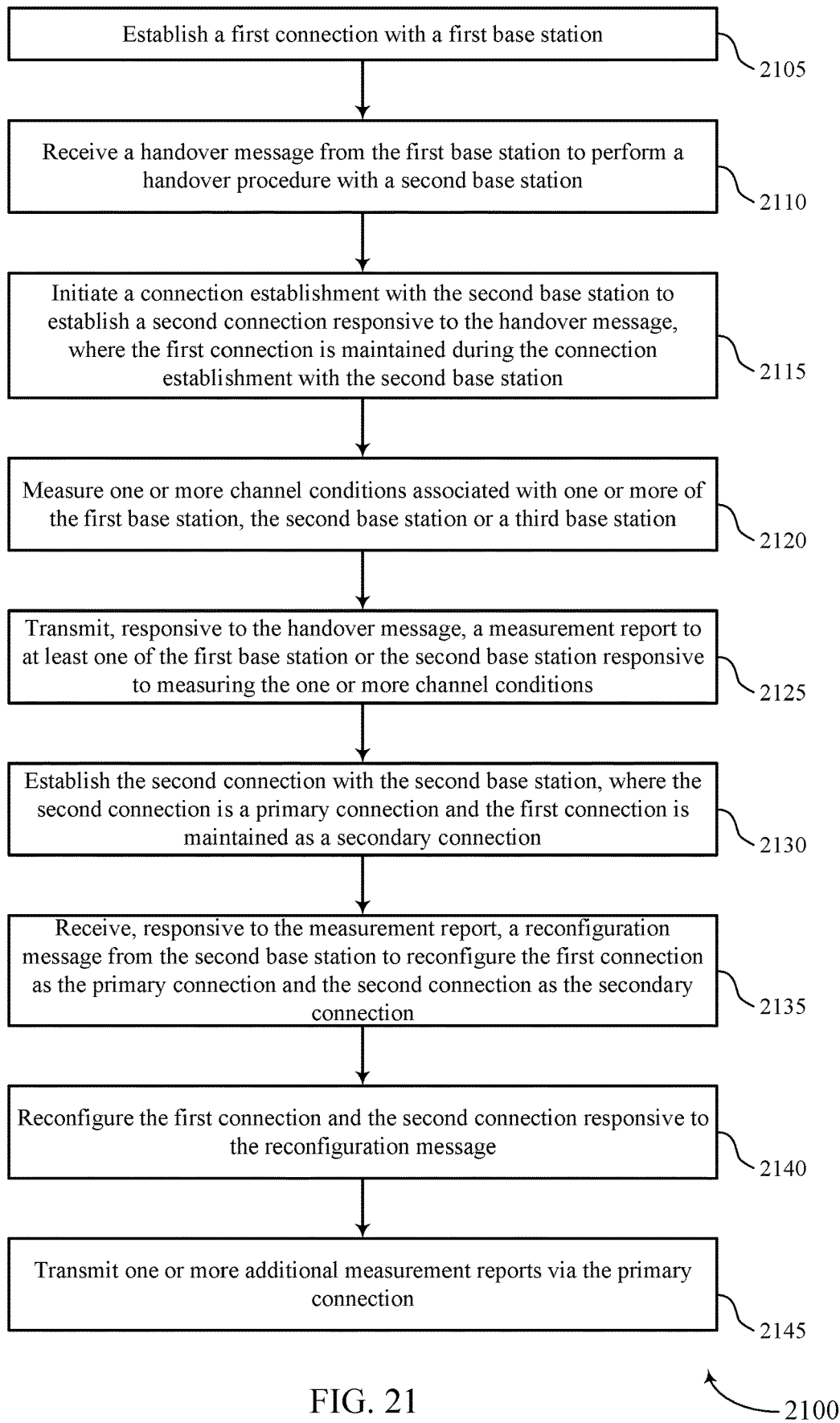

FIG. 21 shows a flowchart illustrating a method 2100 that supports handover techniques in wireless communications in accordance with aspects of the present disclosure. The operations of method 2100 may be implemented by a UE 115 or its components as described herein. For example, the operations of method 2100 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 2105, the UE may establish a first connection with a first base station. The operations of 2105 may be performed according to the methods described herein. In some examples, aspects of the operations of 2105 may be performed by a connection establishment manager as described with reference to FIGS. 9 through 12.

At 2110, the UE may receive a handover message from the first base station to perform a handover procedure with a second base station. The operations of 2110 may be performed according to the methods described herein. In some examples, aspects of the operations of 2110 may be performed by a handover manager as described with reference to FIGS. 9 through 12.

At 2115, the UE may initiate a connection establishment with the second base station to establish a second connection responsive to the handover message, where the first connection is maintained during the connection establishment with the second base station. The operations of 2115 may be performed according to the methods described herein. In some examples, aspects of the operations of 2115 may be performed by a random access manager as described with reference to FIGS. 9 through 12.

At 2120, the UE may measure one or more channel conditions associated with one or more of the first base station, the second base station or a third base station. The operations of 2120 may be performed according to the methods described herein. In some examples, aspects of the operations of 2120 may be performed by a measurement component as described with reference to FIGS. 9 through 12.

At 2125, the UE may transmit, responsive to the handover message, a measurement report to at least one of the first base station or the second base station responsive to measuring the one or more channel conditions. The operations of 2125 may be performed according to the methods described herein. In some examples, aspects of the operations of 2125 may be performed by a measurement component as described with reference to FIGS. 9 through 12.

At 2130, the UE may establish the second connection with the second base station, where the second connection is a primary connection and the first connection is maintained as a secondary connection. The operations of 2130 may be performed according to the methods described herein. In some examples, aspects of the operations of 2130 may be performed by a DC manager as described with reference to FIGS. 9 through 12.

At 2135, the UE may receive, responsive to the measurement report, a reconfiguration message from the second base station to reconfigure the first connection as the primary connection and the second connection as the secondary connection. The operations of 2135 may be performed according to the methods described herein. In some examples, aspects of the operations of 2135 may be performed by a DC manager as described with reference to FIGS. 9 through 12.

At 2140, the UE may reconfigure the first connection and the second connection responsive to the reconfiguration message. The operations of 2140 may be performed according to the methods described herein. In some examples, aspects of the operations of 2140 may be performed by a DC manager as described with reference to FIGS. 9 through 12.

At 2145, the UE may transmit one or more additional measurement reports via the primary connection. The operations of 2145 may be performed according to the methods described herein. In some examples, aspects of the operations of 2145 may be performed by a measurement component as described with reference to FIGS. 9 through 12.

Figure 22:
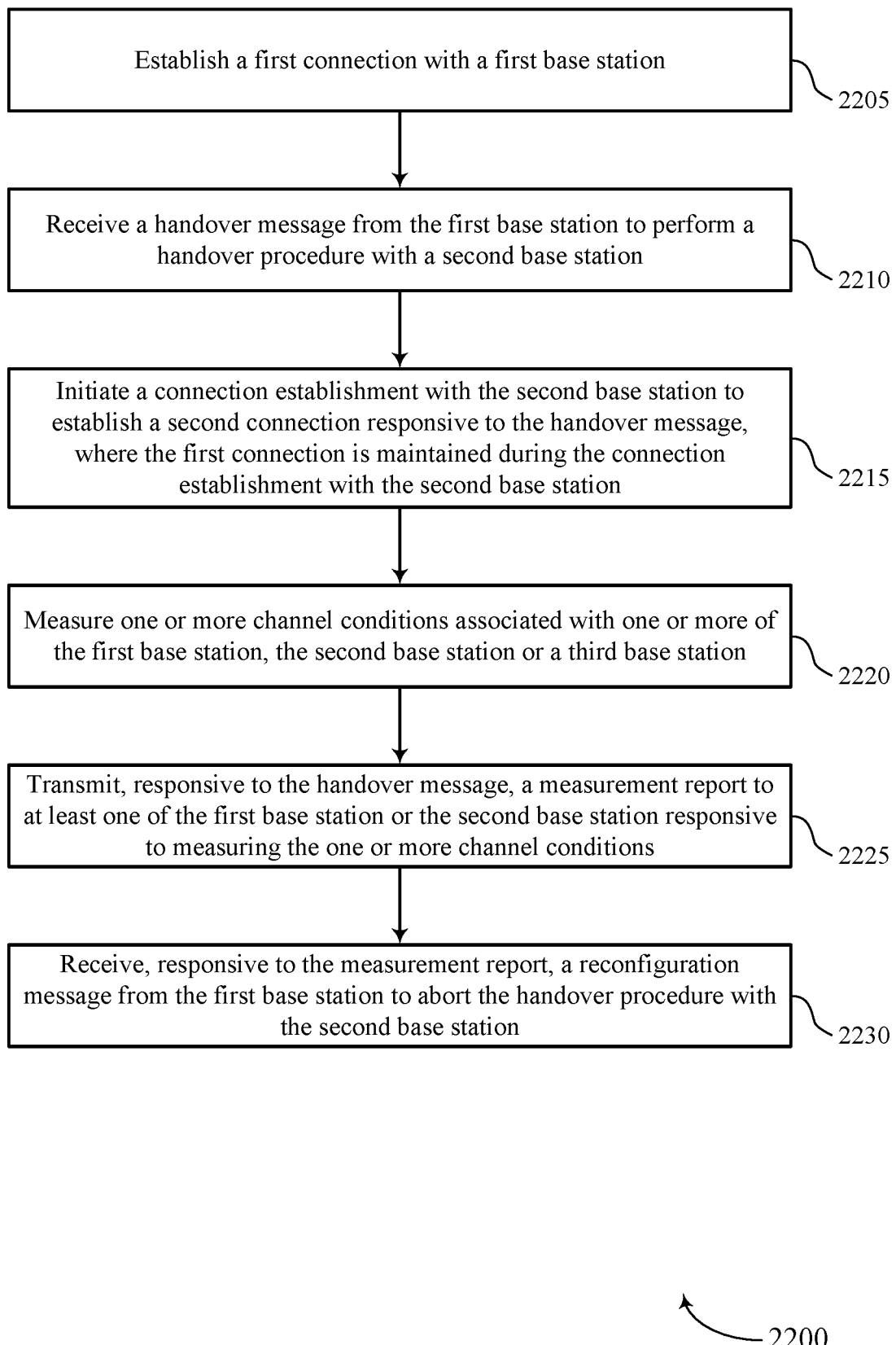

FIG. 22 shows a flowchart illustrating a method 2200 that supports handover techniques in wireless communications in accordance with aspects of the present disclosure. The operations of method 2200 may be implemented by a UE 115 or its components as described herein. For example, the operations of method 2200 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 2205, the UE may establish a first connection with a first base station. The operations of 2205 may be performed according to the methods described herein. In some examples, aspects of the operations of 2205 may be performed by a connection establishment manager as described with reference to FIGS. 9 through 12.

At 2210, the UE may receive a handover message from the first base station to perform a handover procedure with a second base station. The operations of 2210 may be performed according to the methods described herein. In some examples, aspects of the operations of 2210 may be performed by a handover manager as described with reference to FIGS. 9 through 12.

At 2215, the UE may initiate a connection establishment with the second base station to establish a second connection responsive to the handover message, where the first connection is maintained during the connection establishment with the second base station. The operations of 2215 may be performed according to the methods described herein. In some examples, aspects of the operations of 2215 may be performed by a random access manager as described with reference to FIGS. 9 through 12.

At 2220, the UE may measure one or more channel conditions associated with one or more of the first base station, the second base station or a third base station. The operations of 2220 may be performed according to the methods described herein. In some examples, aspects of the operations of 2220 may be performed by a measurement component as described with reference to FIGS. 9 through 12.

At 2225, the UE may transmit, responsive to the handover message, a measurement report to at least one of the first base station or the second base station responsive to measuring the one or more channel conditions. The operations of 2225 may be performed according to the methods described herein. In some examples, aspects of the operations of 2225 may be performed by a measurement component as described with reference to FIGS. 9 through 12.

At 2230, the UE may receive, responsive to the measurement report, a reconfiguration message from the first base station to abort the handover procedure with the second base station. The operations of 2230 may be performed according to the methods described herein. In some examples, aspects of the operations of 2230 may be performed by a DC manager as described with reference to FIGS. 9 through 12. In some cases, the measurement report is transmitted responsive to measured channel conditions of the third base station being better than measured channel conditions of the second base station. In some cases, the reconfiguration message further includes a second handover message from the first base station to perform a second handover procedure with the third base station.

Figure 23:
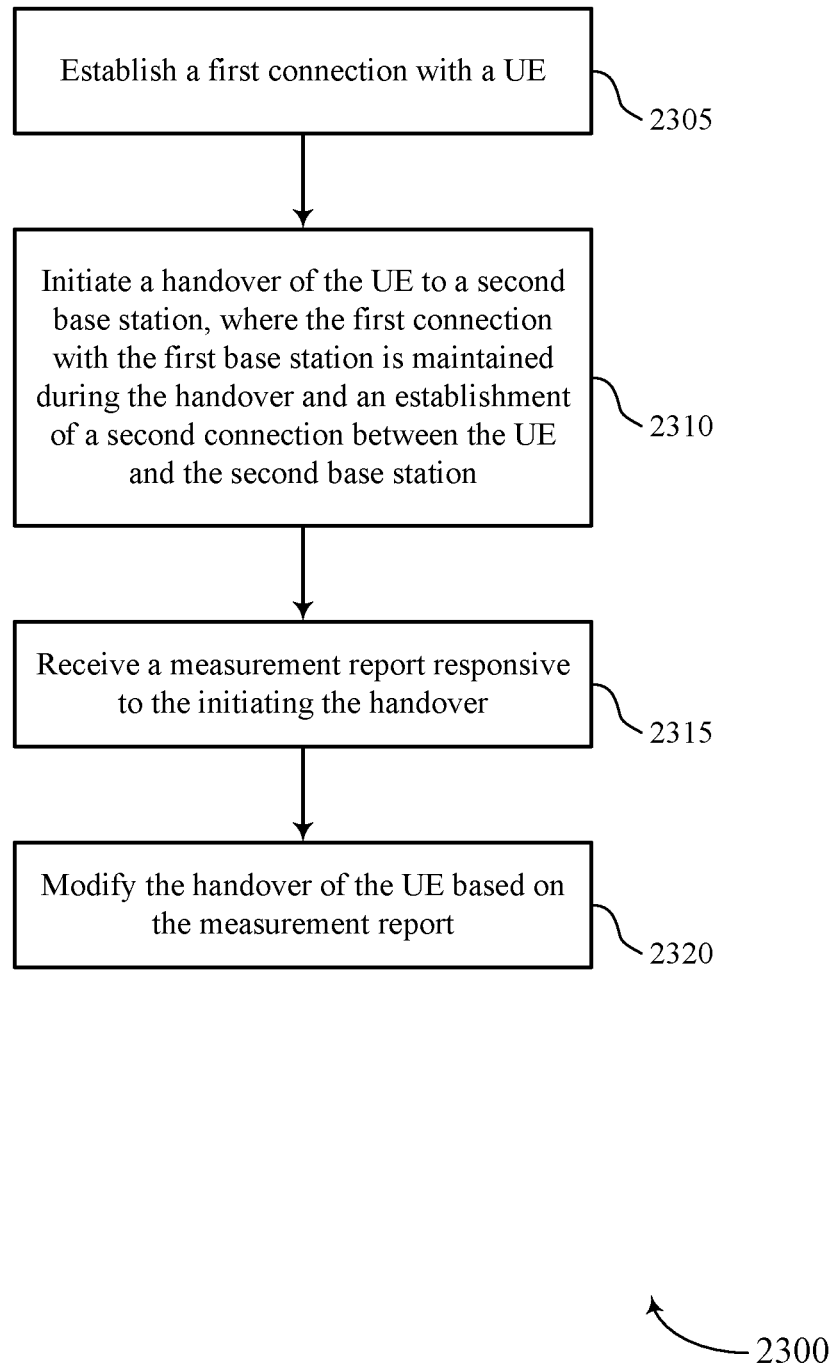

FIG. 23 shows a flowchart illustrating a method 2300 that supports handover techniques in wireless communications in accordance with aspects of the present disclosure. The operations of method 2300 may be implemented by a base station 105 or its components as described herein. For example, the operations of method 2300 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2305, the base station may be a first base station (e.g., a source base station), and may establish a first connection with a UE. The operations of 2305 may be performed according to the methods described herein. In some examples, aspects of the operations of 2305 may be performed by a connection establishment manager as described with reference to FIGS. 13 through 16.

At 2310, the base station may initiate a handover of the UE to a second base station, where the first connection with the first base station is maintained during the handover and an establishment of a second connection between the UE and the second base station. The operations of 2310 may be performed according to the methods described herein. In some examples, aspects of the operations of 2310 may be performed by a handover manager as described with reference to FIGS. 13 through 16.

At 2315, the base station may receive a measurement report responsive to the initiating the handover. The operations of 2315 may be performed according to the methods described herein. In some examples, aspects of the operations of 2315 may be performed by a measurement component as described with reference to FIGS. 13 through 16.

At 2320, the base station may modify the handover of the UE based on the measurement report. The operations of 2320 may be performed according to the methods described herein. In some examples, aspects of the operations of 2320 may be performed by a handover manager as described with reference to FIGS. 13 through 16.

Figure 24:
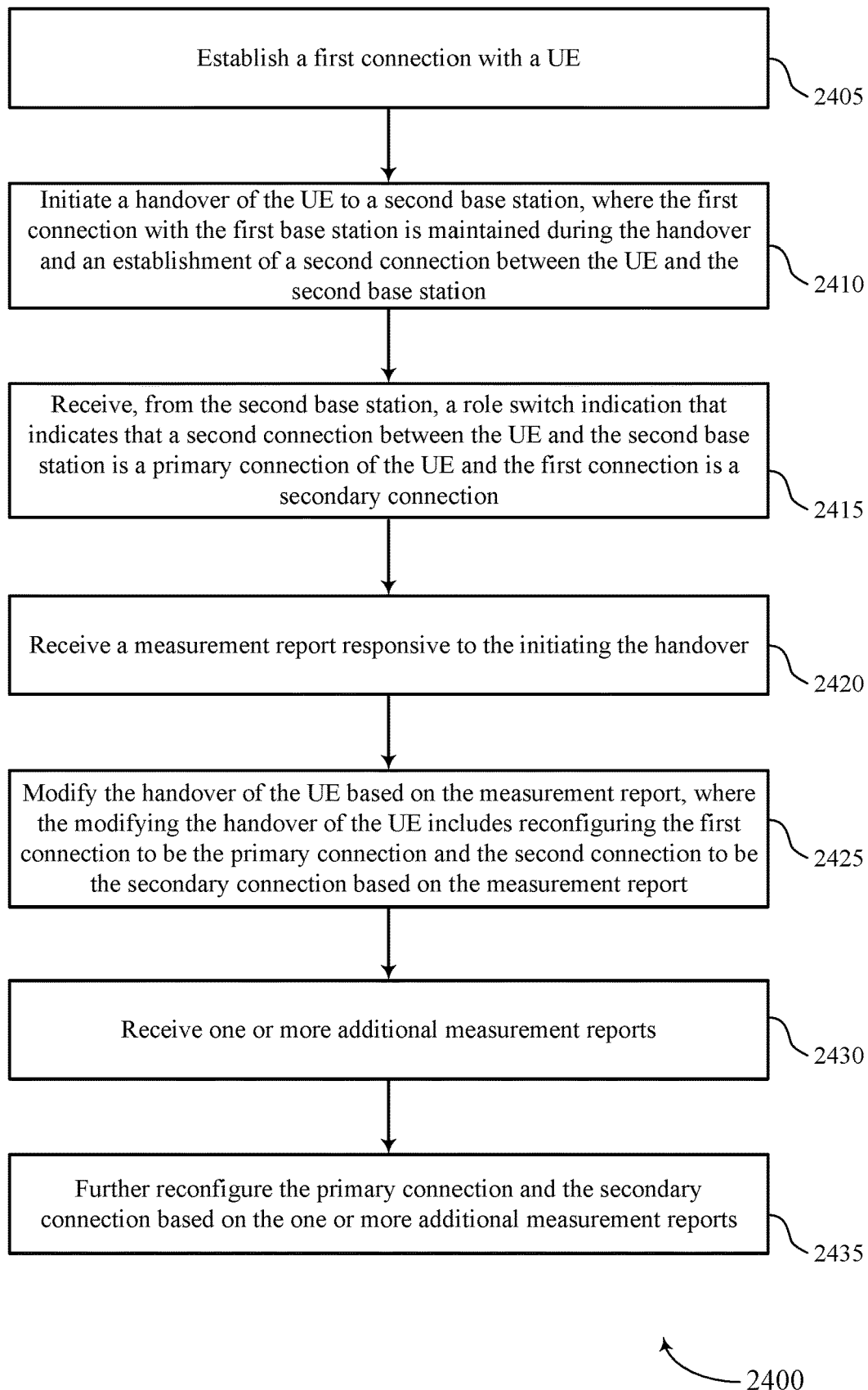

FIG. 24 shows a flowchart illustrating a method 2400 that supports handover techniques in wireless communications in accordance with aspects of the present disclosure. The operations of method 2400 may be implemented by a base station 105 or its components as described herein. For example, the operations of method 2400 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2405, the base station may be a first base station (e.g., a source base station), and may establish a first connection with a UE. The operations of 2405 may be performed according to the methods described herein. In some examples, aspects of the operations of 2405 may be performed by a connection establishment manager as described with reference to FIGS. 13 through 16.

At 2410, the base station may initiate a handover of the UE to a second base station, where the first connection with the first base station is maintained during the handover and an establishment of a second connection between the UE and the second base station. The operations of 2410 may be performed according to the methods described herein. In some examples, aspects of the operations of 2410 may be performed by a handover manager as described with reference to FIGS. 13 through 16.

At 2415, the base station may receive, from the second base station, a role switch indication that indicates that a second connection between the UE and the second base station is a primary connection of the UE and the first connection is a secondary connection. The operations of 2415 may be performed according to the methods described herein. In some examples, aspects of the operations of 2415 may be performed by a DC manager as described with reference to FIGS. 13 through 16.

At 2420, the base station may receive a measurement report responsive to the initiating the handover. The operations of 2420 may be performed according to the methods described herein. In some examples, aspects of the operations of 2420 may be performed by a measurement component as described with reference to FIGS. 13 through 16.

At 2425, the base station may modify the handover of the UE based on the measurement report. The operations of 2425 may be performed according to the methods described herein. In some examples, aspects of the operations of 2425 may be performed by a handover manager as described with reference to FIGS. 13 through 16. In some cases, the modifying the handover of the UE includes reconfiguring the first connection to be the primary connection and the second connection to be the secondary connection based on the measurement report.

At 2430, the base station may receive one or more additional measurement reports. The operations of 2430 may be performed according to the methods described herein. In some examples, aspects of the operations of 2430 may be performed by a measurement component as described with reference to FIGS. 13 through 16.

At 2435, the base station may further reconfigure the primary connection and the secondary connection based on the one or more additional measurement reports. The operations of 2445 may be performed according to the methods described herein. In some examples, aspects of the operations of 2445 may be performed by a DC manager as described with reference to FIGS. 13 through 16. In some cases, the measurement report is transmitted responsive to the measured one or more channel conditions of the secondary connection being better than corresponding channel conditions of the primary connection.

Figure 25:
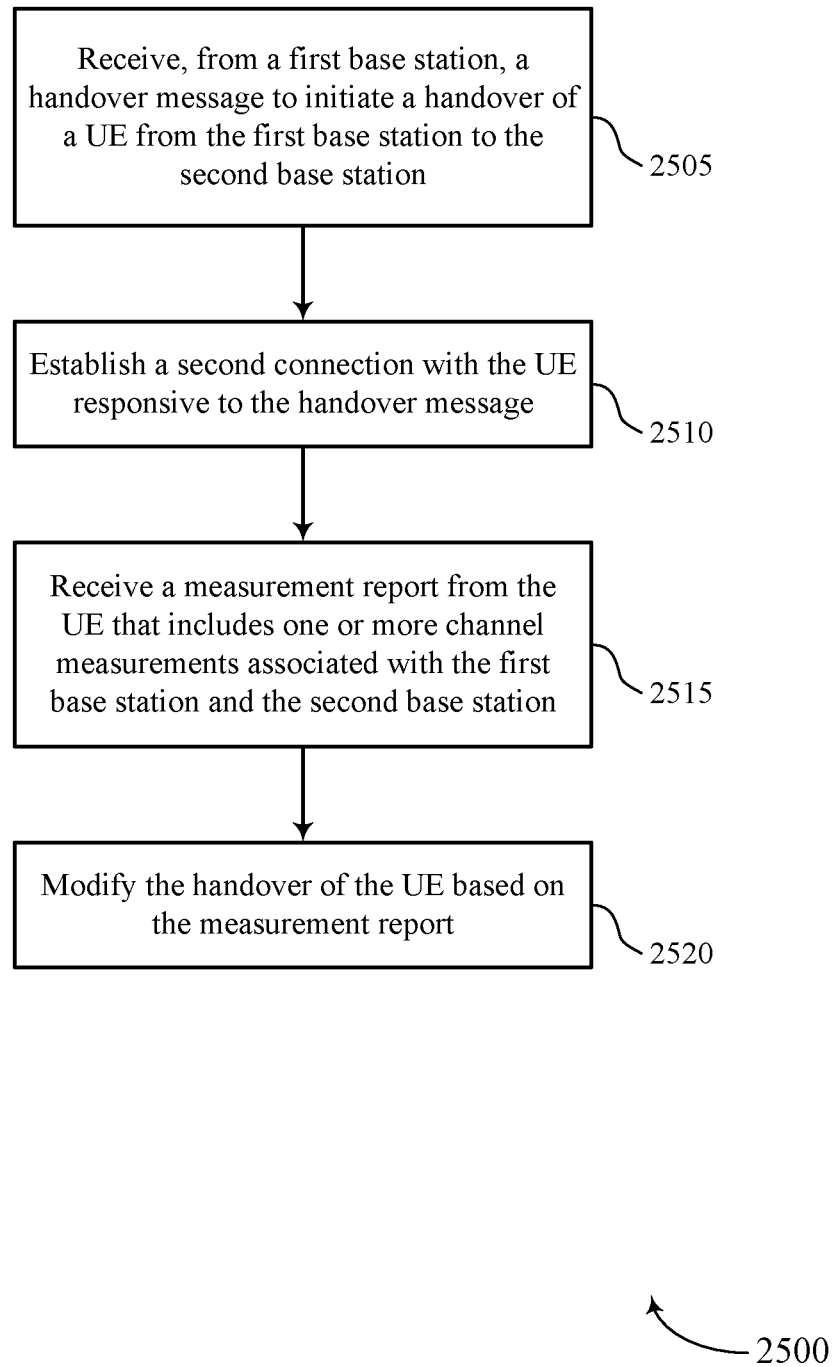

FIG. 25 shows a flowchart illustrating a method 2500 that supports handover techniques in wireless communications in accordance with aspects of the present disclosure. The operations of method 2500 may be implemented by a base station 105 or its components as described herein. For example, the operations of method 2500 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2505, the base station may be a second base station (e.g., a target base station), and may receive, from a first base station, a handover message to initiate a handover of a UE from the first base station to the second base station. The operations of 2505 may be performed according to the methods described herein. In some examples, aspects of the operations of 2505 may be performed by a handover manager as described with reference to FIGS. 13 through 16.

At 2510, the base station may establish a second connection with the UE responsive to the handover message. The operations of 2510 may be performed according to the methods described herein. In some examples, aspects of the operations of 2510 may be performed by a connection establishment manager as described with reference to FIGS. 13 through 16.

At 2515, the base station may receive a measurement report from the UE that includes one or more channel measurements associated with the first base station and the second base station. The operations of 2515 may be performed according to the methods described herein. In some examples, aspects of the operations of 2515 may be performed by a measurement component as described with reference to FIGS. 13 through 16.

At 2520, the base station may modify the handover of the UE based on the measurement report. The operations of 2520 may be performed according to the methods described herein. In some examples, aspects of the operations of 2520 may be performed by a handover manager as described with reference to FIGS. 13 through 16.

Figure 26:
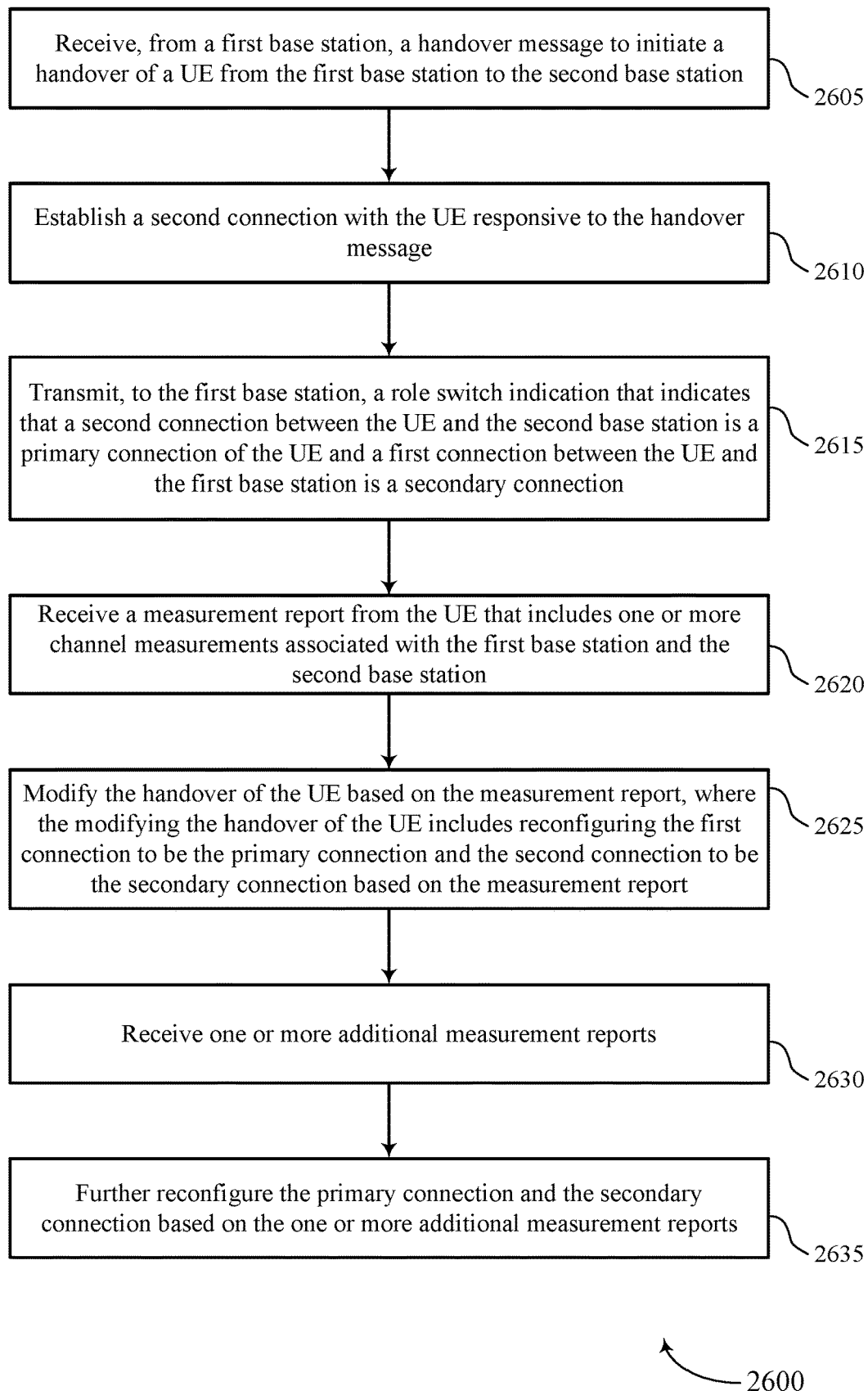

FIG. 26 shows a flowchart illustrating a method 2600 that supports handover techniques in wireless communications in accordance with aspects of the present disclosure. The operations of method 2600 may be implemented by a base station 105 or its components as described herein. For example, the operations of method 2600 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2605, the base station may be a second base station (e.g., a target base station), and may receive, from a first base station, a handover message to initiate a handover of a UE from the first base station to the second base station. The operations of 2605 may be performed according to the methods described herein. In some examples, aspects of the operations of 2605 may be performed by a handover manager as described with reference to FIGS. 13 through 16.

At 2610, the base station may establish a second connection with the UE responsive to the handover message. The operations of 2610 may be performed according to the methods described herein. In some examples, aspects of the operations of 2610 may be performed by a connection establishment manager as described with reference to FIGS. 13 through 16.

At 2615, the base station may transmit, to the first base station, a role switch indication that indicates that a second connection between the UE and the second base station is a primary connection of the UE and a first connection between the UE and the first base station is a secondary connection. The operations of 2615 may be performed according to the methods described herein. In some examples, aspects of the operations of 2615 may be performed by a DC manager as described with reference to FIGS. 13 through 16.

At 2620, the base station may receive a measurement report from the UE that includes one or more channel measurements associated with the first base station and the second base station. The operations of 2620 may be performed according to the methods described herein. In some examples, aspects of the operations of 2620 may be performed by a measurement component as described with reference to FIGS. 13 through 16.

At 2625, the base station may modify the handover of the UE based on the measurement report. The operations of 2625 may be performed according to the methods described herein. In some examples, aspects of the operations of 2625 may be performed by a handover manager as described with reference to FIGS. 13 through 16. In some cases, the modifying the handover of the UE includes reconfiguring the first connection to be the primary connection and the second connection to be the secondary connection based on the measurement report.

At 2630, the base station may receive one or more additional measurement reports. The operations of 2630 may be performed according to the methods described herein. In some examples, aspects of the operations of 2630 may be performed by a measurement component as described with reference to FIGS. 13 through 16.

At 2635, the base station may further reconfigure the primary connection and the secondary connection based on the one or more additional measurement reports. The operations of 2635 may be performed according to the methods described herein. In some examples, aspects of the operations of 2635 may be performed by a DC manager as described with reference to FIGS. 13 through 16.

Figure 27:
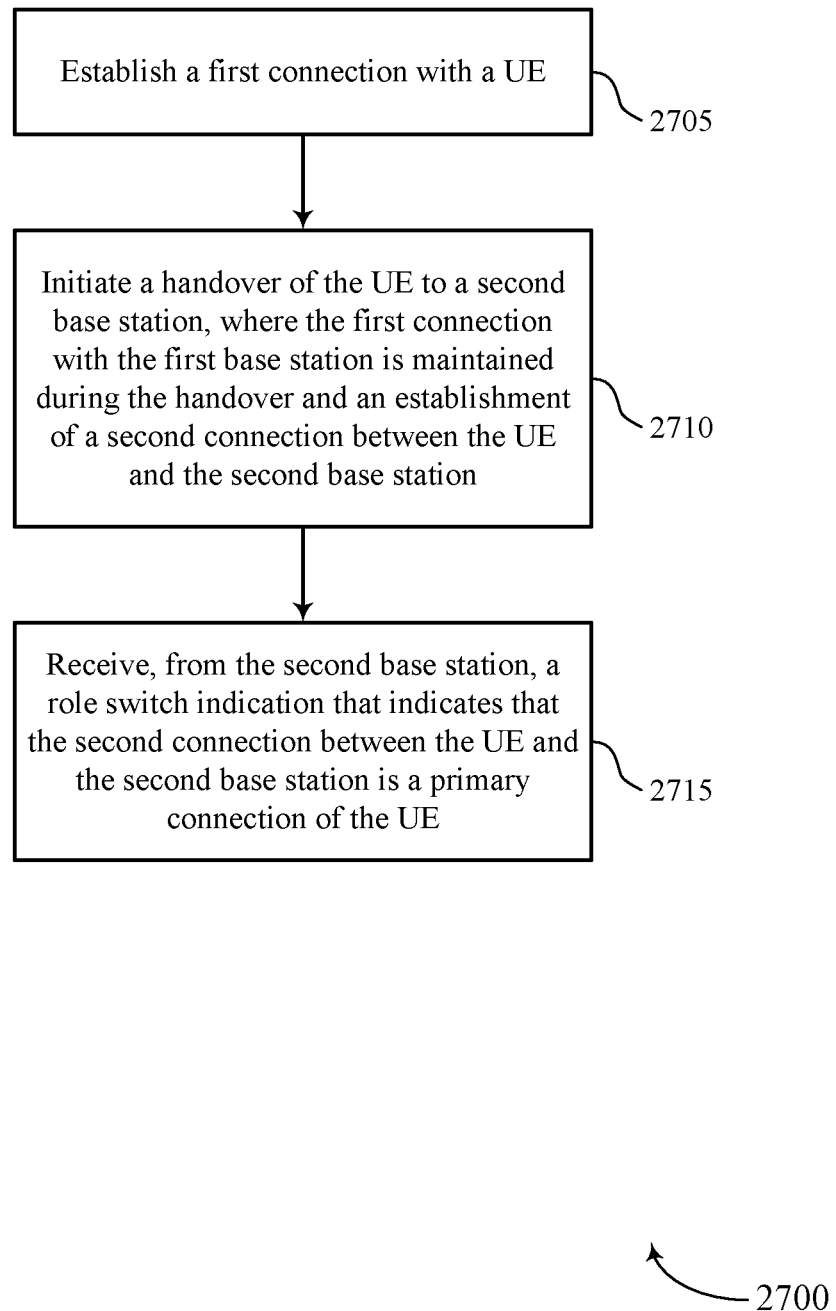

FIG. 27 shows a flowchart illustrating a method 2700 that supports handover techniques in wireless communications in accordance with aspects of the present disclosure. The operations of method 2700 may be implemented by a base station 105 or its components as described herein. For example, the operations of method 2700 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2705, the base station may establish a first connection with a UE. The operations of 2705 may be performed according to the methods described herein. In some examples, aspects of the operations of 2705 may be performed by a connection establishment manager as described with reference to FIGS. 13 through 16.

At 2710, the base station may initiate a handover of the UE to a second base station, where the first connection with the first base station is maintained during the handover and an establishment of a second connection between the UE and the second base station. The operations of 2710 may be performed according to the methods described herein. In some examples, aspects of the operations of 2710 may be performed by a handover manager as described with reference to FIGS. 13 through 16.

At 2715, the base station may receive, from the second base station, a role switch indication that indicates that the second connection between the UE and the second base station is a primary connection of the UE. The operations of 2715 may be performed according to the methods described herein. In some examples, aspects of the operations of 2715 may be performed by a handover manager as described with reference to FIGS. 13 through 16.

Figure 28:
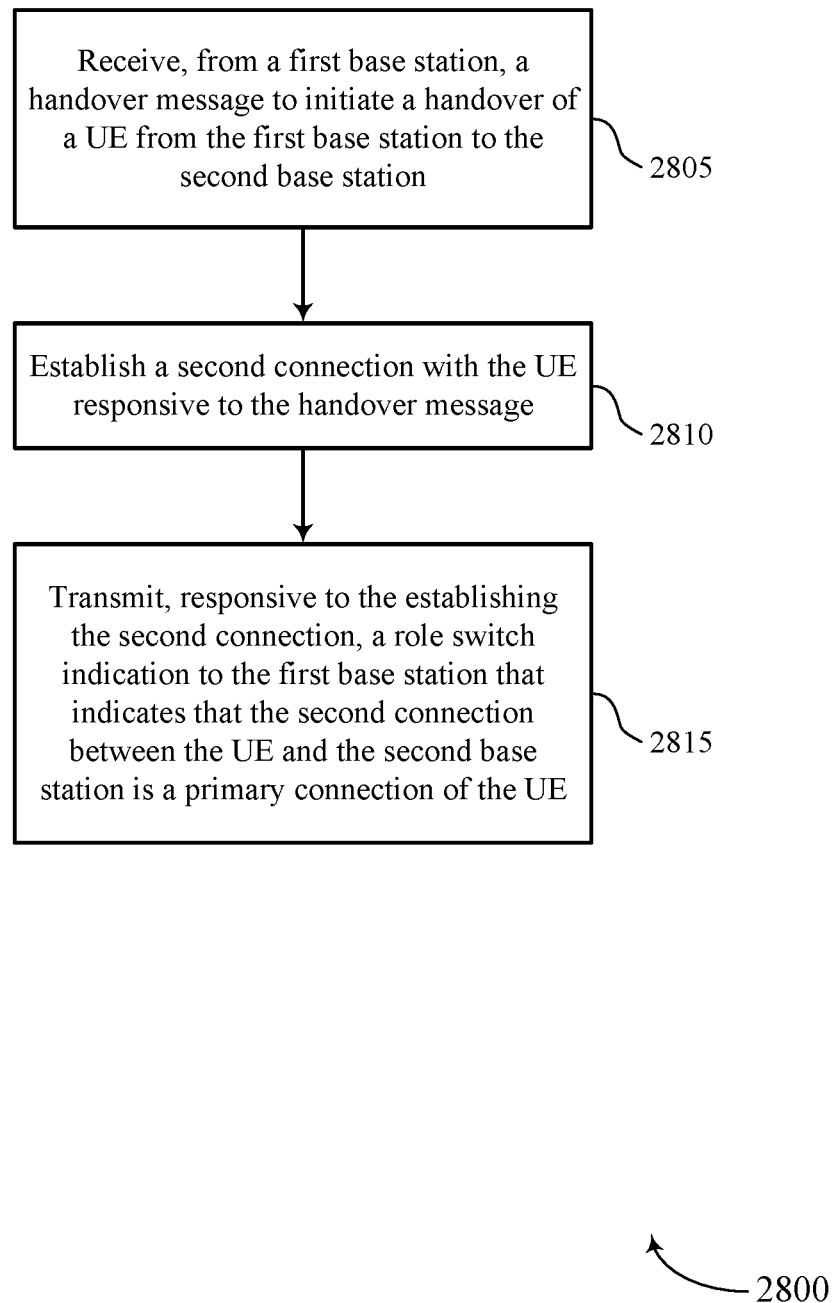

FIG. 28 shows a flowchart illustrating a method 2800 that supports handover techniques in wireless communications in accordance with aspects of the present disclosure. The operations of method 2800 may be implemented by a base station 105 or its components as described herein. For example, the operations of method 2800 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2805, the base station may be a second base station and may receive, from a first base station, a handover message to initiate a handover of a UE from the first base station to the second base station. The operations of 2805 may be performed according to the methods described herein. In some examples, aspects of the operations of 2805 may be performed by a handover manager as described with reference to FIGS. 13 through 16.

At 2810, the base station may establish a second connection with the UE responsive to the handover message. The operations of 2810 may be performed according to the methods described herein. In some examples, aspects of the operations of 2810 may be performed by a random access manager as described with reference to FIGS. 13 through 16.

At 2815, the base station may transmit, responsive to the establishing the second connection, a role switch indication to the first base station that indicates that the second connection between the UE and the second base station is a primary connection of the UE. The operations of 2815 may be performed according to the methods described herein. In some examples, aspects of the operations of 2815 may be performed by a handover manager as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
establishing, at a user equipment (UE), a first connection with a first base station; receiving a handover message from the first base station to perform a handover procedure with a second base station;
transmitting, responsive to the handover message, a request to the second base station to establish a second connection with the second base station, wherein data communications via the first connection with the first base station are maintained during the handover procedure;
determining that a radio link failure of the first connection with the first base station has occurred prior to completion of an establishment of the second connection;
completing the establishment of the second connection with the second base station based at least in part on determining the radio link failure of the first connection; and
transmitting, via the second connection, an indication of the radio link failure to the second base station responsive to the determining, wherein the indication of the radio link failure includes a failure cause associated with the first connection and an identification associated with the first base station.

2. The method of claim 1, further comprising:
receiving a second handover message from the second base station to perform a second handover procedure with a third base station, wherein data communications via the second connection are maintained during the second handover procedure;
determining that establishment of a third connection with the third base station has failed; and
maintaining the second connection with the second base station based at least in part on determining that the establishment of the third connection with the third base station has failed.

3. The method of claim 1, wherein the indication of the radio link failure further indicates one or more of a timer expiration associated with the first connection, a random access procedure failure, or a maximum number of retransmissions is reached for a communication using the first connection.

4. The method of claim 1, wherein the indication of the radio link failure further indicates a measurement of one or more signals received at the UE from one or more neighboring base stations.

5. The method of claim 1, wherein the handover message comprises a radio resource control reconfiguration message.

6. The method of claim 1, wherein the completing the establishment of the second connection preempts, based at least in part on determining the radio link failure of the first connection, a triggering of a reestablishment of the first connection with the first base station.

7. The method of claim 1, further comprising:
releasing the first connection and a source stack associated with the first connection responsive to completing the establishment of the second connection with the second base station.

8. The method of claim 1, wherein the indication of the radio link failure indicates a failure cause associated with the first connection and a source cell group identification associated with the first base station.

9. A method for wireless communication, comprising:
establishing, at a first base station, a first connection with a user equipment (UE);
initiating a handover procedure to handover the UE to a second base station, wherein data communications via the first connection with the first base station are maintained during the handover procedure;
receiving, from the UE, an indication of a failure of the handover procedure;

transmitting, from the first base station to the second base station and responsive to the receiving the indication of the failure of the handover procedure, a message to the second base station to cancel the handover procedure; and discontinuing the handover procedure to handover the UE to the second base station.

10. The method of claim 9, wherein the receiving the indication of the failure of the handover procedure further comprises:
receiving a radio link failure message from the UE indicating a timer expiration associated with a random access procedure to establish a second connection with the second base station.

11. The method of claim 9, further comprising:
receiving a radio link failure message from the UE indicating a second connection with the second base station was established and then failed.

12. The method of claim 11, wherein the radio link failure message indicates a failure cause associated with the second connection, and wherein the failure cause indicates one or more or a timer expiration associated with the second connection, a random access procedure failure, or a maximum number of retransmissions is reached for a communication using the second connection.

13. The method of claim 12, wherein the radio link failure message further indicates a target cell group identification associated with the second base station.

14. The method of claim 9, wherein the indication of the failure of the handover procedure further indicates a measurement of one or more signals received at the UE from a neighboring base station.

15. The method of claim 9, wherein initiating the handover procedure to handover the UE to the second base station comprises:
transmitting a radio resource control reconfiguration message to the UE comprising an indication to perform the handover procedure with the second base station.

16. The method of claim 9, further comprising:
initiating a second handover procedure to handover the UE to a third base station, wherein data communications via the first connection with the first base station are maintained during the second handover procedure.

17. The method of claim 16, wherein the initiating the second handover procedure further comprises:
transmitting, to the UE, a reconfiguration message indicating the UE is to perform the second handover procedure with the third base station.

18. A method for wireless communication, comprising:
receiving, at a second base station, a handover message to initiate a handover of a user equipment (UE) from a first base station to the second base station;
initiating, responsive to the handover message, a connection establishment with the UE to establish a second connection between the UE and the second base station;
performing a random access procedure with the UE to establish the second connection between the UE and the second base station;
receiving, via the second connection, from the UE an indication of a failure of a first connection between the UE and the first base station, wherein data communications during the handover are via the first connection prior to the failure of the first connection, and wherein the indication of the failure of the first connection is received subsequent to the establishment of the second connection, and wherein the indication of the failure of the first connection includes a failure cause associated with the first connection and an identification associated with the first base station; and
forwarding the indication of the failure of the first connection to the first base.

19. The method of claim 18, wherein the indication of the failure of the first connection indicates that resources and context associated with the first connection are to be deleted.

20. The method of claim 18, wherein the handover message comprises a radio resource control reconfiguration message.

21. The method of claim 18, wherein the indication of the failure of the first connection further includes a measurement of one or more signals received at the UE from a neighboring base station.

22. An apparatus for wireless communication, comprising:
a processor,
memory in electronic communication with the processor; and instructions stored in the memory and executable by the processor to cause the apparatus to:
establish, at a user equipment (UE), a first connection with a first base station;
receive a handover message from the first base station to perform a handover procedure with a second base station;
transmit, responsive to the handover message, a request to the second base station to establish a second connection with the second base station, wherein data communications via the first connection with the first base station are maintained during the handover procedure;
determine that a radio link failure of the first connection with the first base station has occurred prior to completion of an establishment of the second connection;
complete the establishment of the second connection with the second base station based at least in part on determining the radio link failure of the first connection; and
transmit, via the second connection, an indication of the radio link failure to the second base station responsive to the determining, wherein the indication of the radio link failure includes a failure cause associated with the first connection and an identification associated with the first base station.

23. The apparatus of claim 22, wherein the instructions are further executable by the processor to cause the apparatus to:
receive a second handover message from the second base station to perform a second handover procedure with a third base station, wherein data communications via the second connection are maintained during the second handover procedure;
determine that establishment of a third connection with the third base station has failed; and
maintain the second connection with the second base station based at least in part on determining that the establishment of the third connection with the third base station has failed.

24. The apparatus of claim 22, wherein the indication of the radio link failure further indicates one or more of a timer expiration associated with the first connection, a random access procedure failure, or a maximum number of retransmissions is reached for a communication using the first connection.

25. The apparatus of claim 22, wherein the indication of the radio link failure further indicates a measurement of one or more signals received at the UE from one or more neighboring base stations.

26. The apparatus of claim 22, wherein the handover message comprises a radio resource control reconfiguration message.

27. The apparatus of claim 22, wherein the completing the establishment of the second connection preempts, based at least in part on determining the radio link failure of the first connection, a triggering of a reestablishment of the first connection with the first base station.

\* \* \* \* \*